(12) United States Patent
Chen et al.

(10) Patent No.: US 11,683,533 B2
(45) Date of Patent: Jun. 20, 2023

(54) APPARATUS AND METHOD FOR DEBLOCKING FILTER IN VIDEO CODING

(71) Applicant: HUAWEI TECHNOLOGIES CO., LTD., Guangdong (CN)

(72) Inventors: Jianle Chen, San Diego, CA (US); Anand Meher Kotra, Munich (DE); Semih Esenlik, Munich (DE); Biao Wang, Shenzhen (CN); Han Gao, Munich (DE); Zhijie Zhao, Munich (DE)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 29 days.

(21) Appl. No.: 17/228,306

(22) Filed: Apr. 12, 2021

(65) Prior Publication Data
US 2021/0235127 A1 Jul. 29, 2021

Related U.S. Application Data

(63) Continuation of application No. PCT/US2019/056165, filed on Oct. 14, 2019.
(Continued)

(51) Int. Cl.
*H04N 19/86* (2014.01)
*H04N 19/176* (2014.01)
(Continued)

(52) U.S. Cl.
CPC ........... *H04N 19/86* (2014.11); *H04N 19/176* (2014.11); *H04N 19/186* (2014.11); *H04N 19/82* (2014.11); *H04N 19/96* (2014.11)

(58) Field of Classification Search
CPC .... H04N 19/86; H04N 19/176; H04N 19/186; H04N 19/82; H04N 19/96; H04N 19/119;
(Continued)

(56) References Cited

U.S. PATENT DOCUMENTS 7,197,194 B1 * 3/2007 Ratcliffe ............... G06T 3/4023
326/46
2006/0002475 A1 * 1/2006 Fuchs ....................... G06T 1/60
375/E7.19
(Continued)

FOREIGN PATENT DOCUMENTS

CN 104584561 A 4/2015
EP 2728870 A1 5/2014
(Continued)

OTHER PUBLICATIONS

Kotra et al. ("CE11-related: CTU line buffer reduction for long filter deblocking", JVET-L0572-v2, Oct. 3-12, 2018). (Year: 2018).*
(Continued)

*Primary Examiner* — Matthew K Kwan
(74) *Attorney, Agent, or Firm* — Gregg L. Jansen

(57) ABSTRACT

A method and image processing device are provided, including a deblocking filter. The deblocking filter modifies values of at most MA samples of the first image block as first filter output values, the at most MA samples being obtained from a column of the first image block that is perpendicular to and adjacent to the horizontal block edge; and modifies values of at most MB samples of the second image block as second filter output values, the at most MB samples being obtained from a column of the second image block that is perpendicular to and adjacent to the horizontal block edge. At most a number MA of sample values of the first image block adjacent to the block edge are modified and at most a number MB of sample values of the second image block adjacent to the block edge are modified, wherein MA<MB.

5 Claims, 23 Drawing Sheets

Related U.S. Application Data

(60) Provisional application No. 62/768,074, filed on Nov. 15, 2018, provisional application No. 62/745,262, filed on Oct. 12, 2018.

(51) Int. Cl.
  *H04N 19/186* (2014.01)
  *H04N 19/82* (2014.01)
  *H04N 19/96* (2014.01)

(58) Field of Classification Search
  CPC .... H04N 19/157; H04N 19/426; H04N 19/61; H04N 19/117; H04N 19/136; H04N 19/156; H04N 19/182; H04N 19/423; H04N 19/70
  USPC .................................................. 375/240.24
  See application file for complete search history.

(56) References Cited

U.S. PATENT DOCUMENTS

| | | | |
|---|---|---|---|
| 2014/0036991 | A1 | 2/2014 | Chao et al. |
| 2014/0112396 | A1* | 4/2014 | Ikeda ................ H04N 19/117 375/240.29 |
| 2014/0226717 | A1 | 8/2014 | Lim et al. |
| 2014/0355695 | A1 | 12/2014 | Lim et al. |
| 2019/0306515 | A1* | 10/2019 | Shima ................ H04N 19/85 |

FOREIGN PATENT DOCUMENTS

| | | |
|---|---|---|
| RU | 2472304 C2 | 1/2013 |
| RU | 2586003 C2 | 6/2016 |
| WO | 2011019213 A2 | 2/2011 |
| WO | 2012096614 A2 | 7/2012 |
| WO | 2013001957 A1 | 1/2013 |
| WO | 2013012479 A1 | 1/2013 |
| WO | 2018123423 A1 | 7/2018 |

OTHER PUBLICATIONS

Andersson et al. ("CE2-2.1.1: Long deblocking filters and fixes", JVET-K0307-v1, Jul. 10-18, 2018). (Year: 2018).*
Zhu et al. ("CE2: Deblocking Improvements for Large CUs (Test 2.1.7", JVET-K0315-v1, Jul. 10-18, 2018). (Year: 2018).*
Norkin et al. ("Description of Core Experiment (CE11): Deblocking", JVET-K1031-v5, Jul. 10-18, 2018) . (Year: 2018).*
Sullivan (Microsoft) G J et al: "Meeting Report of the 11th JVETMeeting (Ljubljana, Jul. 10-18, 2018)", 11. JVET Meeting; Jul. 11, 2018-Jul. 18, 2018; Ljubljana; (The Joint Video Exploration Team OFISO/IEC JTC1 /SC29/WG11 and ITU-T SG.16), No. JVET-K1000 Oct. 2, 2018 (Oct. 2, 2018), XP030194251, Retrieved from the Internet:URL:http://phenix.int-evry. fr/jvet/doc_end_user/documents/11 Ljubljana/wg11 /JVET-K1 OOO-v1.zip JVET-K1OOO-v1.docx [retrieved on Oct. 2, 2018].
Pujara (Samsung) C et al: "AHG8: Selective In-loop filtering for 360Video Compression", 11. JVET Meeting; Jul. 11, 2018-Jul. 18, 2018;Ljubljana; (The Joint Video Exploration Team of ISO/IEC JTC1/SC29/WG11 and ITU-T SG.16), No. JVET-K0404 Jul. 10, 2018(Jul. 10, 2018), XP030199354, Retrieved from the Internet:URL:http://phenix.int-evry. fr/jvet/doc_end_user/documents/11 Ljubljana/wg11 /JVET-K0404-v2.zip JVET-K0404_v2.pptx [retrieved on Jul. 10, 2018].
Hang (Qualcomm) L et al: "Description of Core Expenment 2 (CE2):In-Loop Filters", 122. MPEG Meeting; Apr. 16, 2018-Apr. 20, 2018; Sandiego; (Motion Picture Expert Group or ISO/IEC JTC1/SC29/WG11), No. m42835 May 14, 2018 (May 14, 2018), XP030262117, Retrievedfrom the Internet: URL:http://phenix.int-evry.fr/mpeg/doc_end_user/documents/122_San%20Diego/wg 11 /m42835-JVET-J 1 022-v3-JVETJ1022.zip JVET-J1022_r2_noChanges.docx [retrieved on May 14, 2018].
Jing-Ming Guo et al, Blocking Effect and Halftoning Impulse Suppression in an ED/OD BTC Image with Optimized Texture-dependent Filter Sets, Proceedings of 2011 International Conference on System Science and Engineering, Macau, China—Jun. 2011, total 4 pages.
Suo Shi-yao et al, Image Deblocking Algorithm Using Adaptive High-dimensional NonlocalTotal Variational for Compressed Image, Science Technology and Engineering, vol. 18, No. 10, Apr. 2018, with an English Anstract, total 7 pages.
JVET-K0369-r3, Anand Meher Kotra et al., CE2-related: Longer tap Deblocking Filter JVET-K0369, Joint Video Experts Team (JVET) of ITU-T SG 16 WP 3 and ISO/IEC JTC 1/SC 29/WG 11, 11th Meeting: Ljubljana, SI, Jul. 10-18, 2018, 20 pages.

* cited by examiner

APPARATUS AND METHOD FOR DEBLOCKING FILTER IN VIDEO CODING

CROSS-REFERENCE TO RELATED APPLICATIONS

This application is a continuation of International Application No. PCT/US2019/056165, filed on Oct. 14, 2019, which claims priority to U.S. provisional Application No. 62/745,262, filed on Oct. 12, 2018 and U.S. provisional Application No. 62/768,074, filed on Nov. 15, 2018. All of the aforementioned patent applications are hereby incorporated by reference in their entireties.

TECHNICAL FIELD

Embodiments of the present invention relates to the field of picture processing, and in particular video picture coding. More specifically, the invention relates to a deblocking filter apparatus and method for filtering reconstructed video pictures as well as an encoding apparatus and a decoding apparatus comprising such a deblocking filter apparatus.

BACKGROUND

Video coding (video encoding and decoding) is used in a wide range of digital image applications, for example broadcast digital TV, video transmission over internet and mobile networks, real-time conversational applications such as video chat, video conferencing, DVD and Blu-ray discs, video content acquisition and editing systems, and camcorders of security applications.

Since the development of the block-based hybrid video coding approach in the H.261 standard in 1990, new video coding techniques and tools were developed and formed the basis for new video coding standards. One of the goals of most of the video coding standards was to achieve a bitrate reduction compared to its predecessor without sacrificing picture quality. Further video coding standards comprise MPEG-1 video, MPEG-2 video, ITU-T H.262/MPEG-2, ITU-T H.263, ITU-T H.264/MPEG-4, Part 10, Advanced Video Coding (AVC), ITU-T H.265, High Efficiency Video Coding (HEVC), ITU-T H.266/Versatile video coding (VVC) and extensions, e.g. scalability and/or three-dimensional (3D) extensions, of these standards.

Block-based image coding schemes have a common issue that along the block edges, edge artifacts can appear. These artifacts are due to the independent coding of the coding blocks. These edge artifacts are often readily visible to a user. A goal in block-based image coding is to reduce edge artifacts below a visibility threshold. This is achieved by performing deblocking filtering. Such a deblocking filtering is performed at the decoding side in order to remove the visible edge artifacts, and also at the encoding side, in order to prevent the edge artifacts from being encoded into the image at all.

Thus, there is a need for an improved in-loop deblocking filter apparatus and method providing a more efficient removal of block artifacts.

SUMMARY

In view of the above-mentioned challenges, the present invention aims to improve the conventional deblocking filtering. The present invention has the objective to provide a deblocking filter apparatus, an encoder, a decoder and corresponding methods that can perform deblocking filtering with available line buffer. Further, the deblocking should be efficient.

Embodiments of the invention are defined by the features of the independent claims, and further advantageous implementations of the embodiments by the features of the dependent claims.

Particular embodiments are outlined in the attached independent claims, with other embodiments in the dependent claims.

According to a first aspect of the invention, a device for use in an image encoder and/or an image decoder, for deblocking block edges between image blocks is provided, wherein the block edges comprises a horizontal block edge between a first image block and a second image block,
wherein the first image block has a block size SA along a vertical direction,
wherein the second image block has a block size SB along the vertical direction, the vertical direction being perpendicular to the horizontal block edge,
wherein the device comprises a de-blocking filter configured to: in the case that the horizontal block edge is overlapped with a horizontal coding tree block (CTB) boundary (or in response to determining that the horizontal block edge is overlapped with a horizontal coding tree block (CTB) boundary),
  modify values of at most MA samples of the first image block as first filter output values (or a first set of filter output values), wherein the at most MA samples are obtained from a column of the first image block that is perpendicular to and adjacent to the horizontal block edge, and
  modify values of at most MB samples of the second image block as second filter output values (or a second set of filter output values), wherein the at most MB samples are obtained from a column of the second image block that is perpendicular to and adjacent to the horizontal block edge,
wherein the first image block is a block above the CTB boundary and the second image block is a block below the CTB boundary;
wherein MA≠MB (such as MA<MB) and MA is determined at least based on a line buffer size of a line buffer associated with the CTB boundary. In other words, MA depends on (or is based on or is associated with) the line buffer size of the line buffer associated with the CTB boundary.

Line buffer size is the amount of pixels which need to be stored in the memory for CTU based decoding (e.g. hardware decoders). In an examples, the line buffer size for a luma block (or luma component) is 4 lines and for a chroma block (or a chroma component) is 2 lines.

It can be understood that MA may be understood as a maximum filter length for the first image block, and MB may be understood as a maximum filter length for the second image block, The second image block is a current block and the first image block P is a neighboring block of the current block, correspondingly in the second image block, for each column of input samples which are perpendicular and adjacent to the horizontal block edge, at most MB samples are modified to generate the output filtered samples; in the first image block, for each column of input samples which are perpendicular and adjacent to the horizontal block edge, at most MA samples are modified to generate the output filtered samples. In an example, SA and SB are equal to or larger than 32. In another example, SA (e.g. the height of the first image block)

is equal to or larger than 16, and SB (e.g. the height of the second image block) is equal to or larger than 32. In another example, SA or SB (e.g. the height of the respective image block) being equal to or larger than 8. It is noted that, SA is an even integer $2^{n_1}$, SB is an even integer $2^{n_2}$, where $n_1$ and $n_2$ may be same or different with each other.

It is noted that the term "block", "coding block" or "image block" is used in the present disclosure which can be applied for transform units (TUs), prediction units (PUs), coding units (CUs) etc. In VVC in general transform units and coding units are mostly aligned except in few scenarios when TU tiling or sub block transform (SBT) is used. It can be understood that the terms "block/image block/coding block/transform block", and "block size/transform block size" may be exchanged with each other in the present disclosure. The terms "sample/pixel" may be exchanged with each other in the present disclosure.

The invention works for luma horizontal edges. For luma horizontal edges, the height of the first or second coding block (the first or second image block being a luma block) is checked whether the height is equal to or greater than 32 (e.g. 32 or 64). For luma horizontal edges, the height of the luma block is considered, for luma blocks with a height>=32, a long tap filter (namely a long filter) is applied.

The invention also works for chroma horizontal edges. For chroma horizontal edges, the height of the first or second coding block (the first or second image block being a chroma block) is checked whether the height is equal to or greater than 8 samples (e.g. 8 or 16). For chroma horizontal edges, the height of the chroma block is considered, for chroma blocks with a height>=8, a long tap filter (namely a long filter) is applied.

In the present disclosure, in response to determining that the horizontal block edge is overlapped with a horizontal coding tree block (CTB) boundary, the deblocking filter is a filter in which MB samples are modified on the side (i.e. the bottom side) of the horizontal block edge (CU edge or TU edge) while MA samples are modified on the other side (i.e. the top side) of the horizontal block edge (CU edge or TU edge), wherein MA≠MB, particularly MA<MB, for example, MA=3 and MB=7. The deblocking filter may be an asymmetric filter which modifies a different number of samples on either side of the horizontal block edge (e.g. CU edge or TU edge).

It can be understood that the deblocking filter may be an asymmetric filter in the present disclosure. Furthermore, the term "long tap filter", "longer tap filter" or "asymmetric tap filter" or "asymmetric long filter" or "asymmetric filter" may be exchanged with each other in the present disclosure.

Thus, an improved in-loop deblocking filter device is provided allowing for a more efficient removal of blocking artifacts. This allows for differently handling the two sides of a horizontal block edge, i.e. it is allowed that the filtering decision and filtering are tuned according to the available line buffer and therefore this will result in optimal subjective quality.

In a possible implementation form of the device according to the first aspect as such, wherein the de-blocking filter is further configured to: in the case that the horizontal block edge is overlapped with the horizontal coding tree block (CTB) boundary (or in response to determining that the horizontal block edge is overlapped with the CTB boundary), use values of at most DA samples of the first image block as first filter decision values, wherein the at most DA samples are obtained from a column of the first image block that is perpendicular to and adjacent to the horizontal block edge, use values of at most DB samples of the second image block as second filter decision values, wherein the at most DB samples are obtained from a column of the second image block that is perpendicular to and adjacent to the horizontal block edge, wherein DA≠DB (DA<DB) and DA is determined based on the line buffer size of the line buffer associated with the CTB boundary.

In the present disclosure, in response to determining that the horizontal block edge is overlapped with a horizontal coding tree block (CTB) boundary, the deblocking filter is also a filter which uses DA samples for a filter decision on one side (i.e. the top side) of the horizontal block edge and uses DB samples for a filter decision on other side (i.e. the bottom side) of the horizontal block edge, wherein DA≠DB, particularly DA<DB, for example, DA=4 and DB=8. In general, DA=MA+1 and DB=MB+1. The deblocking filter may be also an asymmetric filter which uses a different number of samples on either side of the block edge (e.g. CU edge or TU edge).

In a possible implementation form of the device according to any preceding implementation of the first aspect or the first aspect as such, wherein if the line buffer has the line buffer size of X lines, for the first image block, MA=X−1, wherein X is a positive integer.

In a possible implementation form of the device according to any preceding implementation of the first aspect or the first aspect as such, wherein if the line buffer has the line buffer size of X lines, for the first image block, DA=X and MA=X−1, wherein X is a positive integer.

In a possible implementation form of the device according to any preceding implementation of the first aspect or the first aspect as such, wherein when the first image block and the second image block are chroma blocks, the line buffer has the line buffer size of 2 lines, or when the first image block and the second image block are luma blocks, the line buffer has the line buffer size of 4 lines.

In a possible implementation form of the device according to any preceding implementation of the first aspect or the first aspect as such, wherein if the line buffer associated with the CTB boundary has the line buffer size of X lines, a sample $p_i$ of the first image block is used as a padded value which replaces the other samples which belongs to the first image block and which are outside the line buffer, wherein i=X−1.

The sample $p_i$ of the first image block is the X-th sample in a column perpendicular to and adjacent to the horizontal block edge, and is also the outermost sample (such as $p_3$ as shown in FIG. 17 or $p_1$ as shown in FIG. 18 or $p_5$ as shown in FIG. 16B) allowed to be stored in the line buffer associated with the CTB boundary.

In a possible implementation form of the device according to any preceding implementation of the first aspect or the first aspect as such, wherein a filter coefficient of a sample $p_i$ of the first image block is determined in such a way that the sample $p_i$, which belongs to the first image block and which is the outermost sample allowed to be stored in the line buffer, is used as a padded value which replaces the other samples which belong to the first image block and which are outside the line buffer.

This allows that the original filter decision and filtering process need not be changed as the padded samples can just be treated as available samples and this lead to minimal computational complexity increase, especially in hardware.

In a possible implementation form of the device according to any preceding implementation of the first aspect or the first aspect as such, wherein a filter coefficient associated with a sample $p_i$ of the first image block is determined based on the number of times the sample $p_i$ is used as a padded value, wherein the sample $p_i$ belongs to the first image block and is the outermost sample allowed to be stored in the line buffer associated with the CTB boundary.

For example, the number of times the sample $p_i$ is used as a padded value is 2, then the filter coefficient associated with the sample $p_i$ of the first image block is 3, because the sample $p_i$ itself is also counted.

In a possible implementation form of the device according to any preceding implementation of the first aspect or the first aspect as such, wherein when the line buffer has the line buffer size of 2 lines, the sample $p_1$ is the sample $p_i$ (e.g. the column includes [$p_0$ $p_1$ $p_2$ ...], $p_1$ is the second element in the column), and the filter coefficient associated with the sample $p_1$ is 3 for an output sample $p_0'$ of the first filter output values. See the equation $p_0'=\text{Clip3}(p_0-T_C, p_0+T_C, (3*+2*p_0+q_0+q_1+q_2+4)>>3)$ (8-1151)

In a possible implementation form of the device according to any preceding implementation of the first aspect or the first aspect as such, wherein when the line buffer has the line buffer size of 2 lines, the sample $p_1$ is the sample $p_i$ (e.g. the column includes [$p_0$ $p_1$ $p_2$ ...], $p_1$ is the second element in the column), and the filter coefficient associated with the sample $p_i$ is 2 for an output sample $q_0'$ of the second filter output values. See the equation $q_0'=\text{Clip3}(q_0-t_C, q_0+t_C, (2*p_1+p_0+2*p_0+p_1+q_2+q_3+4)>>3)$ (8-1154)

In a possible implementation form of the device according to any preceding implementation of the first aspect or the first aspect as such, wherein when both the first image block and the second image block are luma blocks and SB and SA are equal to or greater than 32, MB=7 and MA=3; or wherein when both the first image block and the second image block are luma blocks and SB is equal to or greater than 32 and SA is equal to or greater than 16, MB=7 and MA=3.

It can be understood that SA may be different from SB or SA is the same with SB. In other words, SB and SA can be same value or SB and SA can be different values, for example, SA is 32, SB is 64. For example, SA is 16, SB is 32.

In a possible implementation form of the device according to any preceding implementation of the first aspect or the first aspect as such, wherein when both the first image block and the second image block are luma blocks and SB and SA are equal to or greater than 32, DB=8 and DA=4; or wherein when both the first image block and the second image block are luma blocks and SB is equal to or greater than 32 and SA is equal to or greater than 16, DB=8 and DA=4.

It can be understood that SA may be different from SB or SA is the same with SB. In other words, SB and SA can be same value or SB and SA can be different values, for example, SA is 32, SB is 64. For example, SA is 16, SB is 32.

In a possible implementation form of the device according to any preceding implementation of the first aspect or the first aspect as such, wherein when the first image block and the second image block are chroma blocks and SA and SB are equal to or greater than 8, MB=3 and MA=1.

It can be understood that SA may be different from SB or SA is the same with SB. In other words, SB and SA can be same value or SB and SA can be different values, for example, SA is 8, SB is 8. For example, SA is 8, SB is 16.

In a possible implementation form of the device according to any preceding implementation of the first aspect or the first aspect as such, wherein when the first image block and the second image block are chroma blocks and SB and SA are equal to or greater than 8, DB=4 and DA=2.

It can be understood that SA may be different from SB or SA is the same with SB. In other words, SB and SA can be same value or SB and SA can be different values, for example, SA is 8, SB is 8. For example, SA is 8, SB is 16.

In a possible implementation form of the device according to any preceding implementation of the first aspect or the first aspect as such, wherein the second image block is a current image block, and the first image block is a neighboring image block adjacent to the current image block.

In a possible implementation form of the device according to any preceding implementation of the first aspect or the first aspect as such, wherein samples $p_i$ of the first image block are luma samples, or the samples $p_i$ of the first image block are chroma samples, a range for i may be $\{0, 1, 2, \ldots, SA-1\}$.

Similarly, samples $q_j$ of the second image block are luma samples, or the samples $q_j$ of the second image block are chroma samples, a range for j may be $\{0, 1, 2, \ldots, SB-1\}$.

In particular, $p_i$ represent any sample of a column of samples of the first image block (such as block P) that is perpendicular to and adjacent to the horizontal block edge, and $q_j$ represent any sample of a column of samples of the second image block (such as block Q) that is perpendicular to and adjacent to the horizontal block edge, such as i, j=0, 1, 2, ... 7 or, such as i, j=0, 1, 2, ... 31.

In a possible implementation form of the device according to any preceding implementation of the first aspect or the first aspect as such, wherein when the first and second image blocks are chroma blocks, the de-blocking filter is configured to determine whether the horizontal block edge is overlapped with a horizontal chroma CTB boundary; or when the first and second image blocks are luma blocks, the de-blocking is configured to determine whether the horizontal block edge is overlapped with a horizontal luma CTB boundary.

In a possible implementation form of the device according to any preceding implementation of the first aspect or the first aspect as such, wherein the de-blocking filter is a longer tap filter or an asymmetric filter or an asymmetric tap filter.

According to a second aspect of the invention, a device for use in an image encoder and/or an image decoder, for deblocking block edges between image blocks is provided, wherein the block edges comprises a horizontal block edge between a first image block and a second image block, wherein the first image block has a block size SA along a vertical direction, wherein the second image block has a block size SB along the vertical direction, the vertical direction being perpendicular to the horizontal block edge, wherein the device comprises a de-blocking filter configured to: in the case that the horizontal block edge is overlapped with a horizontal coding tree block (CTB) boundary (or in response to determining that the horizontal block edge is overlapped with a horizontal coding tree block (CTB) boundary), modify values of at most MA samples of the first image block as first filter output values, wherein the at most MA samples are obtained from a column of the first image block that is perpendicular to and adjacent to the horizontal block edge, wherein MA=1; and modify values of at most MB samples of the second image block as second filter output values, wherein the at most MB samples are obtained from a column of the second image block that is perpendicular to and adjacent to the horizontal block edge, wherein MB=3, wherein the first image block is a chroma block above the CTB boundary and the second image block is another chroma block below the CTB boundary, and SA and SB are equal to or greater than 8.

It can be understood that SA may be different from SB, or SA is the same with SB. In other words, SB and SA can be same value or SB and SA can be different values, for example, SA is 8, SB is 8. For example, SA is 8, SB is 16.

According to a third aspect of the invention, a device for use in an image encoder and/or an image decoder, for deblocking block edges between image blocks is provided, wherein the block edges comprises a horizontal block edge between a first image block and a second image block, wherein the first image block has a block size SA along a vertical direction, wherein the second image block has a block size SB along the vertical direction, the vertical direction being perpendicular to the horizontal block edge, wherein the device comprises a de-blocking filter configured to: in the case that the horizontal block edge is overlapped with a horizontal coding tree block (CTB) boundary (or in response to determining that the horizontal block edge is overlapped with a horizontal coding tree block (CTB) boundary), use values of at most DA samples of the first image block as first filter decision values, wherein the at most DA samples are obtained from a column of the first image block that is perpendicular to and adjacent to the horizontal block edge, wherein DA=2;

use values of at most DB samples of the second image block as second filter decision values, wherein the at most DB samples are obtained from a column of the second image block that is perpendicular to and adjacent to the horizontal block edge, wherein DB=4, and wherein the first image block is a chroma block above the CTB boundary and the second image block is another chroma block below the CTB boundary, and SA and SB are equal to or greater than 8.

It can be understood that SA may be different from SB, or SA is the same with SB. In other words, SB and SA can be same value or SB and SA can be different values, for example, SA is 8, SB is 8. For example, SA is 8, SB is 16.

According to a fourth aspect of the invention, a deblocking method, for deblocking block edges between image blocks in an image encoding and/or an image decoding is provided, wherein the block edges comprises a horizontal block edge between a first image block and a second image block, wherein the first image block has a block size SA along a vertical direction, wherein the second image block has a block size SB along the vertical direction, the vertical direction being perpendicular to the horizontal block edge, wherein the method comprises: in the case that the horizontal block edge is overlapped with a horizontal coding tree block (CTB) boundary (or in response to determining that the horizontal block edge is overlapped with a horizontal coding tree block (CTB) boundary), modifying values of at most MA samples of the first image block as first filter output values, wherein the at most MA samples are obtained from a column of the first image block that is perpendicular to and adjacent to the horizontal block edge, and modifying values of at most MB samples of the second image block as second filter output values, wherein the at most MB samples are obtained from a column of the second image block that is perpendicular to and adjacent to the horizontal block edge, wherein the first image block is a block above the CTB boundary and the second image block is a block below the CTB boundary;

wherein MA≠MB (MA<MB) and MA is determined based on a line buffer size of a line buffer associated with the CTB boundary.

This allows that the filtering decision and filtering are tuned according to the available line buffer and therefore this will result in optimal subjective quality.

In a possible implementation form of the method according to the fourth aspect as such, wherein the method further comprises: in the case that the horizontal block edge is overlapped with the horizontal coding tree block (CTB) boundary (or in response to determining that the horizontal block edge is overlapped with a horizontal coding tree block (CTB) boundary), using values of at most DA samples of the first image block as first filter decision values, wherein the at most DA samples are obtained from a column of the first image block that is perpendicular to and adjacent to the horizontal block edge, using values of at most DB samples of the second image block as second filter decision values, wherein the at most DB samples are obtained from a column of the second image block that is perpendicular to and adjacent to the horizontal block edge, wherein DA≠DB (DA<DB) and DA is determined based on the line buffer size of the line buffer associated with the CTB boundary.

In a possible implementation form of the method according to any preceding implementation of the fourth aspect or the fourth aspect as such, wherein if the line buffer has the line buffer size of X lines, for the first image block, MA=X−1, wherein X is a positive integer.

In a possible implementation form of the method according to any preceding implementation of the fourth aspect or the fourth aspect as such, wherein if the line buffer has the line buffer size of X lines, for the first image block, DA=X and MA=X−1, wherein X is a positive integer.

In a possible implementation form of the method according to any preceding implementation of the fourth aspect or the fourth aspect as such, wherein when the first image block and the second image block are chroma blocks, the line buffer has the line buffer size of 2 lines, or when the first image block and the second image block are luma blocks, the line buffer has the line buffer size of 4 lines.

In a possible implementation form of the method according to any preceding implementation of the fourth aspect or the fourth aspect as such, wherein if the line buffer associated with the CTB boundary has the line buffer size of X lines, a sample $p_i$ of the first image block is used as a padded value which replaces the other samples which belongs to the first image block and which are outside the line buffer, wherein i=X−1.

In a possible implementation form of the method according to any preceding implementation of the fourth aspect or the fourth aspect as such, wherein the sample $p_i$ of the first image block is the X-th sample in a column perpendicular to and adjacent to the horizontal block edge, and is also the outermost sample allowed to be stored in the line buffer associated with the CTB boundary.

In a possible implementation form of the method according to any preceding implementation of the fourth aspect or the fourth aspect as such, wherein a filter coefficient of a sample $p_i$ of the first image block is determined in such a way that the sample $p_i$, which belongs to the first image block and which is the outermost sample allowed to be stored in the line buffer, is used as a padded value which replaces the other samples which belongs to the first image block and which are outside the line buffer.

This allows that the original filter decision and filtering process need not be changed as the padded samples can just be treated as available samples and this lead to minimal computational complexity increase, especially in hardware.

In a possible implementation form of the method according to any preceding implementation of the fourth aspect or the fourth aspect as such, wherein a filter coefficient associated with a sample $p_i$ of the first image block is determined based on the number of times the sample $p_i$ is used as a padded value (which replaces the other samples which belongs to the first image block and which are outside the line buffer), wherein the sample $p_i$ belongs to the first image block and is the outermost sample allowed to be stored in the line buffer associated with the CTB boundary.

In a possible implementation form of the method according to any preceding implementation of the fourth aspect or the fourth aspect as such, wherein when the line buffer has the line buffer size of 2 lines, the sample $p_i$ is the sample $p_i$, and the filter coefficient associated with the sample $p_i$ is 3 for an element of the first filter output values.

In a possible implementation form of the method according to any preceding implementation of the fourth aspect or the fourth aspect as such, wherein when the line buffer has the line buffer size of 2 lines, the sample $p_i$ is the sample $p_i$, and the filter coefficient associated with the sample $p_i$ is 2 for an element of the second filter output values.

In a possible implementation form of the method according to any preceding implementation of the fourth aspect or the fourth aspect as such, wherein when both the first image block and the second image block are luma blocks and SB and SA are equal to or greater than 32, MB=7 and MA=3; or wherein when both the first image block and the second image block are luma blocks and
SB is equal to or greater than 32 and SA is equal to or greater than 16, MB=7 and MA=3.

In a possible implementation form of the method according to any preceding implementation of the fourth aspect or the fourth aspect as such, wherein when both the first image block and the second image block are luma blocks and SB and SA are equal to or greater than 32, DB=8 and DA=4; or wherein when both the first image block and the second image block are luma blocks and SB is equal to or greater than 32 and SA is equal to or greater than 16, DB=8 and DA=4.

In a possible implementation form of the method according to any preceding implementation of the fourth aspect or the fourth aspect as such, wherein when the first image block and the second image block are chroma blocks and SA and SB are equal to or greater than 8, MB=3 and MA=1.

In a possible implementation form of the method according to any preceding implementation of the fourth aspect or the fourth aspect as such, wherein when the first image block and the second image block are chroma blocks and SB and SA are equal to or greater than 8, DB=4 and DA=2.

In a possible implementation form of the method according to any preceding implementation of the fourth aspect or the fourth aspect as such, wherein the second image block is a current image block, and the first image block is a neighboring image block adjacent to the current image block.

In a possible implementation form of the method according to any preceding implementation of the fourth aspect or the fourth aspect as such, wherein samples $p_i$ of the first image block are luma samples, or the samples $p_i$ of the first image block are chroma samples, wherein i belongs to $\{0, 1, 2, \ldots, SA-1\}$.

In a possible implementation form of the method according to any preceding implementation of the fourth aspect or the fourth aspect as such, wherein the method further comprises:

when the first and second image blocks are chroma blocks, determining whether the horizontal block edge is overlapped with a horizontal chroma CTB boundary; or when the first and second image blocks are luma blocks, determining whether the horizontal block edge is overlapped with a horizontal luma CTB boundary.

In a possible implementation form of the method according to any preceding implementation of the fourth aspect or the fourth aspect as such, wherein the de-blocking filter is a longer tap filter or an asymmetric filter or an asymmetric tap filter.

According to a fifth aspect of the invention, a deblocking method, for deblocking block edges between image blocks in an image encoding and/or an image decoding is provided, wherein the block edges comprises a horizontal block edge between a first image block and a second image block, wherein the first image block has a block size SA along a vertical direction, wherein the second image block has a block size SB along the vertical direction, the vertical direction being perpendicular to the horizontal block edge, wherein the method comprises: in the case that the horizontal block edge is overlapped with a horizontal coding tree block (CTB) boundary (or in response to determining that the horizontal block edge is overlapped with a horizontal coding tree block (CTB) boundary), modifying values of at most MA samples of the first image block as first filter output values, wherein the at most MA samples are obtained from a column of the first image block that is perpendicular to and adjacent to the horizontal block edge, wherein MA=1; and modifying values of at most MB samples of the second image block as second filter output values, wherein the at most MB samples are obtained from a column of the second image block that is perpendicular to and adjacent to the horizontal block edge, wherein MB=3, wherein the first image block is a chroma block above the CTB boundary and the second image block is another chroma block below the CTB boundary, and SA and SB are equal to or greater than 8.

According to a sixth aspect of the invention, a deblocking method, for deblocking block edges between image blocks in an image encoding and/or an image decoding is provided, wherein the block edges comprises a horizontal block edge between a first image block and a second image block, wherein the first image block has a block size SA along a vertical direction, wherein the second image block has a block size SB along the vertical direction, the vertical direction being perpendicular to the horizontal block edge, wherein the method comprises a de-blocking filter configured to: in the case that the horizontal block edge is overlapped with a horizontal coding tree block (CTB)

boundary (or in response to determining that the horizontal block edge is overlapped with a horizontal coding tree block (CTB) boundary), using values of at most DA samples of the first image block as first filter decision values, wherein the at most DA samples are obtained from a column of the first image block that is perpendicular to and adjacent to the horizontal block edge, wherein DA=2;

using values of at most DB samples of the second image block as second filter decision values, wherein the at most DB samples are obtained from a column of the second image block that is perpendicular to and adjacent to the horizontal block edge, wherein DB=4, and wherein the first image block is a chroma block above the CTB boundary and the second image block is another chroma block below the CTB boundary, and SA and SB are equal to or greater than 8.

According to a seventh aspect of the invention, a device for use in an image encoder and/or an image decoder, for deblocking block edges between image blocks is provided, wherein the block edges comprises a horizontal block edge between a current image block and a neighboring image block of the current image block, wherein the current image block is above the horizontal block edge;

wherein the current image block has a block size SA along a vertical direction, the vertical direction being perpendicular to the horizontal block edge, wherein the device comprises a de-blocking filter configured to: in the case that the horizontal block edge is overlapped with a horizontal coding tree block (CTB) boundary (or in response to determining that the horizontal block edge is overlapped with a horizontal coding tree block (CTB) boundary), determine a maximum filter length, MA for the current image block at least based on a line buffer size of a line buffer associated with the CTB boundary; and modify values of at most MA samples of the current image block as first filter output values, wherein the at most MA samples are obtained from a column of the current image block that is perpendicular to and adjacent to the horizontal block edge.

MA can be understood as a maximum filter length for the current image block or in each column perpendicular to and adjacent to the horizontal block edge, beginning at the horizontal block edge, a maximum number of samples to be modified for the current image block.

According to an eighth aspect of the invention, a deblocking method, for deblocking block edges between image blocks in an image encoding and/or an image decoding is provided, wherein the block edges comprises a horizontal block edge between a current image block and a neighboring image block of the current image block, wherein the current image block is above the horizontal block edge;

wherein the current image block has a block size SA along a vertical direction, the vertical direction being perpendicular to the horizontal block edge, wherein the method comprises: in the case that the horizontal block edge is overlapped with a horizontal coding tree block (CTB) boundary (or in response to determining that the horizontal block edge is overlapped with a horizontal coding tree block (CTB) boundary), determining a maximum filter length, MA for the current image block at least based on a line buffer size of a line buffer associated with the CTB boundary; and modifying values of at most MA samples of the current image block as first filter output values, wherein the at most MA samples are obtained from a column of the current image block that is perpendicular to and adjacent to the horizontal block edge.

It allows that the filtering decision and filtering are tuned according to the available line buffer and therefore this will result in optimal subjective quality.

In a possible implementation form according the seventh or eighth aspect as such, wherein if the line buffer associated with the CTB boundary has the line buffer size of X lines, MA=X−1, wherein X is a positive integer.

In a possible implementation form according to any preceding implementation of the seventh or eighth aspect or the seventh or eighth aspect as such, wherein the de-blocking filter is further configured to: in the case that the horizontal block edge is overlapped with the horizontal coding tree block (CTB) boundary, use values of at most DA samples of the current image block as first filter decision values, wherein the at most DA samples are obtained from a column of the current image block that is perpendicular to and adjacent to the horizontal block edge.

In a possible implementation form according to any preceding implementation of the seventh or eighth aspect or the seventh or eighth aspect as such, wherein if the line buffer associated with the CTB boundary has the line buffer size of X lines, DA=X and MA=X−1, wherein X is a positive integer.

In a possible implementation form of the method according to any preceding implementation of the sixth aspect or the sixth aspect as such, wherein when the current image block is a chroma block, the line buffer associated with the CTB boundary has the line buffer size of 2 lines, or when the current image block is a luma block, the line buffer associated with the CTB boundary has the line buffer size of 4 lines.

In a possible implementation form according to any preceding implementation of the seventh or eighth aspect or the seventh or eighth aspect as such, wherein if the line buffer associated with the CTB boundary has the line buffer size of X lines, a sample $p_i$ of the current image block is used as a padded value which replaces the other samples which belongs to the current image block and which are outside the line buffer, wherein i=X−1.

In a possible implementation form according to any preceding implementation of the seventh or eighth aspect or the seventh or eighth aspect as such, wherein the sample $p_i$ of the current image block is the X-th sample in a column perpendicular to and adjacent to the horizontal block edge, and is also the outermost sample allowed to be stored in the line buffer associated with the CTB boundary.

In a possible implementation form according to any preceding implementation of the seventh or eighth aspect or the seventh or eighth aspect as such, wherein a filter coefficient of a sample $p_i$ of the current image block is determined in such a way that the sample $p_i$, which belongs to the current image block and which is the outermost sample allowed to be stored in the line buffer, is used as a padded value which replaces the other samples which belongs to the current image block and which are outside the line buffer.

It allows that the original filter decision and filtering process need not be changed as the padded samples can just be treated as available samples and this results minimal computational complexity increase, especially in hardware.

In a possible implementation form according to any preceding implementation of the seventh or eighth aspect or the seventh or eighth aspect as such, wherein a filter coefficient associated with a sample $p_i$ of the current image block is determined based on the number of times the sample $p_i$ is used as a padded value, wherein the sample $p_i$ belongs to the current image block and is the outermost sample allowed to be stored in the line buffer associated with the CTB boundary. For example, the number of times the sample $p_i$ is used as a padded value is 2, then the filter coefficient associated with the sample $p_i$ of the current image block is 3, because the sample $p_i$ itself is also counted.

In a possible implementation form according to any preceding implementation of the seventh or eighth aspect or the seventh or eighth aspect as such, wherein when the line buffer has the line buffer size of 2 lines, the sample $p_i$ is the sample $p_1$, and the filter coefficient associated with the sample $p_1$ is 3.

In a possible implementation form according to any preceding implementation of the seventh or eighth aspect or the seventh or eighth aspect as such, when the current image block is a luma block and SA is equal to or greater than 32, MA=3, wherein SA is the height of the current image block;
or
when the current image block is a luma block and SA is equal to or greater than 16, MA=3, wherein SA is the height of the current image block.

In a possible implementation form according to any preceding implementation of the seventh or eighth aspect or the seventh or eighth aspect as such, when the current image block is a luma block and SA is equal to or greater than 32, DA=4, wherein SA is the height of the current image block;
or
when the current image block is a luma block and SA is equal to or greater than 16, DA=4, wherein SA is the height of the current image block.

In a possible implementation form according to any preceding implementation of the seventh or eighth aspect or the seventh or eighth aspect as such, when the current image block is a chroma block and SA is equal to or greater than 8, MA=1,
wherein SA is the height of the current image block.

In a possible implementation form according to any preceding implementation of the seventh or eighth aspect or the seventh or eighth aspect as such, when the current image block is a chroma block and SA is equal to or greater than 8, DA=2,
wherein SA is the height of the current image block.

In a possible implementation form according to any preceding implementation of the seventh or eighth aspect or the seventh or eighth aspect as such, wherein when the current image block is a chroma block, the de-blocking filter is configured to determine whether the horizontal block edge is overlapped with a horizontal chroma CTB boundary; or
when the current image block is a luma block, the de-blocking is configured to determine whether the horizontal block edge is overlapped with a horizontal luma CTB boundary.

In a possible implementation form according to any preceding implementation of the seventh or eighth aspect or the seventh or eighth aspect as such, wherein samples $p_i$ of the current image block are luma samples, or the samples $p_i$ of the current image block are chroma samples, wherein i belongs to $\{0, 1, 2, \ldots, SA-1\}$.

In a possible implementation form according to any preceding implementation of the seventh or eighth aspect or the seventh or eighth aspect as such, wherein the current image block is a transform block; or
the current image block is a coding block.

According to a ninth aspect of the invention, a device for use in an image encoder and/or an image decoder, for deblocking block edges between image blocks is provided, wherein the block edges comprises a horizontal block edge between a current image block and a neighboring image block of the current image block, wherein the current image block is above the horizontal block edge;

wherein the current image block has a block size SA along a vertical direction, the vertical direction being perpendicular to the horizontal block edge, wherein the device comprises a de-blocking filter configured to: in the case that the horizontal block edge is overlapped with a horizontal coding tree block (CTB) boundary (or in response to determining that the horizontal block edge is overlapped with a horizontal coding tree block (CTB) boundary), modify values of at most MA samples of the current image block as first filter output values, wherein the at most MA samples are obtained from a column of the current image block that is perpendicular to and adjacent to the horizontal block edge, and use values of at most DA samples of the current image block as first filter decision values, wherein the at most DA samples are obtained from a column of the current image block that is perpendicular to and adjacent to the horizontal block edge, wherein when the current image block is a luma block and SA is equal to or greater than 32, MA=3 and DA=4.

According to a tenth aspect of the invention, a device for use in an image encoder and/or an image decoder, for deblocking block edges between image blocks is provided, wherein the block edges comprises a horizontal block edge between a current image block and a neighboring image block of the current image block, wherein the current image block is above the horizontal block edge;

wherein the current image block has a block size SA along a vertical direction, the vertical direction being perpendicular to the horizontal block edge, wherein the device comprises a de-blocking filter configured to: in the case that the horizontal block edge is overlapped with a horizontal coding tree block (CTB) boundary (or in response to determining that the horizontal block edge is overlapped with a horizontal coding tree block (CTB) boundary), modify values of at most MA samples of the current image block as first filter output values, wherein the at most MA samples are obtained from a column of the current image block that is perpendicular to and adjacent to the horizontal block edge, and use values of at most DA samples of the current image block as first filter decision values, wherein the at most DA samples are obtained from a column of the current image block that is perpendicular to and adjacent to the horizontal block edge, wherein when the current image block is a chroma block and SA is equal to or greater than 8, MA=1 and DA=2.

According to an eleventh aspect of the invention, a deblocking method, for deblocking block edges between image blocks in an image encoding and/or an image decoding is provided, wherein the block edges comprises a horizontal block edge between a current image block and a neighboring image block of the current image block, wherein the current image block is above the horizontal block edge;

wherein the current image block has a block size SA along a vertical direction, the vertical direction being perpendicular to the horizontal block edge, wherein the method comprises: in the case that the horizontal block edge is overlapped with a horizontal coding tree block (CTB) boundary (or in response to determining that the horizontal block edge is overlapped with a horizontal coding tree block (CTB) boundary), modifying values of at most MA samples of the current image block as first filter output values, wherein the at most MA samples are obtained from a column of the current image block that is perpendicular to and adjacent to the horizontal block edge, and using values of at most DA samples of the current image block as first filter decision values, wherein the at most DA samples are obtained from a column of the current image block that is perpendicular to and adjacent to the horizontal block edge, wherein when the current image block is a luma block and SA is equal to or greater than 32, MA=3 and DA=4.

According to a twelfth aspect of the invention, a deblocking method, for deblocking block edges between image blocks in an image encoding and/or an image decoding is provided, wherein the block edges comprises a horizontal block edge between a current image block and a neighboring image block of the current image block, wherein the current image block is above the horizontal block edge;

wherein the current image block has a block size SA along a vertical direction, the vertical direction being perpendicular to the horizontal block edge, wherein the method comprises: in the case that the horizontal block edge is overlapped with a horizontal coding tree block (CTB) boundary (or in response to determining that the horizontal block edge is overlapped with a horizontal coding tree block (CTB) boundary), modifying values of at most MA samples of the current image block as first filter output values, wherein the at most MA samples are obtained from a column of the current image block that is perpendicular to and adjacent to the horizontal block edge, and using values of at most DA samples of the current image block as first filter decision values, wherein the at most DA samples are obtained from a column of the current image block that is perpendicular to and adjacent to the horizontal block edge, wherein when the current image block is a chroma block and SA is equal to or greater than 8, MA=1 and DA=2.

It is noted that Modified filter condition to use the restricted number of lines from the top block "P".

wherein the filter coefficients are determined in such a way that sample $p_i$, which belongs to the first coding block P and which is the outermost sample allowed to be stored in the line buffer, is used as a padded value which replaces the other samples which belongs to the first coding block P and which are outside the line buffer.

It can be understood that the samples which are allowed to be stored in memory from the top CTU is called as the line buffer. In the present disclosure, the line buffer, for example may be a 4 line buffer or 6 line buffer. Line buffer size is the amount of pixels which need to store in the memory for CTU based decoding (e.g. hardware decoders).

The line buffer size for the luma component is 4 lines and for the chroma component is 2 lines.

Thus it is allowed to reduce line buffer at CTU boundaries for the deblocking filter (such as a long tap filter) by padding the samples which are outside the line buffer by the outermost sample present in the line buffer.

On deblocking (e.g., luma deblocking or chroma deblocking), the deblocking filter is applied to samples at either one side of a boundary belong to a large block. A sample belonging to a large block may be defined as when the width>=32 for a vertical edge, and when height>=32 for a horizontal edge.

The samples on each side of a block boundary (perpendicular to the block boundary) may be represented as:

. . . p8 p7 p6 p5 p4 p3 p2 p1 p0|q0 q1 q2 q3 q4 q5 q6 q7 q8 . . .

where | represents the block boundary or block edge, for example, | represents a horizontal boundary or horizontal edge overlapping with a CTU boundary.

where $p_i$ represent the sample values of the first coding block P (short for block P), and $q_i$ represent the sample values of the second coding block Q (short for block Q).

The filer condition and filter equations can be derived using the same logic as described in the existing technology.

According to another aspect of the invention, a video encoding apparatus is provided. the video encoding apparatus (100) for encoding a picture of a video stream, wherein the video encoding apparatus (100) comprises:

a reconstruction unit (114) configured to reconstruct the picture; and a device (120) as previously described for processing the reconstructed picture into a filtered reconstructed picture.

This allows for a very efficient and accurate encoding of the image.

According to another aspect of the invention, a video decoding apparatus is provided. the video decoding apparatus (200) for decoding a picture of an encoded video stream (303), wherein the video decoding apparatus (200) comprises:

a reconstruction unit (214) configured to reconstruct the picture; and a device (220) as previously described for processing the reconstructed picture into a filtered reconstructed picture.

This allows for an especially accurate and efficient decoding of the image.

In an example, the first filter (i.e. a long tap filter or an asymmetric filter or an asymmetric tap filter) is a filter which uses 4 samples of top block for filter decision on one side of the block edge (such as the horizontal block edge overlapping with a coding tree unit (CTU) boundary) and uses 8 samples of below block for filter decision on the other side of the block edge, and 3 samples of top block are modified on one side of the block edge (CU edge) while 7 samples of below block are modified on other side of the block edge (CU edge).

This allows for an especially accurate and efficient deblocking.

According to another aspect the invention relates to an encoding method for encoding an image, comprising a previously or later shown deblocking method.

This allows for a very efficient and accurate encoding of the image.

According to another aspect the invention relates to a decoding method for decoding an image, comprising a previously or later shown deblocking method.

This allows for a very efficient and accurate decoding of the image.

The method according to the fourth aspect of the invention can be performed by the apparatus according to the first aspect of the invention. Further features and implementation forms of the method according to the fourth aspect of the invention result directly from the functionality of the apparatus according to the first aspect of the invention and its different implementation forms.

The method according to the eighth aspect of the invention can be performed by the apparatus according to the seventh aspect of the invention. Further features and implementation forms of the method according to the eleventh aspect of the invention result directly from the functionality of the apparatus according to the seventh aspect of the invention and its different implementation forms.

According to another aspect the invention relates to an apparatus for decoding a video stream includes a processor and a memory. The memory is storing instructions that cause the processor to perform the deblocking method according to any preceding implementation of the any preceding aspect or the any preceding aspect as such.

According to another aspect the invention relates to an apparatus for encoding a video stream includes a processor and a memory. The memory is storing instructions that cause the processor to perform the deblocking method according to any preceding implementation of the any preceding aspect or the any preceding aspect as such.

According to another aspect, a computer-readable storage medium having stored thereon instructions that when executed cause one or more processors configured to code video data is proposed. The instructions cause the one or more processors to perform the deblocking method according to any preceding implementation of the any preceding aspect or the any preceding aspect as such.

According to another aspect, a computer program product with a program code for performing the deblocking method according to any preceding implementation of the any preceding aspect or the any preceding aspect as such when the computer program runs on a computer, is provided.

Details of one or more embodiments are set forth in the accompanying drawings and the description below. Other features, objects, and advantages will be apparent from the description, drawings, and claims.

BRIEF DESCRIPTION OF THE DRAWINGS

In the following embodiments of the invention are described in more detail with reference to the attached figures and drawings, in which.

Figure 1:
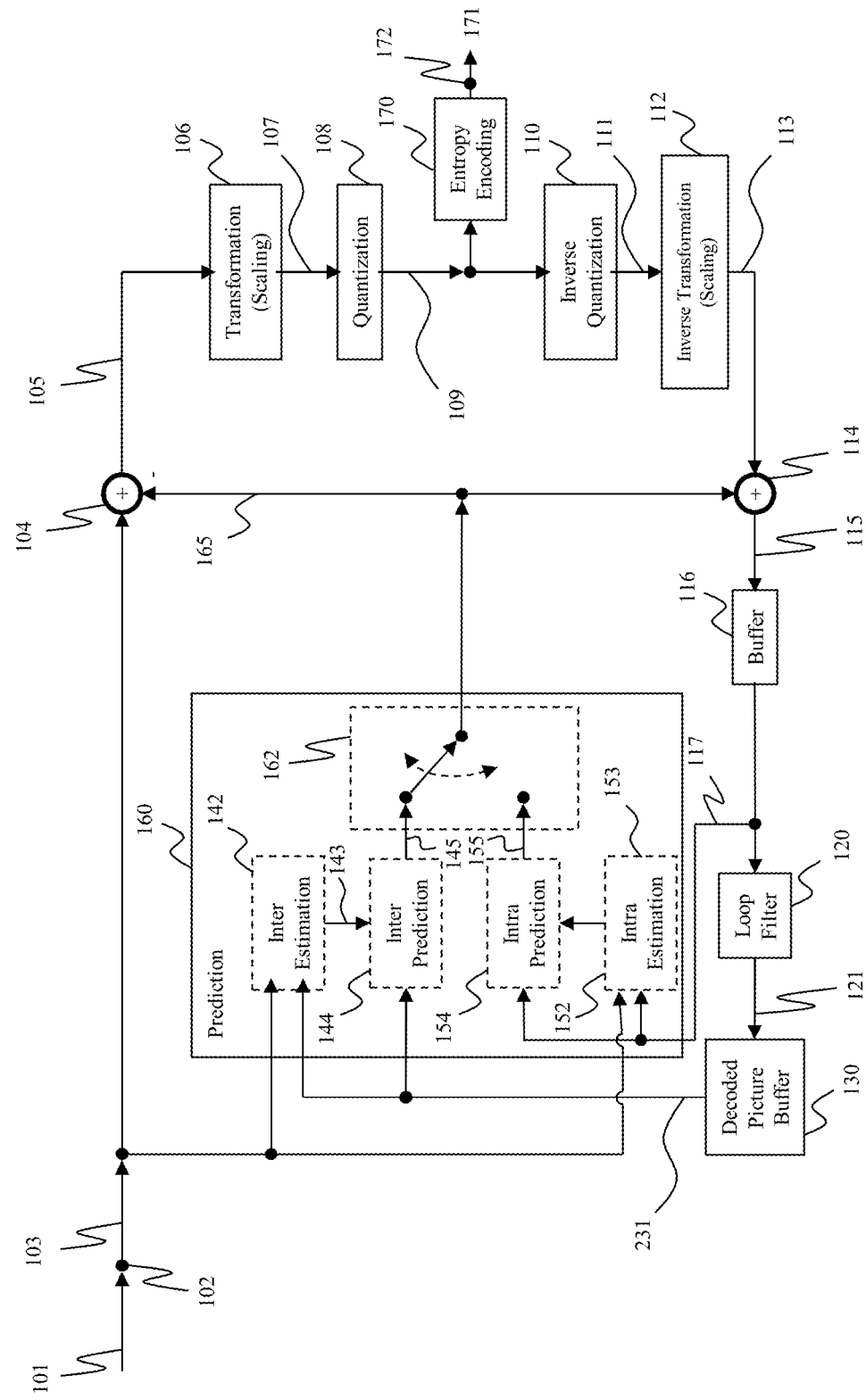
FIG. 1 is a block diagram showing an example of a video encoder configured to implement embodiments of the invention.

In the following, identical reference signs refer to identical or at least functionally equivalent features. In part, different reference signs referring to the same entities have been used in different figures.

DETAILED DESCRIPTION OF THE EMBODIMENTS

In the following description, reference is made to the accompanying figures, which form part of the disclosure, and which show, by way of illustration, specific aspects of embodiments of the invention or specific aspects in which embodiments of the present invention may be used. It is understood that embodiments of the invention may be used in other aspects and comprise structural or logical changes not depicted in the figures. The following detailed description, therefore, is not to be taken in a limiting sense, and the scope of the present invention is defined by the appended claims.

For instance, it is understood that a disclosure in connection with a described method may also hold true for a corresponding device or system configured to perform the method and vice versa. For example, if one or a plurality of specific method steps are described, a corresponding device may include one or a plurality of units, e.g. functional units, to perform the described one or plurality of method steps (e.g. one unit performing the one or plurality of steps, or a plurality of units each performing one or more of the plurality of steps), even if such one or more units are not explicitly described or illustrated in the figures. On the other hand, for example, if a specific apparatus is described based on one or a plurality of units, e.g. functional units, a corresponding method may include one step to perform the functionality of the one or plurality of units (e.g. one step performing the functionality of the one or plurality of units, or a plurality of steps each performing the functionality of one or more of the plurality of units), even if such one or plurality of steps are not explicitly described or illustrated in the figures. Further, it is understood that the features of the various exemplary embodiments and/or aspects described herein may be combined with each other, unless specifically noted otherwise.

Video coding typically refers to the processing of a sequence of pictures, which form the video or video sequence. Instead of the term "picture," the terms "frame" or "image" may be used as synonyms in the field of video coding. Video coding comprises two parts, video encoding and video decoding. Video encoding is performed at the source side, typically comprising processing (e.g. by compression) the original video pictures to reduce the amount of data required for representing the video pictures (for more efficient storage and/or transmission). Video decoding is performed at the destination side and typically comprises the inverse processing compared to the encoder to reconstruct the video pictures. Embodiments referring to "coding" of video pictures (or pictures in general, as will be explained later) shall be understood to relate to both, "encoding" and "decoding" of video pictures. The combination of the encoding part and the decoding part is also referred to as CODEC (COding and DECoding).

In case of lossless video coding, the original video pictures can be reconstructed, i.e. the reconstructed video pictures have the same quality as the original video pictures (assuming no transmission loss or other data loss during storage or transmission). In case of lossy video coding, further compression, e.g. by quantization, is performed, to reduce the amount of data representing the video pictures, which cannot be completely reconstructed at the decoder, i.e. the quality of the reconstructed video pictures is lower or worse compared to the quality of the original video pictures.

Several video coding standards since H.261 belong to the group of "lossy hybrid video codecs" (i.e. combine spatial and temporal prediction in the sample domain and 2D transform coding for applying quantization in the transform domain). Each picture of a video sequence is typically partitioned into a set of non-overlapping blocks and the coding is typically performed on a block level. In other words, at the encoder the video is typically processed, i.e. encoded, on a block (video block) level, e.g. by using spatial (intra picture) prediction and temporal (inter picture) prediction to generate a prediction block, subtracting the prediction block from the current block (block currently processed/to be processed) to obtain a residual block, transforming the residual block and quantizing the residual block in the transform domain to reduce the amount of data to be transmitted (compression). At the decoder, the inverse processing compared to the process at the encoder is applied to the encoded or compressed block to reconstruct the current block for representation. Furthermore, the encoder duplicates the decoder processing loop such that both will generate identical predictions (e.g. intra- and inter predictions) and/or re-constructions for processing, i.e. coding, the subsequent blocks.

As video picture processing (also referred to as moving picture processing) and still picture processing (the term processing comprising coding), share many concepts and technologies or tools, in the following the term "picture" is used to refer to a video picture of a video sequence (as explained above) and/or to a still picture to avoid unnecessary repetitions and distinctions between video pictures and still pictures, where not necessary. In case the description refers to still pictures (or still images) only, the term "still picture" shall be used.

In the following embodiments of an encoder 100, a decoder 200 and a coding system 300 are described based on FIGS. 1 to 3 before describing embodiments of the invention in more detail based on FIGS. 4-19.

Figure 3:
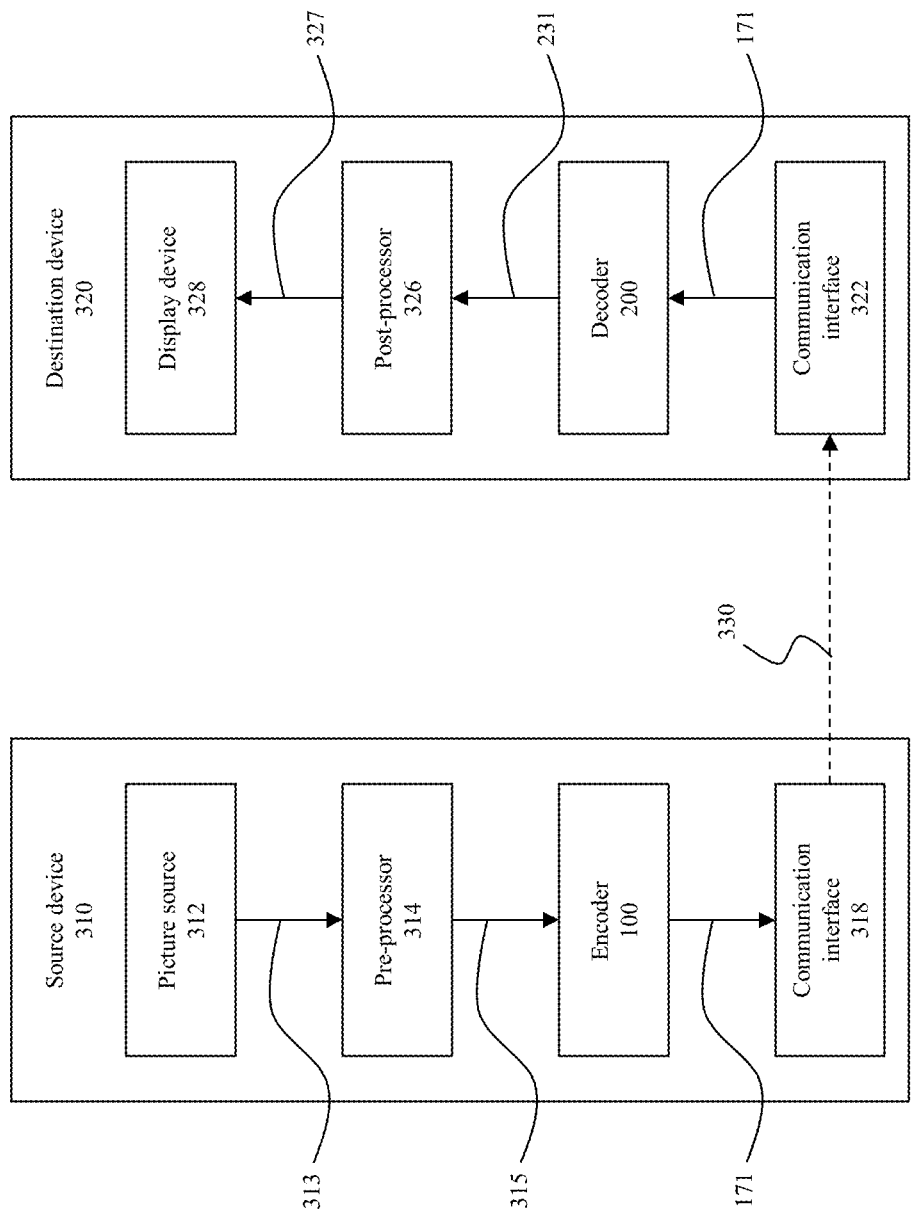
FIG. 3 is a block diagram showing an example of a video coding system configured to implement embodiments of the invention.

FIG. 3 is a conceptional or schematic block diagram illustrating an embodiment of a coding system 300, e.g. a picture coding system 300, wherein the coding system 300 comprises a source device 310 configured to provide encoded data 330, e.g. an encoded picture 330, e.g. to a destination device 320 for decoding the encoded data 330.

The source device 310 comprises an encoder 100 or encoding unit 100, and may additionally, i.e. optionally, comprise a picture source 312, a pre-processing unit 314, e.g. a picture pre-processing unit 314, and a communication interface or communication unit 318.

The picture source 312 may comprise or be any kind of picture capturing device, for example for capturing a real-world picture, and/or any kind of a picture generating device, for example a computer-graphics processor for generating a computer animated picture, or any kind of device for obtaining and/or providing a real-world picture, a computer animated picture (e.g. a screen content, a virtual reality (VR) picture) and/or any combination thereof (e.g. an augmented reality (AR) picture). In the following, all these kinds of pictures and any other kind of picture will be referred to as "picture" or "image", unless specifically described otherwise, while the previous explanations with regard to the term "picture" covering "video pictures" and "still pictures" still hold true, unless explicitly specified differently.

A (digital) picture is or can be regarded as a two-dimensional array or matrix of samples with intensity values. A sample in the array may also be referred to as pixel (short form of picture element) or a pel. The number of samples in horizontal and vertical direction (or axis) of the array or picture define the size and/or resolution of the picture. For representation of color, typically three color components are employed, i.e. the picture may be represented or include three sample arrays. In RGB format or color space a picture comprises a corresponding red, green and blue sample array. However, in video coding each pixel is typically represented in a luminance/chrominance format or color space, e.g. YCbCr, which comprises a luminance component indicated by Y (sometimes also L is used instead) and two chrominance components indicated by Cb and Cr. The luminance (or short luma) component Y represents the brightness or grey level intensity (e.g. like in a grey-scale picture), while the two chrominance (or short chroma) components Cb and Cr represent the chromaticity or color information components. Accordingly, a picture in YCbCr format comprises a luminance sample array of luminance sample values (Y), and two chrominance sample arrays of chrominance values (Cb and Cr). Pictures in RGB format may be converted or transformed into YCbCr format and vice versa, the process is also known as color transformation or conversion. If a picture is monochrome, the picture may comprise only a luminance sample array.

The picture source 312 may be, for example a camera for capturing a picture, a memory, e.g. a picture memory, comprising or storing a previously captured or generated picture, and/or any kind of interface (internal or external) to obtain or receive a picture. The camera may be, for example, a local or integrated camera integrated in the source device, the memory may be a local or integrated memory, e.g. integrated in the source device. The interface may be, for example, an external interface to receive a picture from an external video source, for example an external picture capturing device like a camera, an external memory, or an external picture generating device, for example an external computer-graphics processor, computer or server. The interface can be any kind of interface, e.g. a wired or wireless interface, an optical interface, according to any proprietary or standardized interface protocol. The interface for obtaining the picture data 312 may be the same interface as or a part of the communication interface 318.

In distinction to the pre-processing unit 314 and the processing performed by the pre-processing unit 314, the picture or picture data 313 may also be referred to as raw picture or raw picture data 313.

Pre-processing unit 314 is configured to receive the (raw) picture data 313 and to perform pre-processing on the picture data 313 to obtain a pre-processed picture 315 or pre-processed picture data 315. Pre-processing performed by the pre-processing unit 314 may, e.g., comprise trimming, color format conversion (e.g. from RGB to YCbCr), color correction, or de-noising.

The encoder 100 is configured to receive the pre-processed picture data 315 and provide encoded picture data 171 (further details will be described, e.g., based on FIG. 1).

Communication interface 318 of the source device 310 may be configured to receive the encoded picture data 171 and to directly transmit it to another device, e.g. the destination device 320 or any other device, for storage or direct reconstruction, or to process the encoded picture data 171 for respectively before storing the encoded data 330 and/or transmitting the encoded data 330 to another device, e.g. the destination device 320 or any other device for decoding or storing.

The destination device 320 comprises a decoder 200 or decoding unit 200, and may additionally, i.e. optionally, comprise a communication interface or communication unit 322, a post-processing unit 326 and a display device 328.

The communication interface 322 of the destination device 320 is configured receive the encoded picture data 171 or the encoded data 330, e.g. directly from the source device 310 or from any other source, e.g. a memory, e.g. an encoded picture data memory.

The communication interface 318 and the communication interface 322 may be configured to transmit respectively or receive the encoded picture data 171 or encoded data 330 via a direct communication link between the source device 310 and the destination device 320, e.g. a direct wired or wireless connection, or via any kind of network, e.g. a wired or wireless network or any combination thereof, or any kind of private and public network, or any kind of combination thereof.

The communication interface 318 may be, e.g., configured to package the encoded picture data 171 into an appropriate format, e.g. packets, for transmission over a communication link or communication network, and may further comprise data loss protection and data loss recovery.

The communication interface 322, forming the counterpart of the communication interface 318, may be, e.g., configured to de-package the encoded data 330 to obtain the encoded picture data 171 and may further be configured to perform data loss protection and data loss recovery, e.g. comprising error concealment.

Both, communication interface 318 and communication interface 322 may be configured as unidirectional communication interfaces as indicated by the arrow for the encoded picture data 330 in FIG. 3 pointing from the source device 310 to the destination device 320, or bi-directional communication interfaces, and may be configured, e.g. to send and receive messages, e.g. to set up a connection, to acknowledge and/or re-send lost or delayed data including picture data, and exchange any other information related to the communication link and/or data transmission, e.g. encoded picture data transmission.

The decoder 200 is configured to receive the encoded picture data 171 and provide decoded picture data 231 or a decoded picture 231 (further details will be described, e.g., based on FIG. 2).

The post-processor 326 of destination device 320 is configured to post-process the decoded picture data 231, e.g. the decoded picture 231, to obtain post-processed picture data 327, e.g. a post-processed picture 327. The post-processing performed by the post-processing unit 326 may comprise, e.g. color format conversion (e.g. from YCbCr to RGB), color correction, trimming, or re-sampling, or any other processing, e.g. for preparing the decoded picture data 231 for display, e.g. by display device 328.

The display device 328 of the destination device 320 is configured to receive the post-processed picture data 327 for displaying the picture, e.g. to a user or viewer. The display device 328 may be or comprise any kind of display for representing the reconstructed picture, e.g. an integrated or external display or monitor. The displays may, e.g. comprise cathode ray tubes (CRT), liquid crystal displays (LCD), plasma displays, organic light emitting diodes (OLED) displays or any kind of other display . . . beamer, hologram (3D), . . . .

Although FIG. 3 depicts the source device 310 and the destination device 320 as separate devices, embodiments of devices may also comprise both or both functionalities, the source device 310 or corresponding functionality and the destination device 320 or corresponding functionality. In such embodiments the source device 310 or corresponding functionality and the destination device 320 or corresponding functionality may be implemented using the same hardware and/or software or by separate hardware and/or software or any combination thereof.

As will be apparent for the skilled person based on the description, the existence and (exact) split of functionalities of the different units or functionalities within the source device 310 and/or destination device 320 as shown in FIG. 3 may vary depending on the actual device and application.

Therefore, the source device 310 and the destination device 320 as shown in FIG. 3 are just example embodiments of the invention and embodiments of the invention are not limited to those shown in FIG. 3.

Source device 310 and destination device 320 may comprise any of a wide range of devices, including any kind of handheld or stationary devices, e.g. notebook or laptop computers, mobile phones, smart phones, tablets or tablet computers, cameras, desktop computers, set-top boxes, televisions, display devices, digital media players, video gaming consoles, video streaming devices, broadcast receiver device, or the like. (also servers and work-stations for large scale professional encoding/decoding, e.g. network entities) and may use no or any kind of operating system.

FIG. 1 shows a schematic/conceptual block diagram of an embodiment of an encoder 100, e.g. a picture encoder 100, which comprises an input 102, a residual calculation unit 104, a transformation unit 106, a quantization unit 108, an inverse quantization unit 110, and inverse transformation unit 112, a reconstruction unit 114, a buffer 118, a loop filter 120, a decoded picture buffer (DPB) 130, a prediction unit 160 [an inter estimation unit 142, an inter prediction unit 144, an intra-estimation unit 152, an intra-prediction unit 154,] a mode selection unit 162, an entropy encoding unit 170, and an output 172. A video encoder 100 as shown in FIG. 1 may also be referred to as hybrid video encoder or a video encoder according to a hybrid video codec.

Figure 2:
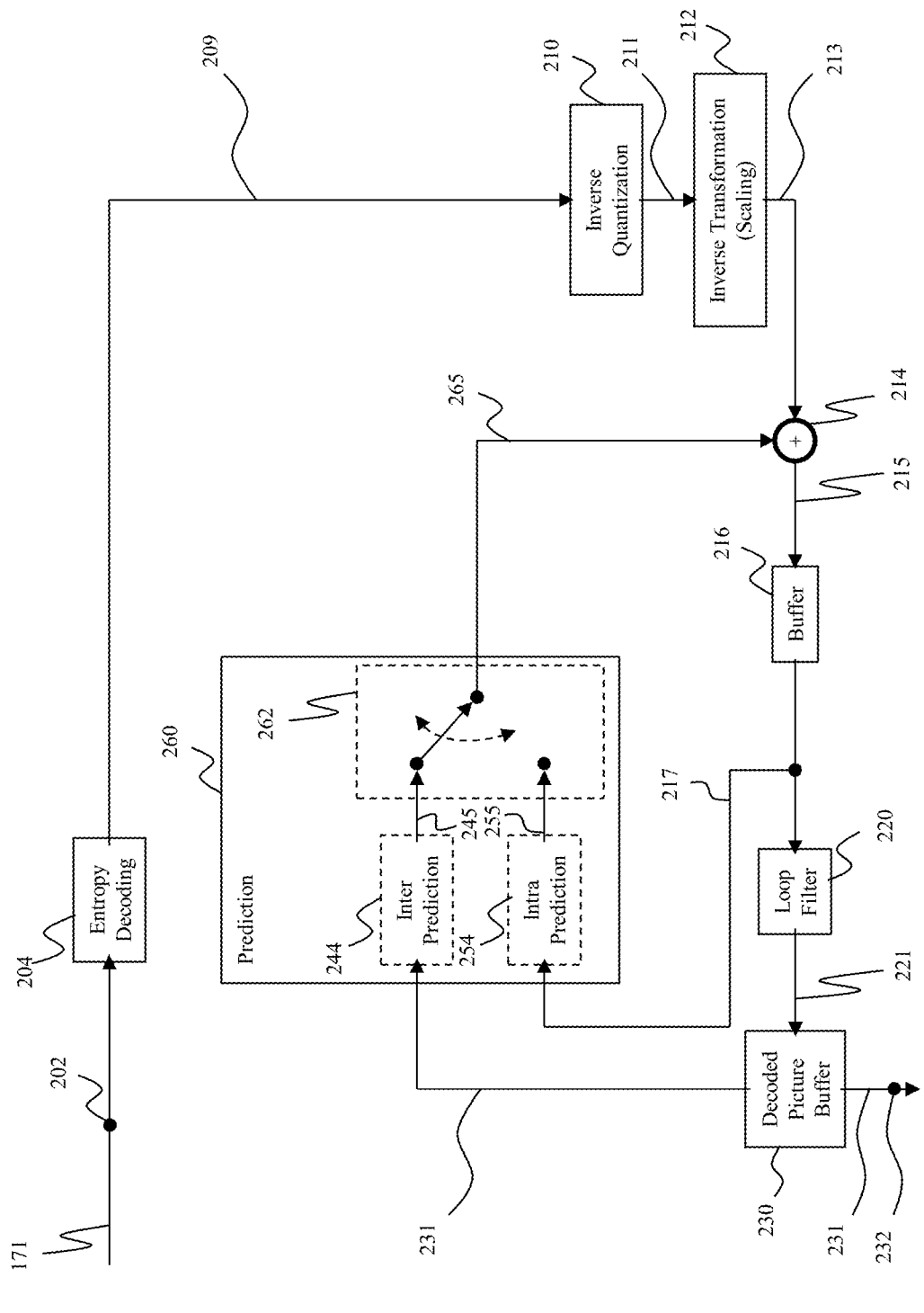
FIG. 2 is a block diagram showing an example structure of a video decoder configured to implement embodiments of the invention.

For example, the residual calculation unit 104, the transformation unit 106, the quantization unit 108, and the entropy encoding unit 170 form a forward signal path of the encoder 100, whereas, for example, the inverse quantization unit 110, the inverse transformation unit 112, the reconstruction unit 114, the buffer 118, the loop filter 120, the decoded picture buffer (DPB) 130, the inter prediction unit 144, and the intra-prediction unit 154 form a backward signal path of the encoder, wherein the backward signal path of the encoder corresponds to the signal path of the decoder (see decoder 200 in FIG. 2).

The encoder is configured to receive, e.g. by input 102, a picture 101 or a picture block 103 of the picture 101, e.g. picture of a sequence of pictures forming a video or video sequence. The picture block 103 may also be referred to as current picture block or picture block to be coded, and the picture 101 as current picture or picture to be coded (in particular in video coding to distinguish the current picture from other pictures, e.g. previously encoded and/or decoded pictures of the same video sequence, i.e. the video sequence which also comprises the current picture).

Embodiments of the encoder 100 may comprise a partitioning unit (not depicted in FIG. 1), e.g. which may also be referred to as picture partitioning unit, configured to partition the picture 103 into a plurality of blocks, e.g. blocks like block 103, typically into a plurality of non-overlapping blocks. The partitioning unit may be configured to use the same block size for all pictures of a video sequence and the corresponding grid defining the block size, or to change the block size between pictures or subsets or groups of pictures, and partition each picture into the corresponding blocks.

Like the picture 101, the block 103 again is or can be regarded as a two-dimensional array or matrix of samples with intensity values (sample values), although of smaller dimension than the picture 101. In other words, the block 103 may comprise, e.g., one sample array (e.g. a luma array in case of a monochrome picture 101) or three sample arrays (e.g. a luma and two chroma arrays in case of a color picture 101) or any other number and/or kind of arrays depending on the color format applied. The number of samples in horizontal and vertical direction (or axis) of the block 103 define the size of block 103.

Encoder 100 as shown in FIG. 1 is configured encode the picture 101 block by block, e.g. the encoding and prediction is performed per block 103.

The residual calculation unit 104 is configured to calculate a residual block 105 based on the picture block 103 and a prediction block 165 (further details about the prediction block 165 are provided later), e.g. by subtracting sample values of the prediction block 165 from sample values of the picture block 103, sample by sample (pixel by pixel) to obtain the residual block 105 in the sample domain.

The transformation unit 106 is configured to apply a transformation, e.g. a spatial frequency transform or a linear spatial transform, e.g. a discrete cosine transform (DCT) or discrete sine transform (DST), on the sample values of the residual block 105 to obtain transformed coefficients 107 in a transform domain. The transformed coefficients 107 may also be referred to as transformed residual coefficients and represent the residual block 105 in the transform domain.

The transformation unit 106 may be configured to apply integer approximations of DCT/DST, such as the core transforms specified for HEVC/H.265. Compared to an orthonormal DCT transform, such integer approximations are typically scaled by a certain factor. In order to preserve the norm of the residual block which is processed by forward and inverse transforms, additional scaling factors are applied as part of the transform process. The scaling factors are typically chosen based on certain constraints like scaling factors being a power of two for shift operation, bit depth of the transformed coefficients, tradeoff between accuracy and implementation costs, etc. Specific scaling factors are, for example, specified for the inverse transform, e.g. by inverse transformation unit 212, at a decoder 200 (and the corresponding inverse transform, e.g. by inverse transformation unit 112 at an encoder 100) and corresponding scaling factors for the forward transform, e.g. by transformation unit 106, at an encoder 100 may be specified accordingly.

The quantization unit 108 is configured to quantize the transformed coefficients 107 to obtain quantized coefficients 109, e.g. by applying scalar quantization or vector quantization. The quantized coefficients 109 may also be referred to as quantized residual coefficients 109. For example for scalar quantization, different scaling may be applied to achieve finer or coarser quantization. Smaller quantization step sizes correspond to finer quantization, whereas larger quantization step sizes correspond to coarser quantization. The applicable quantization step size may be indicated by a quantization parameter (QP). The quantization parameter may for example be an index to a predefined set of applicable quantization step sizes. For example, small quantization parameters may correspond to fine quantization (small quantization step sizes) and large quantization parameters may correspond to coarse quantization (large quantization step sizes) or vice versa. The quantization may include division by a quantization step size and corresponding or de-quantization, e.g. by inverse quantization unit 110, may include multiplication by the quantization step size.

Embodiments according to HEVC or VVC, may be configured to use a quantization parameter to determine the quantization step size. Generally, the quantization step size may be calculated based on a quantization parameter using a fixed point approximation of an equation including division. Additional scaling factors may be introduced for quantization and de-quantization to restore the norm of the residual block, which might be modified because of the scaling used in the fixed point approximation of the equation for quantization step size and quantization parameter. In one example implementation, the scaling of the inverse transform and de-quantization might be combined. Alternatively, customized quantization tables may be used and signaled from an encoder to a decoder, e.g. in a bit-stream. The quantization is a lossy operation, wherein the loss increases with increasing quantization step sizes.

Embodiments of the encoder 100 (or respectively of the quantization unit 108) may be configured to output the quantization scheme and quantization step size, e.g. by means of the corresponding quantization parameter, so that a decoder 200 may receive and apply the corresponding inverse quantization. Embodiments of the encoder 100 (or quantization unit 108) may be configured to output the quantization scheme and quantization step size, e.g. directly or entropy encoded via the entropy encoding unit 170 or any other entropy coding unit.

The inverse quantization unit 110 is configured to apply the inverse quantization of the quantization unit 108 on the quantized coefficients to obtain de-quantized coefficients 111, e.g. by applying the inverse of the quantization scheme applied by the quantization unit 108 based on or using the same quantization step size as the quantization unit 108. The de-quantized coefficients 111 may also be referred to as de-quantized residual coefficients 111 and correspond—although typically not identical to the transformed coefficients due to the loss by quantization—to the transformed coefficients 108.

The inverse transformation unit 112 is configured to apply the inverse transformation of the transformation applied by the transformation unit 106, e.g. an inverse discrete cosine transform (DCT) or inverse discrete sine transform (DST), to obtain an inverse transformed block 113 in the sample domain. The inverse transformed block 113 may also be referred to as inverse transformed de-quantized block 113 or inverse transformed residual block 113.

The reconstruction unit 114 is configured to combine the inverse transformed block 113 and the prediction block 165 to obtain a reconstructed block 115 in the sample domain, e.g. by sample wise adding the sample values of the decoded residual block 113 and the sample values of the prediction block 165.

The buffer unit 116 (or short "buffer" 116), e.g. a line buffer 116, is configured to buffer or store the reconstructed block and the respective sample values, for example for intra estimation and/or intra prediction. In further embodiments, the encoder may be configured to use unfiltered reconstructed blocks and/or the respective sample values stored in buffer unit 116 for any kind of estimation and/or prediction.

Embodiments of the encoder 100 may be configured such that, e.g. the buffer unit 116 is not only used for storing the reconstructed blocks 115 for intra estimation 152 and/or intra prediction 154 but also for the loop filter unit 120 (not shown in FIG. 1), and/or such that, e.g. the buffer unit 116 and the decoded picture buffer unit 130 form one buffer. Further embodiments may be configured to use filtered blocks 121 and/or blocks or samples from the decoded picture buffer 130 (both not shown in FIG. 1) as input or basis for intra estimation 152 and/or intra prediction 154.

The loop filter unit 120 (or short "loop filter" 120), is configured to filter the reconstructed block 115 to obtain a filtered block 121, e.g. by applying a de-blocking sample-adaptive offset (SAO) filter or other filters, e.g. sharpening or smoothing filters or collaborative filters. The filtered block 121 may also be referred to as filtered reconstructed block 121. The loop filter 120 is in the following also referred to as deblocking filter. Further details of the loop filter unit 120 will be described below, e.g., based on FIG. 6 or 7 or FIG. 10 to FIG. 12.

Embodiments of the loop filter unit 120 may comprise (not shown in FIG. 1) a filter analysis unit and the actual filter unit, wherein the filter analysis unit is configured to determine loop filter parameters for the actual filter. The filter analysis unit may be configured to apply fixed pre-determined filter parameters to the actual loop filter, adaptively select filter parameters from a set of predetermined filter parameters or adaptively calculate filter parameters for the actual loop filter.

Embodiments of the loop filter unit 120 may comprise (not shown in FIG. 1) one or a plurality of filters (loop filter components/sub-filters), e.g. one or more of different kinds or types of filters, e.g. connected in series or in parallel or in any combination thereof, wherein each of the filters may comprise individually or jointly with other filters of the plurality of filters a filter analysis unit to determine the respective loop filter parameters, e.g. as described in the previous paragraph.

Embodiments of the encoder 100 (respectively loop filter unit 120) may be configured to output the loop filter parameters, e.g. directly or entropy encoded via the entropy encoding unit 170 or any other entropy coding unit, so that, e.g., a decoder 200 may receive and apply the same loop filter parameters for decoding.

The decoded picture buffer (DPB) 130 is configured to receive and store the filtered block 121. The decoded picture buffer 130 may be further configured to store other previously filtered blocks, e.g. previously reconstructed and filtered blocks 121, of the same current picture or of different pictures, e.g. previously reconstructed pictures, and may provide complete previously reconstructed, i.e. decoded, pictures (and corresponding reference blocks and samples) and/or a partially reconstructed current picture (and corresponding reference blocks and samples), for example for inter estimation and/or inter prediction.

Further embodiments of the invention may also be configured to use the previously filtered blocks and corresponding filtered sample values of the decoded picture buffer 130 for any kind of estimation or prediction, e.g. intra and inter estimation and prediction.

The prediction unit 160, also referred to as block prediction unit 160, is configured to receive or obtain the picture block 103 (current picture block 103 of the current picture 101) and decoded or at least reconstructed picture data, e.g. reference samples of the same (current) picture from buffer 116 and/or decoded picture data 231 from one or a plurality of previously decoded pictures from decoded picture buffer 130, and to process such data for prediction, i.e. to provide a prediction block 165, which may be an inter-predicted block 145 or an intra-predicted block 155.

The mode selection unit 162 may be configured to select a prediction mode (e.g. an intra or inter prediction mode) and/or a corresponding prediction block 145 or 155 to be used as prediction block 165 for the calculation of the residual block 105 and for the reconstruction of the reconstructed block 115.

Embodiments of the mode selection unit 162 may be configured to select the prediction mode (e.g. from those supported by prediction unit 160), which provides the best match or in other words the minimum residual (minimum residual means better compression for transmission or storage), or a minimum signaling overhead (minimum signaling overhead means better compression for transmission or storage), or which considers or balances both. The mode selection unit 162 may be configured to determine the prediction mode based on rate distortion optimization (RDO), i.e. select the prediction mode which provides a minimum rate distortion optimization or which associated rate distortion at least a fulfills a prediction mode selection criterion.

In the following the prediction processing (e.g. prediction unit 160 and mode selection (e.g. by mode selection unit 162) performed by an example encoder 100 will be explained in more detail.

As described above, encoder 100 is configured to determine or select the best or an optimum prediction mode from a set of (pre-determined) prediction modes. The set of prediction modes may comprise, e.g., intra-prediction modes and/or inter-prediction modes.

The set of intra-prediction modes may comprise 32 different intra-prediction modes, e.g. non-directional modes like DC (or mean) mode and planar mode, or directional modes, e.g. as defined in H.264, or may comprise 65 different intra-prediction modes, e.g. non-directional modes like DC (or mean) mode and planar mode, or directional modes, e.g. as defined in H.265.

The set of (or possible) inter-prediction modes depend on the available reference pictures (i.e. previous at least partially decoded pictures, e.g. stored in DBP 230) and other inter-prediction parameters, e.g. whether the whole reference picture or only a part, e.g. a search window area around the area of the current block, of the reference picture is used for searching for a best matching reference block, and/or e.g. whether pixel interpolation is applied, e.g. half/semi-pel and/or quarter-pel interpolation, or not.

Additionally to the above prediction modes, skip mode and/or direct mode may be applied.

The prediction unit 160 may be further configured to partition the block 103 into smaller block partitions or sub-blocks, e.g. iteratively using quad-tree-partitioning (QT), binary-tree partitioning (BT) or triple-tree-partitioning (TT) or any combination thereof, and to perform, e.g. the prediction for each of the block partitions or sub-blocks, wherein the mode selection comprises the selection of the tree-structure of the partitioned block 103 and the prediction modes applied to each of the block partitions or sub-blocks.

The inter estimation unit 142, also referred to as inter picture estimation unit 142, is configured to receive or obtain the picture block 103 (current picture block 103 of the current picture 101) and a decoded picture 231, or at least one or a plurality of previously reconstructed blocks, e.g. reconstructed blocks of one or a plurality of other/different previously decoded pictures 231, for inter estimation (or "inter picture estimation"). E.g. a video sequence may comprise the current picture and the previously decoded pictures 231, or in other words, the current picture and the previously decoded pictures 231 may be part of or form a sequence of pictures forming a video sequence.

The encoder 100 may, e.g., be configured to select a reference block from a plurality of reference blocks of the same or different pictures of the plurality of other pictures and provide a reference picture (or reference picture index, . . . ) and/or an offset (spatial offset) between the position (x, y coordinates) of the reference block and the position of the current block as inter estimation parameters 143 to the inter prediction unit 144. This offset is also called motion vector (MV). The inter estimation is also referred to as motion estimation (ME) and the inter prediction also motion prediction (MP).

The inter prediction unit 144 is configured to obtain, e.g. receive, an inter prediction parameter 143 and to perform inter prediction based on or using the inter prediction parameter 143 to obtain an inter prediction block 145.

Although FIG. 1 shows two distinct units (or steps) for the inter-coding, namely inter estimation 142 and inter prediction 152, both functionalities may be performed as one (inter estimation) requires/comprises calculating an/the inter prediction block, i.e. the or a "kind of" inter prediction 154), e.g. by testing all possible or a predetermined subset of possible inter-prediction modes iteratively while storing the currently best inter prediction mode and respective inter prediction block, and using the currently best inter prediction mode and respective inter prediction block as the (final) inter prediction parameter 143 and inter prediction block 145 without performing another time the inter prediction 144.

The intra estimation unit 152 is configured to obtain, e.g. receive, the picture block 103 (current picture block) and one or a plurality of previously reconstructed blocks, e.g. reconstructed neighbor blocks, of the same picture for intra estimation. The encoder 100 may, e.g., be configured to select an intra prediction mode from a plurality of (predetermined) intra prediction modes and provide it as intra estimation parameter 153 to the intra prediction unit 154.

Embodiments of the encoder 100 may be configured to select the intra-prediction mode based on an optimization criterion, e.g. minimum residual (e.g. the intra-prediction mode providing the prediction block 155 most similar to the current picture block 103) or minimum rate distortion.

The intra prediction unit 154 is configured to determine based on the intra prediction parameter 153, e.g. the selected intra prediction mode 153, the intra prediction block 155.

Although FIG. 1 shows two distinct units (or steps) for the intra-coding, namely intra estimation 152 and intra prediction 154, both functionalities may be performed as one (intra estimation) requires/comprises calculating the intra prediction block, i.e. the or a "kind of" intra prediction 154), e.g. by testing all possible or a predetermined subset of possible intra-prediction modes iteratively while storing the currently best intra prediction mode and respective intra prediction block, and using the currently best intra prediction mode and respective intra prediction block as the (final) intra prediction parameter 153 and intra prediction block 155 without performing another time the intra prediction 154.

The entropy encoding unit 170 is configured to apply an entropy encoding algorithm or scheme (e.g. a variable length coding (VLC) scheme, an context adaptive VLC scheme (CALVC), an arithmetic coding scheme, a context adaptive binary arithmetic coding (CABAC)) on the quantized residual coefficients 109, inter prediction parameters 143, intra prediction parameter 153, and/or loop filter parameters, individually or jointly (or not at all) to obtain encoded picture data 171 which can be output by the output 172, e.g. in the form of an encoded bit-stream 171.

Other structural variations of the video encoder 100 can be used to encode the video stream. For example, a non-transform based encoder 100 can quantize the residual signal directly without the transform processing unit for certain blocks or frames. In another implementation, an encoder 100 can have the quantization unit and the inverse quantization unit combined into a single unit.

FIG. 2 shows an exemplary video decoder 200 configured to receive encoded picture data (e.g. encoded bit-stream) 171, e.g. encoded by encoder 100, to obtain a decoded picture 231.

The decoder 200 comprises an input 202, an entropy decoding unit 204, an inverse quantization unit 210, an inverse transformation unit 212, a reconstruction unit 214, a buffer 216, a loop filter 220, a decoded picture buffer 230, a prediction unit 260, an inter prediction unit 244, an intra prediction unit 254, a mode selection unit 260 and an output 232.

The entropy decoding unit 204 is configured to perform entropy decoding to the encoded picture data 171 to obtain, e.g., quantized coefficients 209 and/or decoded coding parameters (not shown in FIG. 2), e.g. (decoded) any or all of inter prediction parameters 143, intra prediction parameter 153, and/or loop filter parameters.

In embodiments of the decoder 200, the inverse quantization unit 210, the inverse transformation unit 212, the reconstruction unit 214, the buffer 216, the loop filter 220, the decoded picture buffer 230, the prediction unit 260 and the mode selection unit 260 are configured to perform the inverse processing of the encoder 100 (and the respective functional units) to decode the encoded picture data 171.

In particular, the inverse quantization unit 210 may be identical in function to the inverse quantization unit 110, the inverse transformation unit 212 may be identical in function to the inverse transformation unit 112, the reconstruction unit 214 may be identical in function reconstruction unit 114, the buffer 216 may be identical in function to the buffer 116, the loop filter 220 may be identical in function to the loop filter 120 (with regard to the actual loop filter as the loop filter 220 typically does not comprise a filter analysis unit to determine the filter parameters based on the original image 101 or block 103 but receives (explicitly or implicitly) or obtains the filter parameters used for encoding, e.g. from entropy decoding unit 204), and the decoded picture buffer 230 may be identical in function to the decoded picture buffer 130.

The prediction unit 260 may comprise an inter prediction unit 244 and an inter prediction unit 254, wherein the inter prediction unit 244 may be identical in function to the inter prediction unit 144, and the inter prediction unit 254 may be identical in function to the intra prediction unit 154. The prediction unit 260 and the mode selection unit 262 are typically configured to perform the block prediction and/or obtain the predicted block 265 from the encoded data 171 only (without any further information about the original image 101) and to receive or obtain (explicitly or implicitly) the prediction parameters 143 or 153 and/or the information about the selected prediction mode, e.g. from the entropy decoding unit 204.

The decoder 200 is configured to output the decoded picture 230, e.g. via output 232, for presentation or viewing to a user.

Although embodiments of the invention have been primarily described based on video coding, it should be noted that embodiments of the encoder 100 and decoder 200 (and correspondingly the system 300) may also be configured for still picture processing or coding, i.e. the processing or coding of an individual picture independent of any preceding or consecutive picture as in video coding. In general only inter-estimation 142, inter-prediction 144, 244 are not available in case the picture processing coding is limited to a single picture 101. Most if not all other functionalities (also referred to as tools or technologies) of the video encoder 100 and video decoder 200 may equally be used for still pictures, e.g. partitioning, transformation (scaling) 106, quantization 108, inverse quantization unit 110, inverse transformation 112, intra-estimation 142, intra-prediction 154, 254 and/or loop filtering 120, 220, and entropy coding 170 and entropy decoding 204.

The present invention deals with the inner workings of the deblocking filter, also referred to as loop filter in FIG. 1 and FIG. 2. Further details of the loop filter unit 120, 220 will be described below, e.g., with respect to FIG. 4 to FIG. 19.

Video coding schemes such as H.264/AVC, HEVC and VVC are designed along the principle of block-based hybrid video coding. Using this principle, a picture is first partitioned into blocks and then each block is predicted by using intra-picture or inter-picture prediction. These blocks are coded relatively from the neighboring blocks and approximate the original signal with some degree of similarity. Since coded blocks only approximate the original signal, the difference between the approximations may cause discontinuities at the prediction and transform block boundaries. These discontinuities are attenuated by the deblocking filter. HEVC replaces the macroblock structure of H.264/AVC with the concept of coding tree unit (CTU) of maximum size of 64×64 pixels. The CTU can further be partitioned into a quadtree-decomposition scheme into smaller coding units (CU), which can be subdivided down to a minimum size of 8×8 pixels. HEVC also introduces the concepts of prediction blocks (PB) and Transform blocks (TB).

In HEVC two filters are defined in deblocking filter: the normal filter and the strong filter. The normal filter modifies at most two samples on both sides of an edge. In the strong filter, three additional checking between the samples along the edge and some pre-defined threshold are evaluated. If all of those checking are true then the strong filter is applied. The strong filter has a more intensive smoothing effect for samples along the edge and can modify at most three samples on both sides of an edge.

A new video codec: Versatile Video Coding (VVC) aims a compression capability that significantly exceeds that of the current HEVC standard (including its current extensions and near-term extensions for screen content coding and high-dynamic-range coding). The VVC Test Model (VTM) uses a new partitioning block structure scheme called as Quadtree plus binary tree plus triple tree (QTBTTT).

The QTBTTT structure removes the concepts of multiple partition types i.e. removes the separation of coding units (CU), prediction units (PU) and transform units (TU). Therefore CU=PU=TU. QTBTTT supports more flexible CU partition shapes wherein a CU can have either square or rectangular shape. The minimum width and height of a CU can be 4 samples and the sizes of the CU can also be 4×N or N×4 where N can take values in the range [4, 8, 16, 32]. Furthermore, the largest CTU size has been increased to 128×128 pixels, which is 4 times larger than the CTU size in HEVC.

For rectangle CUs, the distortion close to the shorter edge can be obvious which results in block artifact even when the HEVC strong filter is applied. The block artifact can also be observed along the edge of large CUs, where distortion are significant due to larger prediction and transform operations.

A long tap deblocking filter have now been used to remove blocking artifacts belonging to larger blocks (e.g. larger luma blocks or larger chroma blocks). Especially for the larger blocks (such as transform units (TU), prediction units (PU), coding blocks (CB)), the deblocking filtering (such as, Luma and Chroma deblocking) can be challenging while line buffer requirement at horizontal CTB (or CTU) boundaries has to be considered, such as, line buffer requirement for the long tap deblocking filter at horizontal CTB (or CTU) boundaries has to be considered.

Figure 4A:
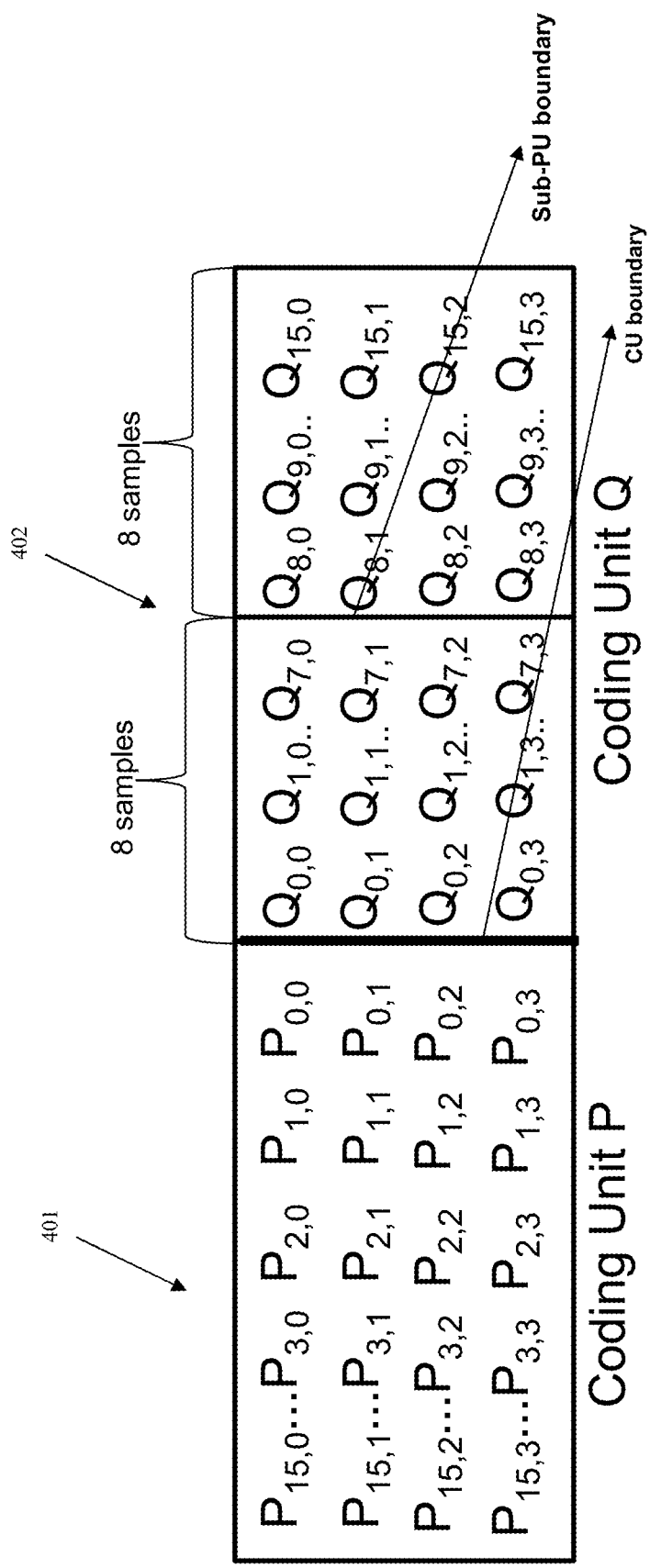
FIG. 4A shows two exemplary coding blocks in which coding block Q uses sub-PU tools.

A deblocking filter operation (with Quadtree plus binary tree plus triple tree (QTBTTT) partitioning) for vertical boundaries is depicted in FIG. 4A.

Figure 4B:
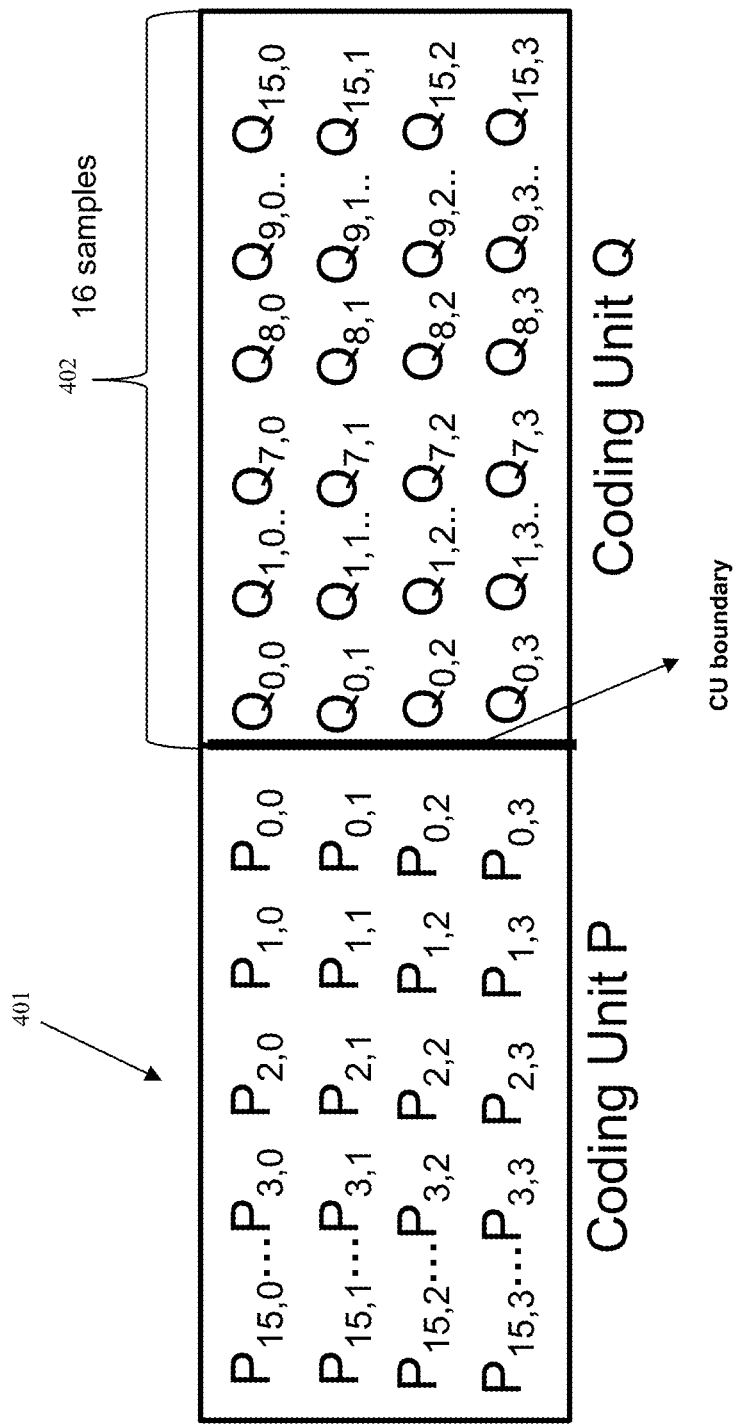
FIG. 4B shows two exemplary coding blocks in which a horizontal block edge between two coding blocks P and Q.

A deblocking filter operation (with Quadtree plus binary tree plus triple tree (QTBTTT) partitioning) for horizontal boundaries is depicted in FIG. 4B.

A long tap filter is a filter which uses more than 4 samples on either side of the edge for performing filter decisions and the actual filter operations. Please note that HEVC deblocking filter only uses a maximum of 4 samples for filter decision and filter operation.

Figure 16A:
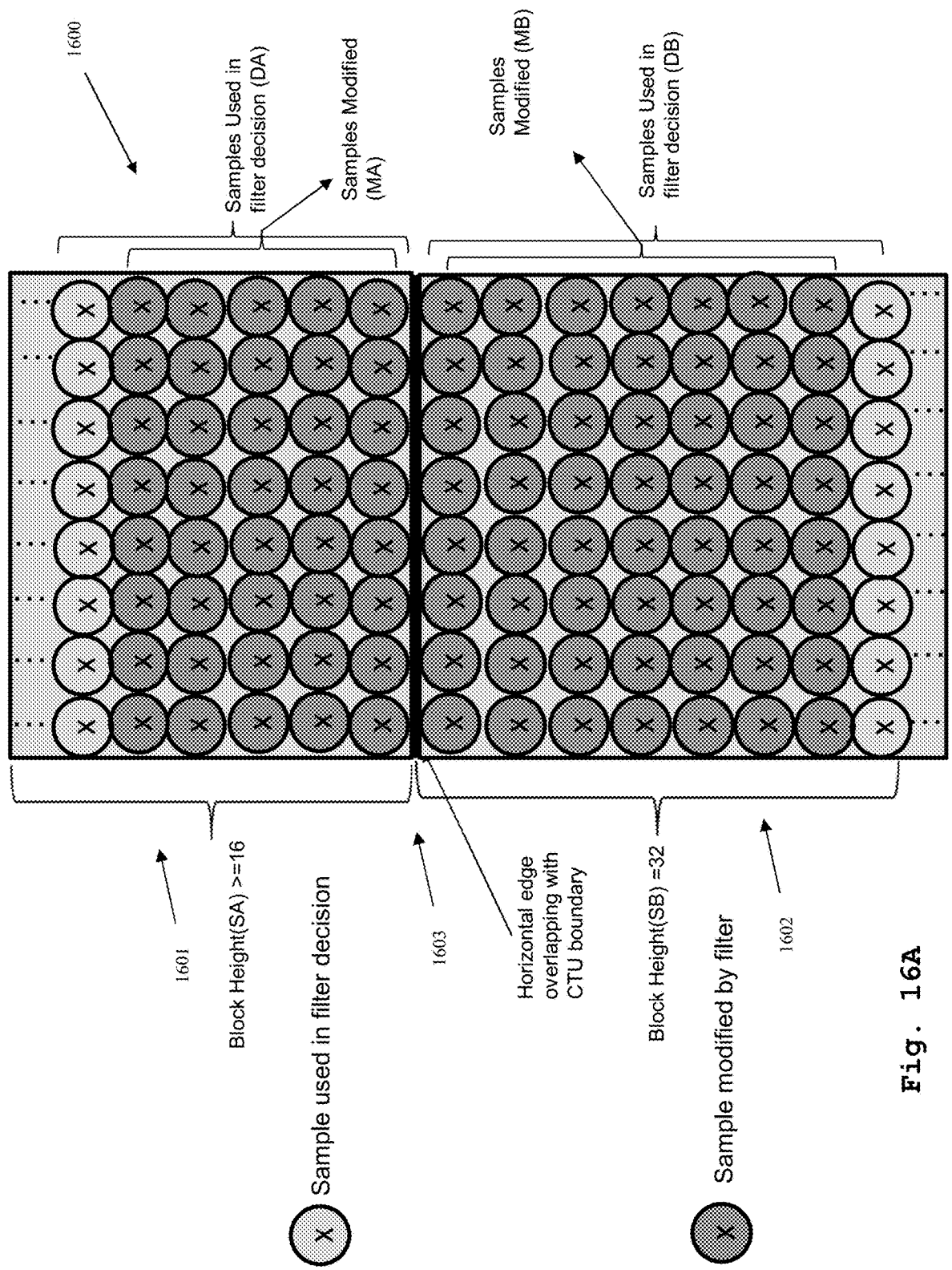
FIG. 16A shows a horizontal edge overlapping at CTU boundary according to an exemplary embodiment.

The problem with application of "long tap filter" while line buffer requirements have to be met in shown in the FIG. 4B. Coding blocks 401, 402 also referred to as P, Q are two CUs, the size of the CU's are 4×16 samples. In another example, as shown in FIG. 16A, the Coding block P (i.e. a first coding block) has a block height>=16 and the Coding block Q (i.e. a second coding block) has a block height=32.

When the horizontal block edge (marked in thick black line, such as luma block edge) is filtered, then a maximum of 7 samples on either side of the block edge are modified. Therefore the samples $P_{0,0}$ up to $P_{6,0}$ are modified, and/or the samples $Q_{0,0}$ up to $Q_{6,0}$ are modified. However, in the case that the horizontal block edge overlaps with the CTB boundary, a tradeoff needs to be derived based on the line buffer requirements and the subjective quality. Using an asymmetric long tap filter gives a better tradeoff when compared to turning off the long tap filter completely at the horizontal CTB boundaries. Asymmetric long tap filter is further defined as follows: Asymmetric long tap filter uses different number of taps on either side of the edge for making filter decision and filtering operations. For e.g. on one side of the edge only 4 taps may be used, but on the other side of the edge, up to 8 samples can be used.

In the present disclosure, the problem of how to perform the deblocking filtering of horizontal (EDGE_HOR) edge with optimal subjective quality when the available line buffer is limited can be solved by an approach as shown in FIG. 9, FIGS. 10 to 12, FIG. 15 to FIG. 18.

The aspect to be taken into account is where the respective block edge lies with regard to the encoded image. Especially, if the presently filtered block edge is aligned with a coding tree block (CTB) boundary (or a coding tree unit (CTU) boundary), and is a horizontal block edge, the number of filter input values and filter output values greatly influences the amount of line memory for performing the encoding. This is indicated in FIG. 15.

Figure 15:
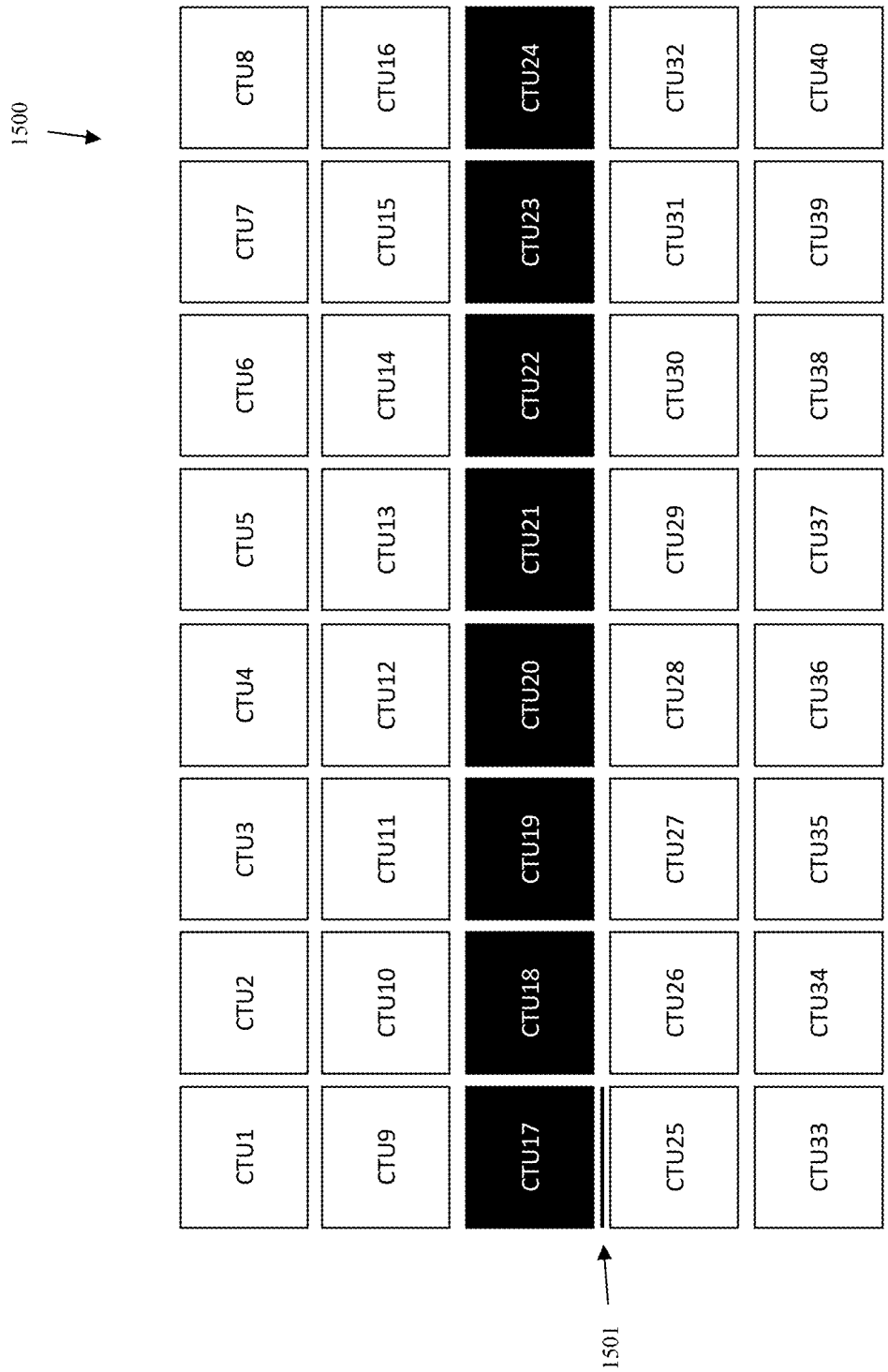
FIG. 15 shows an image 1500 comprising a number of coding tree units CTU1-CTU40.

FIG. 15 shows an image 1500 comprising a number of coding tree units CTU1-CTU40. Each coding tree unit has for example 256×256 sample values. If a long-tap filtering is to be performed, in an example, eight sample values along the encoding block edges may be considered for determining the filter output values. Since the coding units CTU1-CTU40 are processed successively, this can lead to an extremely high amount of necessary line memory.

Consider a deblocking filtering of a block edge 1501 indicated in FIG. 15. Here, the block edge 1501 was drawn along the entire width of the coding units CTU17 and CTT25. In practice though, the coding block size will be significantly smaller, since a coding is not performed on the coding tree unit scale.

Since the coding tree units CTU1-CTU40 are processed successively, in order to perform a deblocking of the code block edge 1501, it is necessary to keep the entire lower horizontal border region of the coding tree units CTU17-CTU24 within the line memory. In the example shown here, with eight coding tree units CTU17-CTU24 and a width of 256 samples of each of the coding units, and eight relevant sample values as filter input values, a memory size of 8×256×8=16,384 samples line memory is necessary. For each horizontal coding block edge, this problem arises. It is especially problematic for the coding tree unit CTU9, CTU17, CTU25 and CTU33, since in any of these cases, the entire horizontal border region of the previous row of coding tree units needs to be kept in the line memory. This is further depicted in FIG. 9 and FIG. 16A, 16*b* or 17 or 18.

It is noted that the line buffer issue comes for horizontal boundary overlapped with CTU boundary. The present disclosure focuses on horizontal boundaries overlapping with CTB (or CTU) boundaries, especially filtering for horizontal edges overlapping with CTB boundaries with X lines available in the line buffer.

For example, the present disclosure focuses on horizontal boundaries overlapping with CTB (or CTU) boundaries, especially filtering for horizontal edges overlapping with CTB boundaries with 6 lines available in the line buffer.

Basically the asymmetric long tap filter (basically it uses different number of samples or taps on either side of the edge for performing filtering operations and decisions) is applied to not violate the line buffer.

In an example, the line buffer may be 4 lines (like in HEVC). In another example, the line buffer may be 6 lines, i.e. 6 line buffers. In particular, for luma blocks, the line buffer may be 4 lines (like in HEVC). In another example, the line buffer may be 6 lines, i.e. 6 line buffers.

Figure 9:
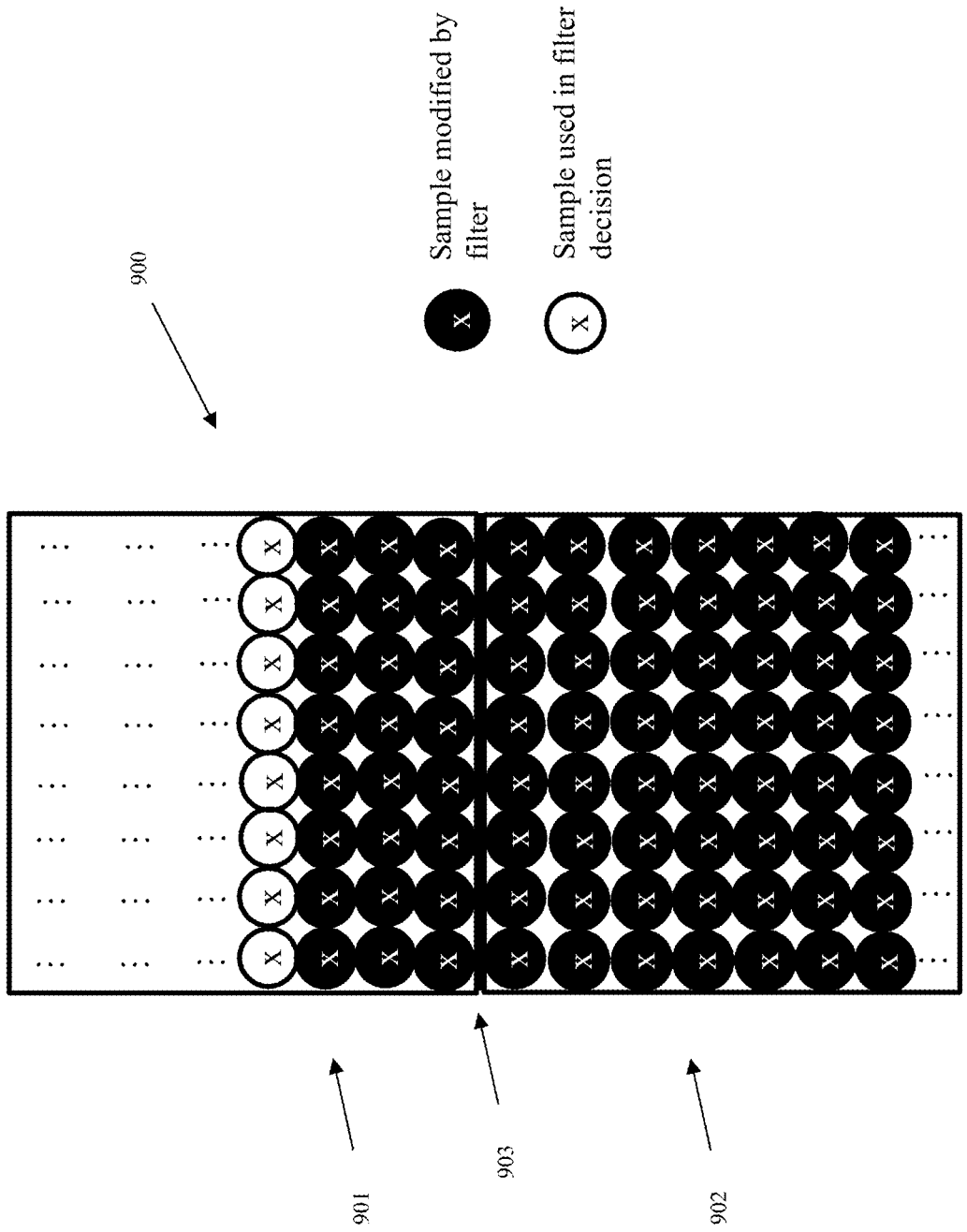
FIG. 9 shows two exemplary coding blocks and sample values used and modified during filtering according to another embodiment of the invention.

FIG. 9 shows line buffer size of 4 lines. In FIG. 9, an image 900 comprising two blocks 901, 902 is shown. A block edge 903 divides the blocks 901 and 902. According to an example, when the horizontal block edge 903 overlaps with a CTB boundary, wherein the first coding block P is the block 901 above the CTB boundary and the second coding block Q is the block 902 below the CTB boundary; MA=3, DA=4. Here, MA is the number of samples modified during the filtering process for the block (such as block 901) above the horizontal CTB boundary and DA is the number of samples used in the filter decision for the block (such as block 901) above the horizontal CTB boundary. In other words, MA can be understood as the maximum filter length of the block (such as block 901) above the horizontal CTB boundary.

Figure 17:
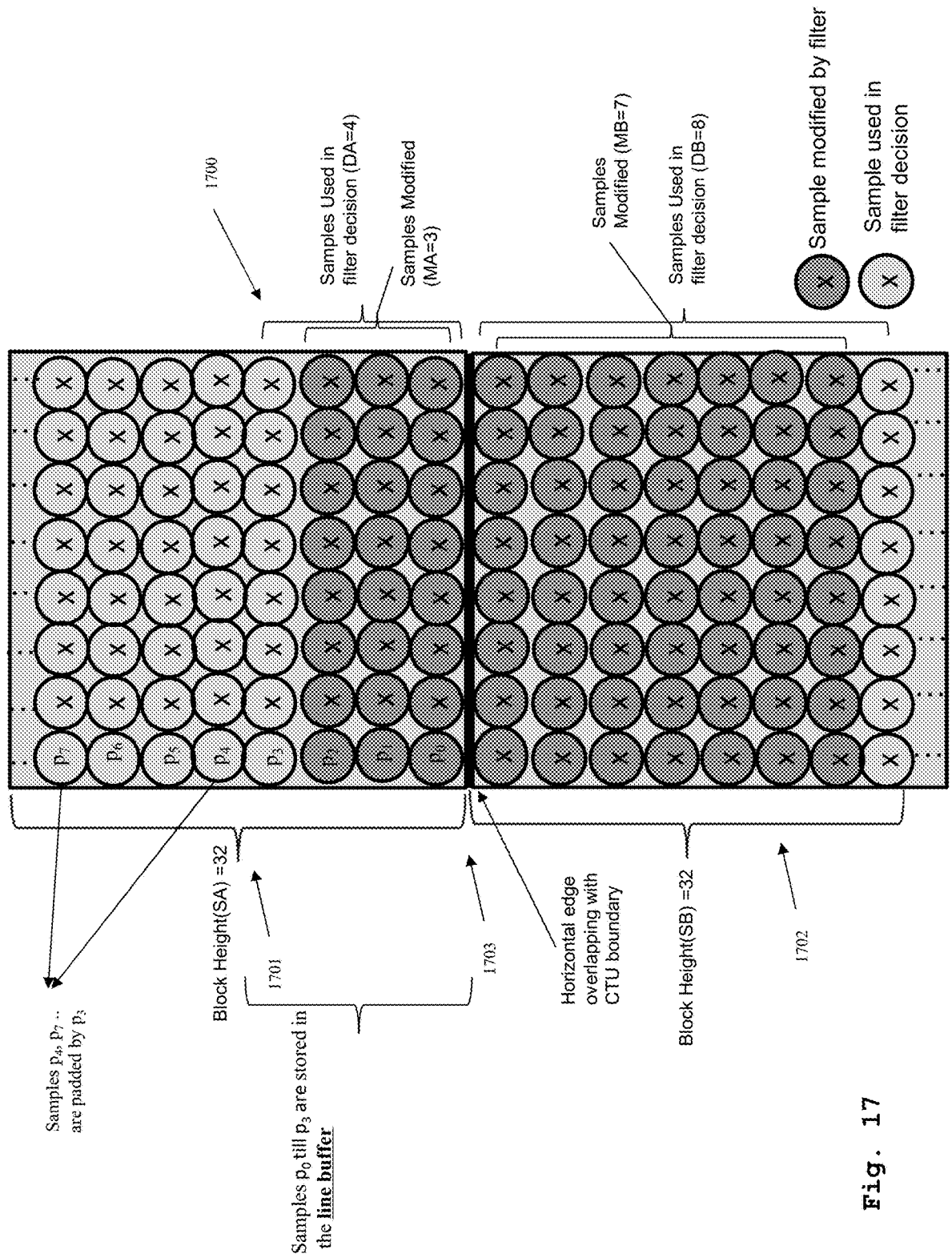
FIG. 17 shows a horizontal edge overlapping at a horizontal Luma CTB boundary according to another exemplary embodiment when a line buffer (such as 4 line buffer) is applied.

FIG. 17 also shows line buffer size of 4 lines. In FIG. 17, when 4 lines are allowed to be used as the line buffer size, e.g. at CTB boundaries for the top block, 3 samples are modified during filter modification; 4 samples are used in the filter decision; i.e. MA=3 and DA=4. e.g. at CTB boundaries for the below block, 7 samples are modified during filter modification; 8 samples are used in the filter decision; i.e. MB=7 and DB=8.

Figure 16B:
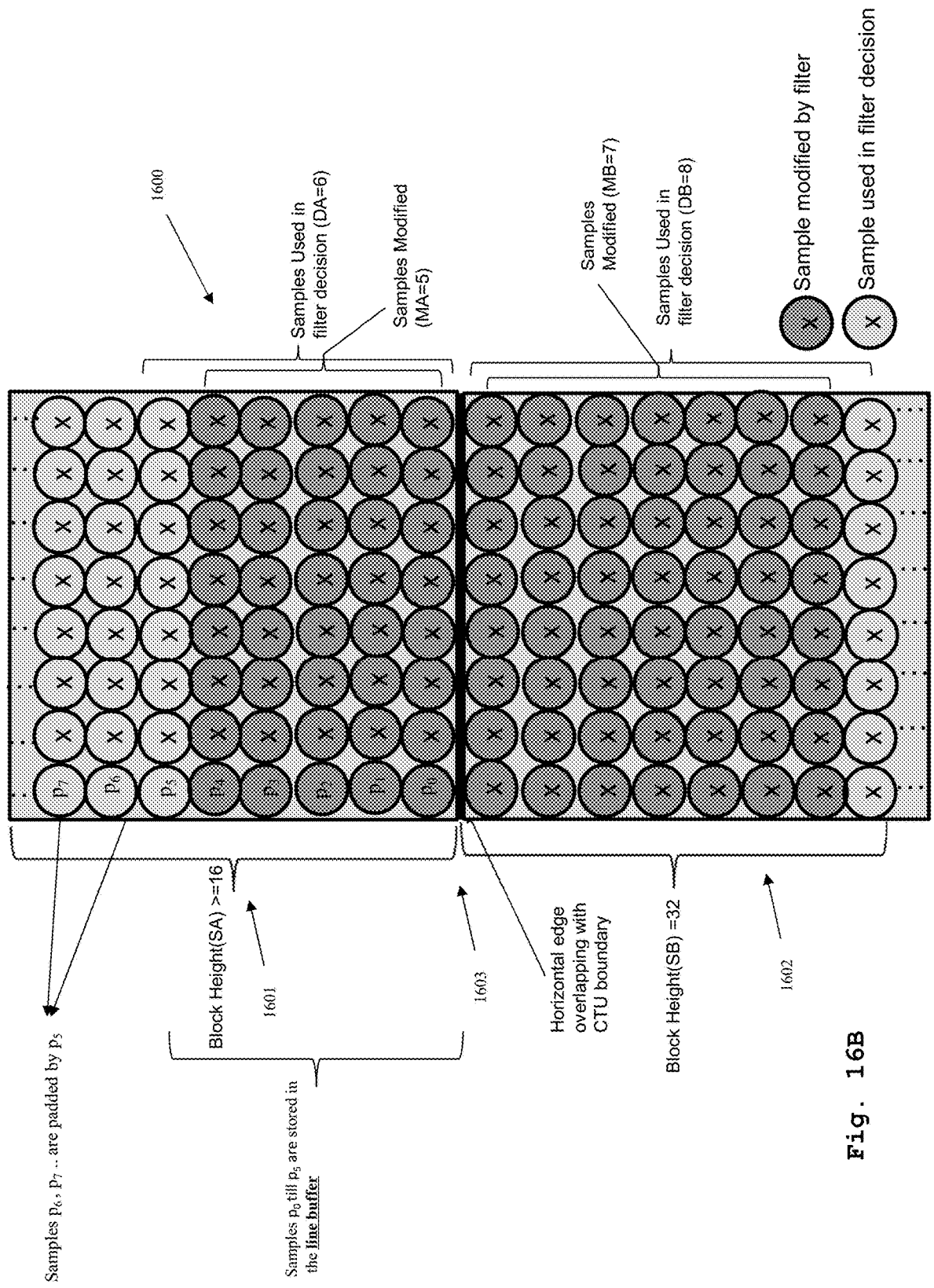
FIG. 16B shows a horizontal edge overlapping at a horizontal Luma CTB boundary according to another exemplary embodiment when a line buffer (such as 6 line buffer) is applied.

FIG. 16A or 16B shows an example with the line buffer size of 6 lines. In FIG. 16A or 16B, an image 1600 comprising two blocks 1601, 1602 is shown. A block edge 1603 divides the blocks 1601 and 1602. According to an example, when the horizontal block edge 1603 overlaps with a coding tree block (CTB) boundary, wherein the first coding block (such as a first luma block) P is the block 1601 above the CTU boundary 1603 and the second coding block (such as a second luma block) Q is the block 1602 below the CTB boundary 1603, for horizontal edges overlapping at CTB boundary, DA<DB and MA<MB may be set to reduce line buffer further. Here, DB is the number of samples used in the filter decision for the coding block below the horizontal CTU boundary, and the MB is the number of samples modified in the filtering process for the coding block below the horizontal CTU boundary. In other words, MB can be understood as a maximum filter length for the coding block (such as block 902) below the horizontal CTU boundary.

As shown in FIG. 16A or 16B, when 6 lines are allowed to be used as the line buffer size, e.g. at CTB boundaries for the top block, 5 samples are modified during filter modification; 6 samples are used in the filter decision (the decision process for outputting filtering related parameter, such as a maximum filter length); i.e. MA=5 and DA=6.

In an example, a filter for horizontal edges overlapping with CTB boundaries with 6 lines available is described in the following table:

| Output pixel | Filter coefficients $\{p_7, p_6, p_5, p_4, p_3, p_2, p_1, p_0, q_0, q_1, q_2, q_3, q_4, q_5, q_6, q_7\}$ | Input pixels |
| --- | --- | --- |
| $p_4$ | {0, 0, 6, 3, 1, 1, 1, 1, 1, 1, 0, 0, 0, 0, 0} | $p_5$~$q_2$ |
| $p_3$ | {0, 0, 5, 1, 3, 1, 1, 1, 1, 1, 1, 0, 0, 0, 0} | $p_5$~$q_3$ |
| $p_2$ | {0, 0, 4, 1, 1, 3, 1, 1, 1, 1, 1, 1, 0, 0, 0} | $p_5$~$q_4$ |
| $p_1$ | {0, 0, 3, 1, 1, 1, 3, 1, 1, 1, 1, 1, 1, 0, 0} | $p_5$~$q_5$ |

| Output pixel | Filter coefficients $\{p_7, p_6, p_5, p_4, p_3, p_2, p_1, p_0, q_0, q_1, q_2, q_3, q_4, q_5, q_6, q_7\}$ | Input pixels |
|---|---|---|
| $p_0$ | {0, 0, 3, 1, 1, 1, 1, 2, 1, 1, 1, 1, 1, 1, 1, 0} | $p_5 \sim q_6$ |
| $q_0$ | {0, 0, 2, 1, 1, 1, 1, 1, 2, 1, 1, 1, 1, 1, 1, 1} | $p_5 \sim q_7$ |
| $q_1$ | {0, 0, 1, 1, 1, 1, 1, 1, 1, 3, 1, 1, 1, 1, 1, 1} | $p_5 \sim q_7$ |
| $q_2$ | {0, 0, 0, 1, 1, 1, 1, 1, 1, 1, 3, 1, 1, 1, 1, 2} | $p_4 \sim q_7$ |
| $q_3$ | {0, 0, 0, 0, 1, 1, 1, 1, 1, 1, 1, 3, 1, 1, 1, 3} | $p_3 \sim q_7$ |
| $q_4$ | {0, 0, 0, 0, 0, 1, 1, 1, 1, 1, 1, 1, 3, 1, 1, 4} | $p_2 \sim q_7$ |
| $q_5$ | {0, 0, 0, 0, 0, 0, 1, 1, 1, 1, 1, 1, 1, 3, 1, 5} | $p_1 \sim q_7$ |
| $q_6$ | {0, 0, 0, 0, 0, 0, 0, 1, 1, 1, 1, 1, 1, 1, 3, 6} | $p_0 \sim q_7$ |

From the table, the number of the output samples p0 to p4 of the block P is MA which is equal to 5. For each of the output samples p0 to p4, the number of the input samples $p_5$, $p_4$, $p_3$, $p_2$, $p_1$, $p_0$ of the block P is DA which is equal to 6.

In another example, the first filter output values $p_i'$ and the second filter output values $q_i'$ for i=0 to S-1 are formulated as follows:

$$p_i' = (f_i * \text{Middle}_{s,t} + (64 - f_i) * P_s + 32) >> 6), \text{ clipped to } p_i \pm \text{tcPD}_i$$

$$q_i' = (g_i * \text{Middle}_{s,t} + (64 - g_i) * Q_s + 32) >> 6), \text{ clipped to } q_i \pm \text{tcPD}_i$$

wherein $\text{tcPD}_i$ is a position dependent clipping parameter, $g_i$, $\text{Middle}_{s,t}$, $P_s$ and $Q_s$ depend on S;

$p_i$ represents the sample value of the first coding block P; and $q_i$ represents the sample value of the second coding block Q;

wherein S=MA for the first coding block P, i.e. at most a number of the samples which can be modified in each column of the first image block that is perpendicular to and adjacent to the horizontal block edge, or S=MB for the second coding block Q, i.e. the at most a number of the samples which can be modified in each column of the second image block Q that is perpendicular to and adjacent to the horizontal block edge.

When the line buffer size X=6, $g_i$, $f_i$, $\text{Middle}_{s,t}$, $P_s$ and $Q_s$ depends on S as follows:

| 5,7 (S(=MA)=5 for the first image block P, S(=MB)=7 for the second image block Q) | $f_i = 59 - i * 9$, can also be described as $f = \{59,50,41,32,23,14,5\}$ $g_i = 59 - i * 9$, can also be described as $g = \{59,50,41,32,23,14,5\}$ $\text{Middle}_{7,7} = (2 * (p_o + q_o) + p_1 + q_1 + p_2 + q_2 + p_3 + q_3 + p_4 + q_4 + p_5 + q_5 + p_5 + q_6 + 8) >> 4$ $P_7 = (p_5 + p_5 + 1) >> 1, Q_7 = (q_6 + q_7 + 1) >> 1$ |
|---|---|
| 5,3 (S(=MA)=5 for the first image block P, S(=MB)=3 for the second image block Q) | $f_i = 59 - i * 9$, can also be described as $f = \{59,50,41,32,23,14,5\}$ $g_i = 53 - i * 21$, can also be described as $g = \{53,32,11\}$ $\text{Middle}_{7,3} = (2 * (p_o + q_o) + q_0 + 2 * (q_1 + q_2) + p_1 + q_1 + p_2 + p_3 + p_4 + p_5 + p_5 + 8) >> 4$ $P_7 = (p_5 + p_5 + 1) >> 1, Q_3 = (q_2 + q_3 + 1) >> 1$ |
| 3,7 (S(=MA)=3 for the first image block P, S(=MB)=7 for the second image block Q) | $g_i = 59 - i * 9$, can also be described as $g = \{59,50,41,32,23,14,5\}$ $f_i = 53 - i * 21$, can also be described as $f = \{53,32,11\}$ $\text{Middle}_{3,7} = (2 * (q_o + p_o) + p_0 + 2 * (p_1 + p_2) + q_1 + p_1 + q_2 + q_3 + q_4 + q_5 + q_6 + 8) >> 4$ $Q_7 = (q_6 + q_7 + 1) >> 1, P_3 = (p_2 + p_3 + 1) >> 1$ | if a size of a line buffer (e.g. line buffer size) is X (i.e. the line buffer has the line buffer size of X lines), then for the first coding block P, DA=X and MA=X-1; and the sample $p_i$ of the first coding block P is used as a padded value which replaces the other samples which belongs to the first coding block P and which are outside the line buffer, wherein if the line buffer size is X, then i=X-1. Here, the sample $p_i$ is the outermost sample allowed to be stored in the line buffer.

For example, denote a column of samples of the first coding block P above the horizontal boundary as $[p_0, p_1, p_2, p_3, p_4, p_5, p_6, p_7, \ldots]$ (as illustrated in FIG. 4B). If the line buffer size is 4 i.e. x=4, then i=3. Therefore $p_3$ is used to pad or replace all the other samples which are the outside the line buffer, i.e. samples $p_4, p_5 \ldots$. In an another example, if the allowed line buffer size is 6, i.e. x=6, then i=5. Therefore $p_5$ is used as the sample to pad all the other samples which are the outside the line buffer, i.e. samples $p_6, p_7 \ldots$ are replaced by $p_5$.

Alternatively, when the line buffer size X=4, $g_i$, $f_i$, $\text{Middle}_{s,t}$, $P_s$ and $Q_s$ depends on S as follows:

| 3,7 (S(=MA)=3 for the first coding block P, S(=MB)=7 for the second coding block Q) | $g_i = 59 - i * 9$, can also be described as $g = \{59,50,41,32,23,14,5\}$ $f_i = 53 - i * 21$, can also be described as $f = \{53,32,11\}$ $\text{Middle}_{3,7} = (2 * (q_o + p_o) + p_0 + 2 * (p_1 + p_2) + q_1 + p_1 + q_2 + q_3 + q_4 + q_5 + q_6 + 8) >> 4$ $Q_7 = (q_6 + q_7 + 1) >> 1, P_3 = (p_2 + p_3 + 1) >> 1$ |
|---|---|

Furthermore, for horizontal edges overlapping at CTB boundary, when DA<DB and MA<MB, the line buffer size can be reduced.

In an example, DB=8 and DA=6, MB=7 and MA=5.
In an example, DB=8 and DA=7, MB=7 and MA=6.
In an example, DB=8 and DA=5, MB=7 and MA=4.
In an example, DB=8 and DA=4, MB=7 and MA=3.

Figure 6:
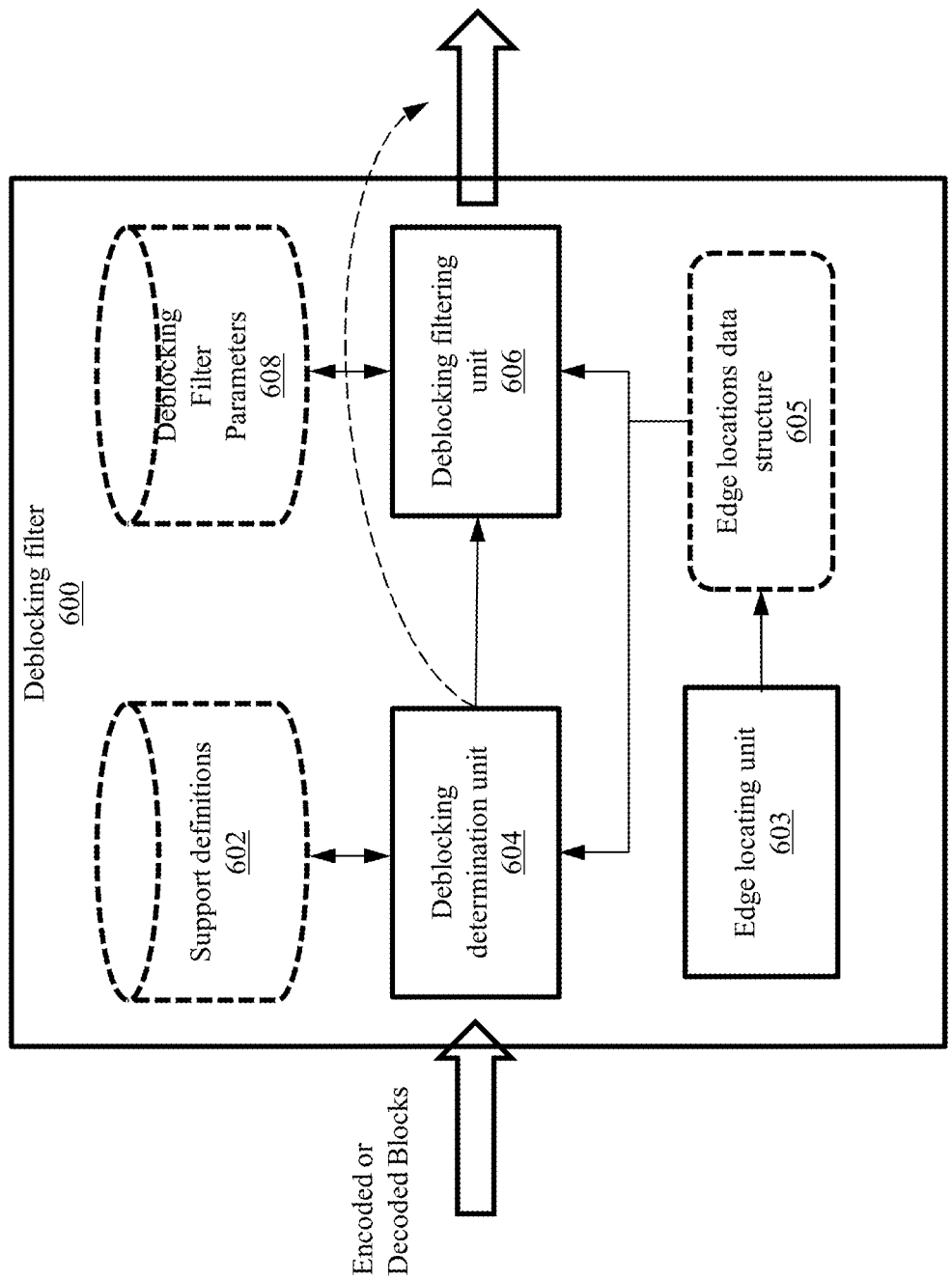
FIG. 6 shows a first embodiment of the deblocking filter according to embodiments of the invention.

Reference with FIG. 6, according to an aspect of the disclosure, a deblocking filter apparatus is provided. The deblocking filter apparatus can be used in an image encoder and/or an image decoder. The deblocking filter apparatus comprises:

an edge locating unit 603, configured to determine edges between blocks, wherein the edges between blocks comprises a horizontal block edge (e.g. CU edge or CU boundary) between a first coding block P and a second coding block Q, and the horizontal block edge overlaps with a coding tree block (CTB) boundary, wherein the first coding block P is a block above the CTB boundary and the second coding block Q is another block below the CTB boundary;

a deblocking determination unit 604, configured to determine whether the horizontal block edge between the first coding block P and the second coding block Q is to be filtered by applying a first filter (i.e. a long tap filter or an asymmetric filter or an asymmetric tap filter or an HEVC deblocking filter) based upon:
- at most DA sample values of the first coding block, adjacent to the horizontal block edge, as first filter decision values and
- at most DB sample values of the second coding block, adjacent to the horizontal block edge, as second filter decision values; wherein DA≠DB or DA<DB, DA is equal to a line buffer size;
- a deblocking filtering unit 606, configured to apply the first filter (i.e. a long tap filter or an asymmetric filter or an asymmetric tap filter or an HEVC deblocking filter) to values of samples near the horizontal block edge between the first coding block P and the second coding block Q, when it is determined that the horizontal block edge between the first coding block P and the second coding block Q is to be filtered by applying the first filter.

In some embodiments, if a size of a line buffer (e.g. line buffer size) is X (i.e. the line buffer has the line buffer size of X lines), then for the first coding block P, DA=X. The sample $p_i$ of the first coding block P is used as a padded value to replace the other samples which belong to the first coding block P and which are outside the line buffer. If the line buffer size is X, then i=X−1.

In some embodiments, at most MA sample values of a column (such as each column) of the first coding block that is perpendicular to and adjacent to the horizontal block edge are modified and at most MB sample values of a column (such as each column) of the second coding block that is perpendicular to and adjacent to the horizontal block edge are modified; wherein MA≠MB or MA<MB.

In some embodiments, if the size of a line buffer (e.g. line buffer size) is X (i.e. the line buffer has the line buffer size of X lines), then for the first coding block P, MA=X−1; and the sample $p_i$ of the first coding block P is used as a padded value to replace the other samples which belong to the first coding block P and which are outside the line buffer. If the line buffer size is X, then i=X−1.

In some embodiments, DB=8, DA=6, MB=7, and MA=5.

In some embodiments, when a size of a line buffer (e.g. line buffer size) is 6, at most L lines from the first coding block P is allowed to be used for filtering decision, and L=6.

In some embodiments, when a 6-line buffer (e.g. a line buffer with the line buffer size being 6) is applied, the deblocking determination unit 604 is configured to determine whether an extended filter condition equation $sp_3' = (sp_3 + Abs(p_5 - p_3) + 1) >> 1$ is satisfied. It can be understood that x>>y is defined, i.e. arithmetic right shift of a two's complement integer representation of x by y binary digits. This function is defined only for non-negative integer values of y. Bits shifted into the most significant bits (MSBs) as a result of the right shift have a value equal to the MSB of x prior to the shift operation.

When one or more filter condition equations comprising the extended filter condition equation are satisfied, the first filter is applied for sample values of the first coding block P, adjacent to the horizontal block edge overlapping with the CTU boundary;

wherein $sp_3 = Abs(p_3 - p_0)$, and $p_i$ represent the sample value of the first coding block P used in filter decision, i=0, 1, 2, 3, 4 or 5.

In some embodiments, when a 6-line buffer is applied and the second coding block Q with the block size SB>=a predefined size (such as 32), the deblocking determination unit 604 is configured to determine whether an extended filter condition equation $sq_3' = (sq_3 + Abs(q_7 - q_3) + 1) >> 1$ is satisfied.

When one or more filter condition equations comprising the extended filter condition equation are satisfied, the first filter is applied for sample values of the second coding block Q, adjacent to the horizontal block edge overlapping with the CTU boundary. Here, $sq_3 = Abs(q_0 - q_3)$, and $q_i$ represent the sample value of the second coding block Q used in filter decision, i=0, 1, 2, 3, 4 . . . or 7.

In some embodiments, when a 4-line buffer is applied, the deblocking determination unit 604 is configured to determine whether an extended filter condition equation $sp_3' = sp_3 + Abs(p_3 - p_0) + 1) >> 1$ is satisfied When one or more filter condition equations comprising the extended filter condition equation are satisfied, the first filter is applied for sample values of the first coding block P, adjacent to the horizontal block edge overlapping with the CTU boundary. Here, $spa = Abs(p_3 - p_0)$, and $p_i$ represent the sample value of the first coding block P used in filter decision, i=0, 1, 2 or 3.

In some embodiments, the deblocking filtering unit 606 is configured to determine the first filter output values $p_i'$ and the second filter output values $q_i'$ for i=0 to S−1 on the basis of the following equation:

$$p_i' = (f_i * Middle_{s,t} + (64 - f_i) * P_s + 32) >> 6), \text{ clipped to } p_i \pm tcPD_i$$

$$q_i' = (g_i * Middle_{s,t} + (64 - g_i) * Q_s + 32) >> 6), \text{ clipped to } q_i \pm tcPD_i$$

wherein $tcPD_i$ is a position dependent clipping parameter; $g_i$, $f_i$, $Middle_{s,t}$, $P_s$ and $Q_s$ depend on S;

$p_i$ represents the sample value of the first coding block P; and $q_i$ represents the sample value of the second coding block Q.

wherein S=MA for the first coding block P, i.e. at most a number of the samples which can be modified in each column of the first image block that is perpendicular to and adjacent to the horizontal block edge, or S=MB for the second coding block Q, i.e. the at most a number of the samples which can be modified in each column of the second image block Q that is perpendicular to and adjacent to the horizontal block edge.

In some embodiments, wherein the line buffer size X=6, $g_i$, $Middle_{s,t}$, $P_s$, and $Q_s$ depends on S as follows:

| | |
|---|---|
| 5,7 (S(=MA)=5 for the first coding block P, S(=MB)=7 for the second coding block Q) | $f_i = 59 - i * 9$, can also be described as $f = \{59,50,41,32,23,14,5\}$ <br> $g_i = 59 - i * 9$, can also be described as $g = \{59,50,41,32,23,14,5\}$ <br> $Middle_{7,7} = (2 * (p_o + q_o) + p_1 + q_1 + p_2 + q_2 + p_3 + q_3 + p_4 + q_4 + p_5 + q_5 + p_5 + q_6 + 8) >> 4$ <br> $P_7 = (p_5 + p_5 + 1) >> 1$, $Q_7 = (q_6 + q_7 + 1) >> 1$ |
| 5,3 (S(=MA)=5 for the first coding block P, S(=MB)=3 for the second coding block Q) | $f_i = 59 - i * 9$, can also be described as $f = \{59,50,41,32,23,14,5\}$ <br> $g_i = 53 - i * 21$, can also be described as $g = \{53,32,11\}$ <br> $Middle_{7,3} = (2 * (p_o + q_o) + q_0 + 2 * (q_1 + q_2) + p_1 + q_1 + p_2 + p_3 + p_4 + p_5 + p_5 + 8) >> 4$ <br> $P_7 = (p_5 + p_5 + 1) >> 1$, $Q_3 = (q_2 + q_3 + 1) >> 1$ |

| | |
|---|---|
| 3,7 (S(=MA)=3 for the first coding block P, S(=MB)=7 for the second coding block Q) | $g_i = 59 - i * 9$, can also be described as $g = \{59,50,41,32,23,14,5\}$<br>$f_i = 53 - i * 21$, can also be described as $f = \{53,32,11\}$<br>$Middle_{3,7} = (2 * (q_o + p_o) + p_0 + 2 * (p_1 + p_2) + q_1 + p_1 + q_2 + q_3 + q_4 + q_5 + q_6 + 8) >> 4$<br>$Q_7 = (q_6 + q_7 + 1) >> 1, P_3 = (p_2 + p_3 + 1) >> 1$ |

In some embodiments, wherein the line buffer size X=4, $g_i$, $f_i$, $Middle_{s,t}$, $P_s$ and $Q_s$ depends on S as follows:

| | |
|---|---|
| 3,7 (S(=MA)=3 for the first coding block P; S(=MB)=7 for the second coding block Q) | $g_i = 59 - i * 9$, can also be described as $g = \{59,50,41,32,23,14,5\}$<br>$f_i = 53 - i * 21$, can also be described as $f = \{53,32,11\}$<br>$Middle_{3,7} = (2 * (q_o + p_o) + p_0 + 2 * (p_1 + p_2) + q_1 + p_1 + q_2 + q_3 + q_4 + q_5 + q_6 + 8) >> 4$<br>$Q_7 = (q_6 + q_7 + 1) >> 1, P_3 = (p_2 + p_3 + 1) >> 1$ |

In some embodiments, the filter coefficient of a sample $p_i$ of the first coding block P are determined in such a way that the sample $p_i$, which belongs to the first coding block P and which is the outermost sample allowed to be stored in the line buffer, is used as a padded value to replace the other samples which belongs to the first coding block P and which are outside the line buffer. It is noted that, the sample $p_i$ of the first coding block P is used as a padded value which replaces the other samples which belongs to the first coding block P and which are outside the line buffer.

In some embodiments, a line buffer has the line buffer size of 6 lines, and the samples $p_0$ to $p_4$ are modified from the first coding block P to be the samples $p_0'$ to $p_4'$.

In some embodiments, the samples $p_i$ of the first coding block P are Luma and/or Chroma samples.

It is noted that when 6 line buffer is applied, the filter condition is modified to use the restricted number of lines from the top block "P". The maximum number of samples that it is allowed to is up to $p_5$, i.e. DA=6.

The filter coefficient of a sample $p_i$ is determined in such a way that, the sample $p_i$ belong to the first block which is allowed to use and stored in the line buffer will be used as a padded version which replaces all the other samples which are outside the line buffer.

For example in the above case when DB=8 and DA=6, MB=7 and MA=5

From the top coding block (P) a maximum of 6 samples can be used, and a maximum of 5 samples can be modified, whereas for the bottom block (q) a maximum of 7 samples can be modified and a maximum of 8 samples can be used.

According to different implementations of the embodiment of the present disclosure, other possible values allowed may be:
DB=8 and DA=7, MB=7 and MA=6
DB=8 and DA=5, MB=7 and MA=4
DB=8 and DA=4, MB=7 and MA=3
The filer condition and filter equations can be derived using the same logic as above.

Other possible values allowed for both the bottom block and top block are:

In addition, DB=4 and DA=4, MB=3 and MA=3. This combination can use the simple HEVC strong filter. HEVC deblocking filer modifies a maximum of 3 samples on either side of the edge.

Figure 5:
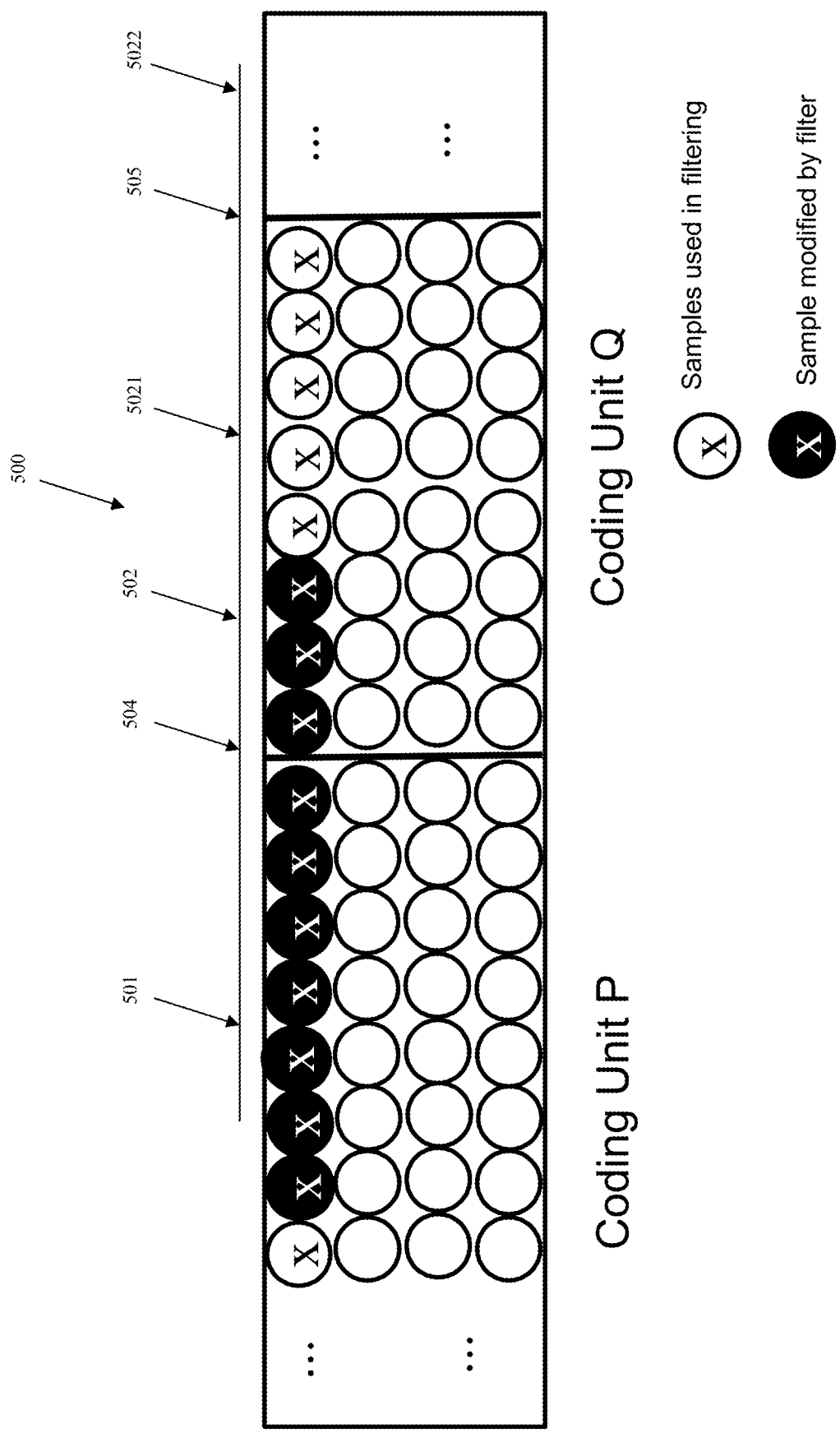
FIG. 5 shows two exemplary coding blocks and respective sample values used and modified during filtering in which a vertical block edge between two coding blocks P and Q.
Figure 7:
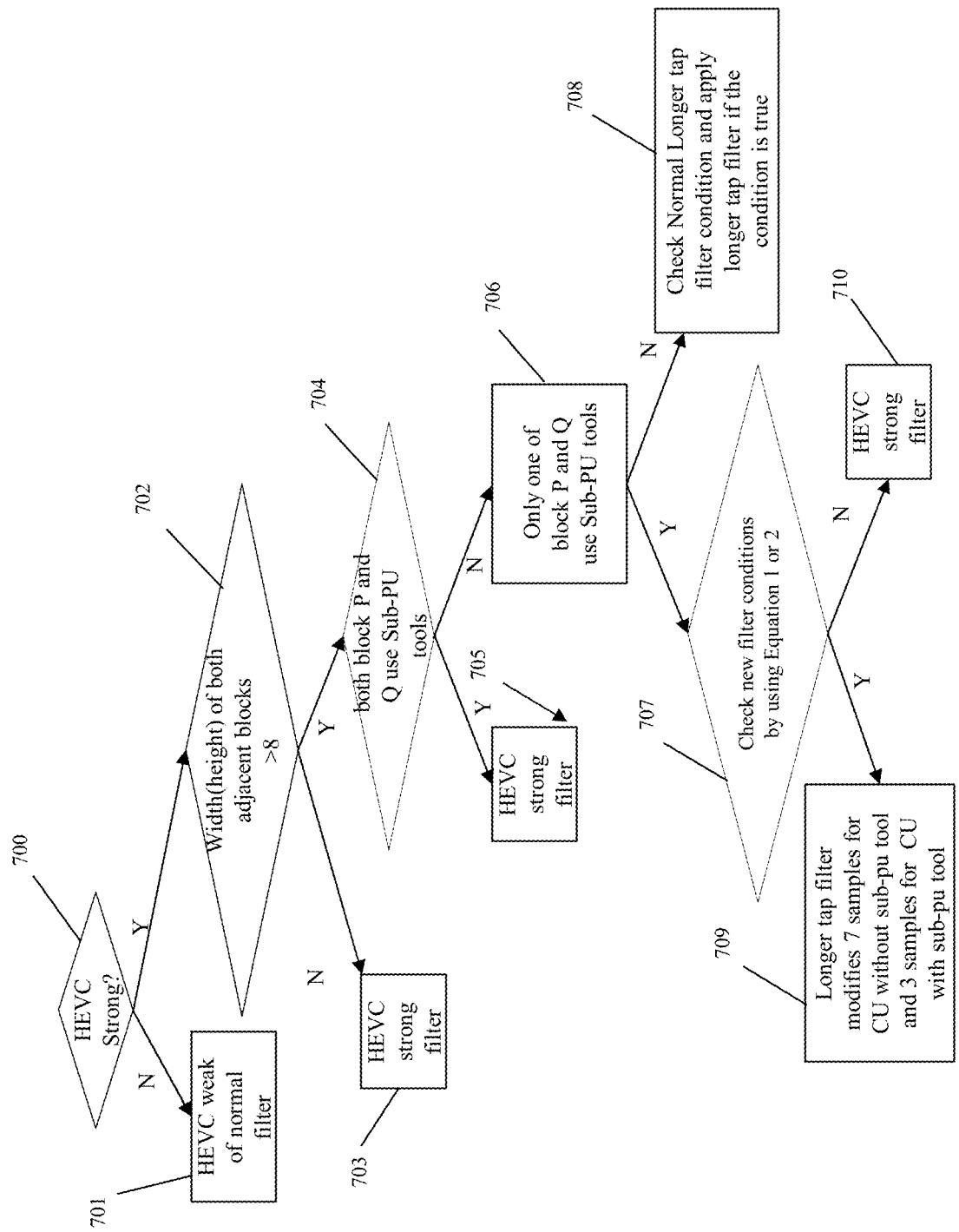
FIG. 7 shows a flow chart illustrating a method for determining whether a long tap filter shall be used.

FIG. 7 is a flow chart illustrating a method for determining whether a long tap filter shall be used. As illustrated in FIG. 7, the HEVC strong filter condition should be satisfied in order for the "long tap filter" conditions to be true. In the step 707, the details has been described above. The long tap filter used in the step 709 is different from the normal long tap filter used in the step 708, the details has been described above. In some example, on top of HEVC filter, the normal long tap filter in the step 708 uses 8 samples for filter decision on each side of the edge, and 7 samples are modified on each side of the edge. However, the long tap filter in the step 709 uses 8 samples for filter decision on each side of the edge, and 7 samples are modified on one side of the edge while 3 samples are modified on the other side of the edge. FIG. 5 shows two exemplary coding blocks P and Q 501 and 502 of an image 500. The figure shows the respective sample values used and modified during filtering, in which a vertical block edge 504 exists between the two coding blocks P and Q 501 and 502. of an image 500. There are vertical block edges 504 and 505 between the blocks, such as between block 5021 and a block 5022 of the coding block Q 502.

Figure 8:
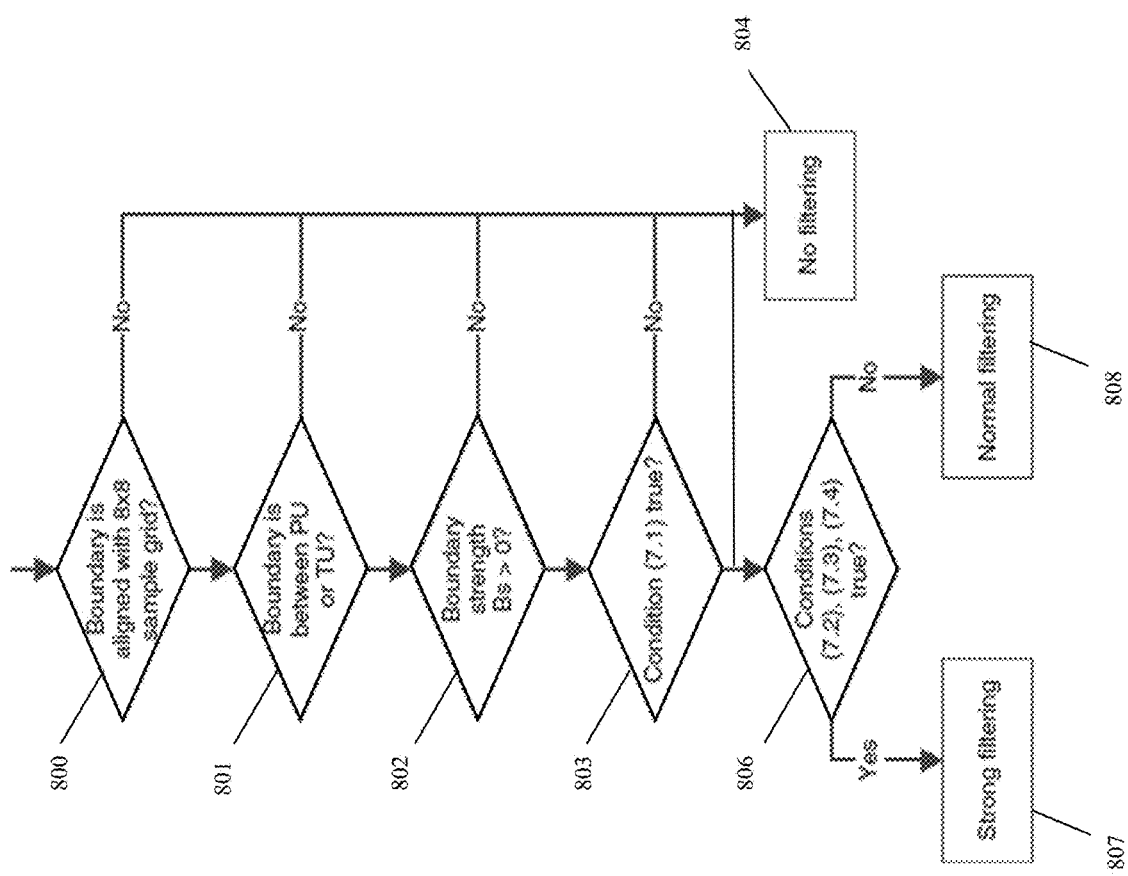
FIG. 8 shows a flow chart illustrating a method for determining whether the HEVC strong filter condition should be satisfied.

The details for determining whether the HEVC strong filter condition should be satisfied is shown in FIG. 8. The deblocking filtering decisions for a block boundary including the decisions between the strong and the normal filtering are summarized in a flowchart in FIG. 8.

In a first step 800, it is checked if the currently filtered block edge is aligned with an 8×8 encoding sample grid. If this is the case, in a second step 801, it is checked if the block edge to be filtered is a boundary between prediction units or transform units. If this is the case, in a third step 802, it is checked if a boundary strength $B_S>0$. If also this condition is met, in a fourth step 803 it is checked if a condition 7.1 is true.

Condition 7.1 is used to check if deblocking filtering is applied to a block boundary or not. The condition especially checks how much the signal on each side of the block boundary deviates from a straight line (ramp).

If this condition is not met, or any of the checks of steps 800, 801 and 802 are not fulfilled, it is decided in a fifth step 804 that no filtering is performed.

In a sixth step 803, it is checked that the condition 7.1 is true, then in a seventh step 806, it is checked, if further condition 7.2, 7.3, and 7.4 are met.

Condition 7.2 checks that there are no significant signal variations at the sides of the block boundary. Condition 7.3 verifies that the signal on both sides is flat. Condition 7.4 ensures that the step between the sample values at the sides of the block boundary is small.

If all of these conditions are true, in an eighth step 807, a strong filtering is performed. The step 807 is directly replaced with step 702 of FIG. 7. If this is not the case, in a ninth step 808 it is decided that a normal filtering is performed.

This solution enforces part of a deblocking flow chart, so that only one sample modification is performed.

In some examples, "asymmetric" filter is used for horizontal edges overlapping with CTB boundaries with 6 lines or 4 lines available.

This approach is shown along FIG. 16 (=FIGS. 16A and 16B). In FIG. 16, an image 1600 comprising two blocks 1601, 1602 is shown. A block edge 1603 divides the blocks

1601 and 1602. According to the first embodiment of the invention, wherein the horizontal block edge 1603 overlaps with a coding tree block (CTB) boundary, wherein the first coding block P is the block 1601 above the CTB boundary 1603 and the second coding block Q is the block 1602 below the CTB boundary 1603; FIG. 16 (=FIGS. 16A and 16B) shows a line buffer with a size of 6 lines. For horizontal edges overlapping at CTB boundary, DA<DB and MA<MB are set to reduce line buffer further. This disclosure applies to all block types (such as the blocks 1601 and 1602 are luma blocks or chroma blocks) for application of a long tap filter, and works for horizontal edges.

In other words, the coding block P 1601 is the block at one side of the CTB boundary 1603 and the coding block Q 1602 is the block at the other side of the CTB boundary 1603. It is understood that in one example, the coding block P 1601 is the block above the CTB boundary 1603 and the coding block Q 1602 is the block below the CTB boundary 1603. Accordingly, the current coding block is considered as the coding block Q 1602. In another example, if the coding block P is the block below the CTB boundary and the coding block Q is the block above the CTB boundary. Accordingly, the current coding block is considered as the coding block P. It can be understood that for a horizontal boundary, the below block is the current coding block. This disclosure can also be applied in both of these two scenarios in a way as described above. The sample $p_i$, which belong to the first coding block P and which is the outermost sample which is allowed to be stored in the line buffer, is used as a padded value which replaces the other samples which belong to the first image block and which are outside the line buffer.

It is noted that the first filter may be an asymmetric filter which modifies different number of samples on either side of the block edge (e.g. CU edge).

In one example, at CTB boundaries for the top blocks, when the size of line buffer is 6 lines, a "long tap" filter which modifies up to 5 samples may be used. In the following, a "long tap" filter, which uses a max of up to 6 samples as filter input values and which modifies up to 5 samples as filter output values, may be used when the block height is greater than or equal to 16 samples.

In another example, at CTB boundaries for the top blocks, when the size of Line buffer is 4 lines, a "long tap" filter which modifies 3 samples may be used. In the following, a "long tap" filter, which uses 4 samples as filter input values and modifies up to 3 samples as filter output values, may be used when the block height is greater than or equal to 16 samples.

As shown in FIG. 16 (=FIG. 16A or 16B) or FIG. 17, if the size of a line buffer (e.g. line buffer size) is X, then for the first coding block P, DA=X and MA=X−1. The sample $p_i$ of the first coding block P is used as a padded value which replaces the other samples which belongs to the first coding block P and which are outside the line buffer, wherein if the line buffer size is X, then i=X−1. For example, the sample $p_i$ is the outermost sample allowed to be stored in the line buffer, wherein if the allowed line buffer size is "x" then i=x−1. For example if the line buffer size is 4 i.e. x=4 then i=3 (as shown in FIG. 17). Therefore $p_3$ is used as the sample to pad all the other samples which are the outside the line buffer. For example, samples $p_4, p_5 \ldots$ are replaced by $p_3$, In an another example if the allowed line buffer size is 6, i.e. x=6 then i=5. Therefore $p_5$ is used as the sample to pad all the other samples which are outside the line buffer. For example, samples $p_6, p_7 \ldots$ are replaced by $p_5$.

To sum up, the present invention can be applied for the scenario in which the first coding block and the second coding block are luma blocks, the line buffer has the line buffer size of X lines (such as 4 lines).

It can be understood that the present invention also can be applied for the scenario in which the first coding block and the second coding block are chroma blocks, the line buffer has the line buffer size of X lines (such as 2 lines).

Since a potential "large block" blocking artifact could occur at the horizontal Chroma CTU boundary, the present disclosure may employ a long tap asymmetric filter which modifies MA sample from the top block but can still modify up to MB samples from the bottom blow to more effectively remove the blocking artifact.

Figure 18:
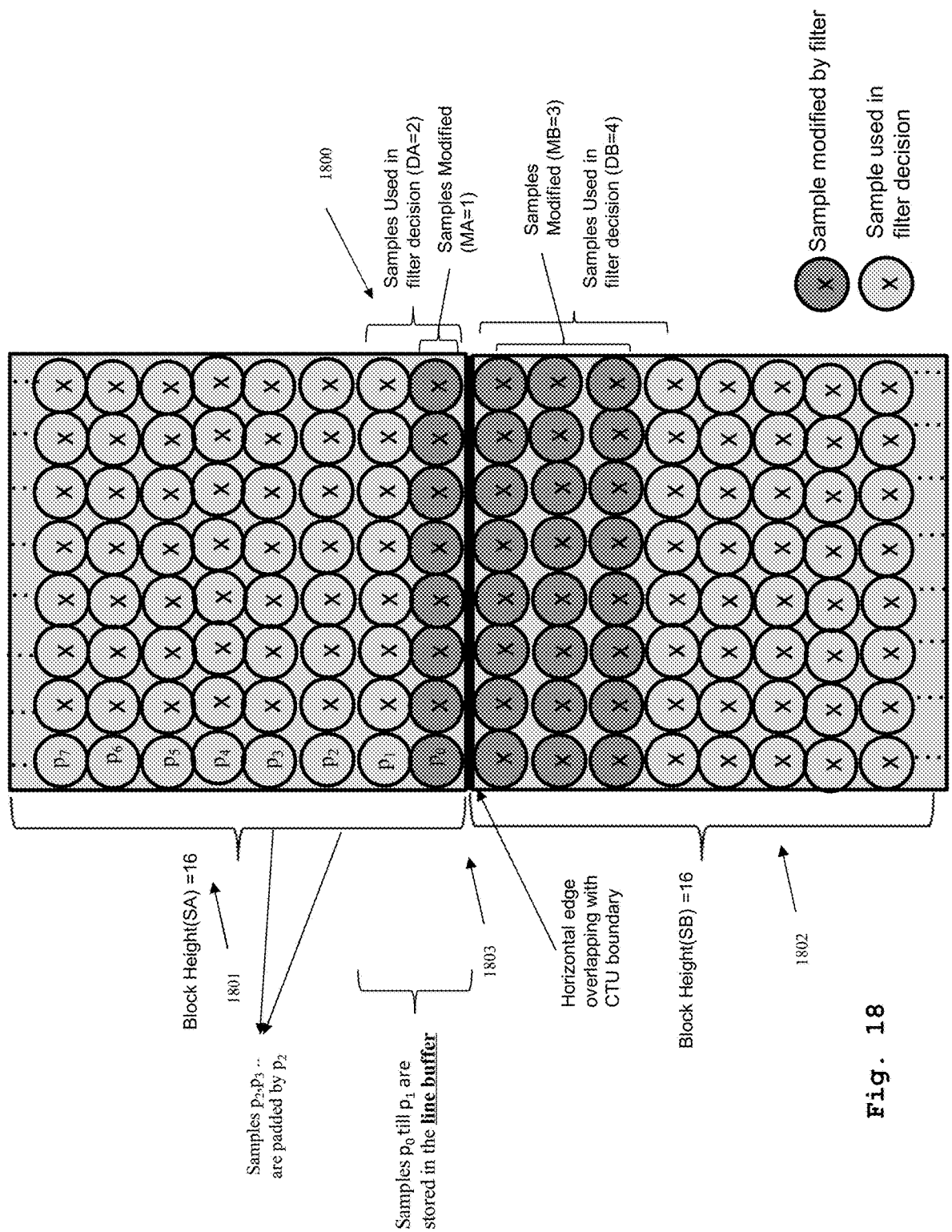
FIG. 18 shows a horizontal edge overlapping at a horizontal Chroma CTB boundary according to another exemplary embodiment when a line buffer (such as 2 line buffer) is applied.

FIG. 18 shows an example with the line buffer size of 2 lines. In FIG. 18, an image 1800 comprising two blocks 1801, 1802 is shown. A block edge 1803 divides the blocks 1801 and 1802. According to an example, when the horizontal block edge 1803 overlaps with a coding tree block (CTB) boundary, wherein the first coding block (such as a first luma block) P is the block 1801 above the CTU boundary 1803 and the second coding block (such as a second luma block) Q is the block 1802 below the CTB boundary 1803, for horizontal edges overlapping at chroma CTB boundary, DA<DB and MA<MB may be set to reduce line buffer further. Here, DB is the number of samples used in the filter decision for the coding block below the horizontal chroma CTB boundary, and the MB is the number of samples modified in the filtering process for the coding block below the horizontal CTB boundary. In other words, MA can be understood as a maximum filter length for block 1801 above the horizontal chroma CTB boundary. MB can be understood as a maximum filter length for block 1802 below the horizontal chroma CTB boundary, where MA=1, MB=3; DA=2, DB=4. As shown in FIG. 18, the block size or height of both two blocks are equal to 16. It can be noted that when the first image block and the second image block are chroma blocks and SA and SB are equal to or greater than 8, MB=3 and MA=1. When the first image block and the second image block are chroma blocks and SB and SA are equal to or greater than 8, DB=4 and DA=2.

For the longer tap filter decision, the original filter equations are as follows:

$$dp0 = \text{Abs}(p_{2,0} - 2 \ast p_{1,0} + p_{0,0})$$

$$dp1 = \text{Abs}(p_{2,1} - 2 \ast p_{1,1} + p_{0,1})$$

$$dq0 = \text{Abs}(q_{2,0} - 2 \ast q_{1,0} + q_{0,0})$$

$$dq1 = \text{Abs}(q_{2,1} - 2 \ast q_{1,1} + q_{0,1})$$

At the horizontal CTU boundaries the modified longer tap filter decisions are as follows: ($p_{2,0}, p_{2,1}$ are simply replaced with $p_{1,0}$ and $p_{1,1}$)

$$dp0 = \text{Abs}(p_{1,0} - 2 \ast p_{1,0} + p_{0,0})$$

$$dp1 = \text{Abs}(p_{1,1} + p_{0,1})$$

$$dq0 = \text{Abs}(q_{2,0} - 2 \ast q_{1,0} + q_{0,0})$$

$$dq1 = \text{Abs}(q_{2,1} < 2 \ast q_{1,1} + q_{0,1})$$

The original longer tap filtering equations for Chroma longer tap deblocking are as follows:

$$p_0' = \text{Clip3}(p_0 - t_C, p_0 + t_C, (p_3 + p_2 + p_1 + 2 \ast p_0 + q_0 + q_1 + q_2 + 4) \gg 3)$$

$$p_1' = \text{Clip3}(p_1 - t_C, p_1 + t_C, (2 \ast p_3 + p_2 + 2 \ast p_1 + p_0 + q_0 + q_1 + 4) \gg 3)$$

$$p_2' = \text{Clip3}(p_2 - t_C, p2 + t_C, (3 \ast p_3 + 2 \ast p_2 + p_1 + p_0 + q_0 + 4) \gg 3)$$

$$q_0'=\text{Clip3}(q_0-t_C,q_0+t_C,(p_2+p_1+p_0+2*q_0+q_1+q_2+q_3+4)>>3)$$

$$q_1'=\text{Clip3}(q_1-t_C,q_1+t_C,(p_1+p_0+q_0+2*q_1+q_2+2*q_3+4)>>3)$$

$$q_2'=\text{Clip3}(q_2-t_C,q_2+t_C,(p_0+q_0+q_1+2*q_2+3*q_3+4)>>3)$$

At the horizontal CTU boundaries the modified longer tap deblocking equations are as follows:

$$p_0'=\text{Clip3}(p_0-T_C,p_0+t_C,(3*p_1+2*p_0+q_0+q_1+q_2+4)>>3)$$

$$q_0'=\text{Clip3}(q_0-t_C,q_0+t_C,(2*p_1+p_0+2*q_0+q_1+q_2+q_3+4)>>3)$$

$$q_1'=\text{Clip3}(q_1-t_C,q_1+t_C,(p_1+p_0+q_0+2*q_1+q_2+2*q_3+4)>>3)$$

$$q_2'=\text{Clip3}(q_2-t_C,q_2+t_C,(p_0+q_0+q_1+2*q_2+3*q_3+4)>>3)$$

The filtering equations can be just be derived by padding the unavailable samples with the outermost available sample on the side of the coding block P.

The details of the proposed method are described as follows in the format of the specification. The above-described embodiment could be expressed as the following modification to the VVC draft (part 8.8.3.3):

8.8.3.3 Derivation Process of Transform Block Boundary

Inputs to this process are:
  a location (xCb, yCb) specifying the top-left sample of the current coding block relative to the top-left sample of the current picture,
  a variable nCbW specifying the width of the current coding block,
  a variable nCbH specifying the height of the current coding block,
  a variable cIdx specifying the colour component of the current coding block,
  a variable filterEdgeFlag,
  a two-dimensional (nCbW)×(nCbH) array edgeFlags,
  two-dimensional (nCbW)×(nCbH) arrays maxFilterLengthQs and maxFilterLengthPs,
  a variable edgeType specifying whether a vertical (EDGE_VER) or a horizontal (EDGE_HOR) edge is filtered.

Outputs of this process are:
  the modified two-dimensional (nCbW)×(nCbH) array edgeFlags,
  the modified two-dimensional (nCbW)×(nCbH) arrays maxFilterLengthQs, maxFilterLengthPs.

Depending on edgeType, the arrays edgeFlags, maxFilterLengthPs and maxFilterLengthQs are derived as follows:
  The variable gridSize is set as follows:

$$\text{gridSize}=\text{cIdx}==0\,?\,4:8 \quad (8\text{-}1024)$$

If edgeType is equal to EDGE_VER, the following applies:
    The variable numEdges is set equal to Max(1, nCbW/gridSize).
    For xEdge=0 . . . numEdges−1 and y=0 . . . nCbH−1, the following applies:
      The horizontal position x inside the current coding block is set equal to xEdge*gridSize.
      The value of edgeFlags[x][y] is derived as follows:
        If pps_loop_filter_across_virtual_boundaries_disabled_flag equal to 1 and (xCb+x) is equal to PpsVirtualBoundariesPosX[n] for any n=0 . . . pps_num_ver_virtual_boundaries−1, edgeFlags[x][y] is set equal to 0.
        Otherwise, if x is equal to 0, edgeFlags[x][y] is set equal to filterEdgeFlag.
        Otherwise, if the location (xCb+x, yCb+y) is at a transform block edge, edgeFlags[x][y] is set equal to 1.
    When edgeFlags[x][y] is equal to 1,the following applies:
      If cIdx is equal to 0, the following applies:
        The value of maxFilterLengthQs[x][y] is derived as follows:
          If the width in luma samples of the transform block at luma location (xCb+x, yCb+y) is equal to or less than 4 or the width in luma samples of the transform block at luma location (xCb+x−1, yCb+y) is equal to or less than 4, maxFilterLengthQs[x][y] is set equal to 1.
          Otherwise, if the width in luma samples of the transform block at luma location (xCb+x, yCb+y) is equal to or greater than 32, maxFilterLengthQs[x][y] is set equal to 7.
          Otherwise, maxFilterLengthQs[x][y] is set equal to 3.
        The value of maxFilterLengthPs[x][y] is derived as follows:
          If the width in luma samples of the transform block at luma location (xCb+x, yCb+y) is equal to or less than 4 or the width in luma samples of the transform block at luma location (xCb+x−1, yCb+y) is equal to or less than 4, maxFilterLengthPs[x][y] is set equal to 1.
          Otherwise, if the width in luma samples of the transform block at luma location (xCb+x−1, yCb+y) is equal to or greater than 32, maxFilterLengthPs[x][y] is set equal to 7.
          Otherwise, maxFilterLengthPs[x][y] is set equal to 3.
      Otherwise (cIdx is not equal to 0), the values of maxFilterLengthPs[x][y] and maxFilterLengthQs[x][y] are derived as follows:
        If the width in chroma samples of the transform block at chroma location (xCb+x, yCb+y) and the width at chroma location (xCb+x−1, yCb+y) are both equal to or greater than 8, maxFilterLengthPs[x][y] and maxFilterLengthQs[x][y] are set equal to 3.
        Otherwise, maxFilterLengthPs[x][y] and maxFilterLengthQs[x][y] are set equal to 1.
  Otherwise (edgeType is equal to EDGE_HOR), the following applies:
    The variable numEdges is set equal to Max(1, nCbH/gridSize).
    For yEdge=0 . . . numEdges−1 and x=0 . . . nCbW−1, the following applies:
      The vertical position y inside the current coding block is set equal to yEdge*gridSize.
      The value of edgeFlags[x][y] is derived as follows:
        If pps_loop_filter_across_virtual_boundaries_disabled_flag equal to 1 and (yCb+y) is equal to PpsVirtualBoundariesPosY[n] for any n=0 . . . pps_num_hor_virtual_boundaries−1, edgeFlags[x][y] is set equal to 0.
        Otherwise, if y is equal to 0, edgeFlags[x][y] is set equal to filterEdgeFlag.
        Otherwise, if the location (xCb+x, yCb+y) is at a transform block edge, edgeFlags[x][y] is set equal to 1.

When edgeFlags[x][y] is equal to 1,the following applies:
　　If cIdx is equal to 0, the following applies:
　　　　The value of maxFilterLengthQs[x][y] is derived as follows:
　　　　　　If the height in luma samples of the transform block at luma location (xCb+x, yCb+y) is equal to or less than 4 or the height in luma samples of the transform block at luma location (xCb+x, yCb+y−1) is equal to or less than 4, maxFilterLengthQs[x][y] is set equal to 1.
　　　　　　Otherwise, if the height in luma samples of the transform block at luma location (xCb+x, yCb+y) is equal to or greater than 32, maxFilterLengthQs[x][y] is set equal to 7.
　　　　　　Otherwise, maxFilterLengthQs[x][y] is set equal to 3.
　　　　The value of maxFilterLengthPs[x][y] is derived as follows:
　　　　　　If the height in luma samples of the transform block at luma location (xCb+x, yCb+y) is equal to or less than 4 or the height in luma samples of the transform block at luma location (xCb+x, yCb+y−1) is equal to or less than 4, maxFilterLengthPs[x][y] is set equal to 1.
　　　　　　Otherwise, if the height in luma samples of the transform block at luma location (xCb+x, yCb+y−1) is equal to or greater than 32, maxFilterLengthPs[x][y] is set equal to 7.
　　　　　　Otherwise, maxFilterLengthPs[x][y] is set equal to 3.
　　Otherwise (cIdx is not equal to 0), the values of maxFilterLengthPs[x][y] and maxFilterLengthQs[x][y] are derived as follows:
　　　　If all of the following conditions are true, maxFilterLengthPs[x][y] and maxFilterLengthQs[x][y] are set equal to 3:
　　　　　　The height in chroma samples of the transform block at chroma location (xCb+x, yCb+y) and the height at chroma location (xCb+x, yCb+y−1) are both equal to or greater than 8.
　　　　Otherwise, if (yCb+y) % CtbHeightC is equal to 0, i.e. the horizontal edge overlaps with the upper chroma CTB boundary and the height in chroma samples of the transform block at chroma location (xCb+x, yCb+y) and the height at chroma location (xCb+x, yCb+y−1) are both equal to or greater than 8, then maxFilterLengthPs[x][y] is set to 1 and maxFilterLengthQs[x][y] are set equal to 3 and variable isHorCTBBoundary is set as true
　　　　Otherwise, maxFilterLengthPs[x][y] and maxFilterLengthQs[x][y] are set equal to 1.

The above-described embodiment also could be expressed as the following modification to the VVC draft (part 8.8.3.6.3):

8.8.3.6.3 Decision process for chroma block edges

When maxFilterLengthCbCr is equal to 3, the following ordered steps apply:

1. The variables n1, dpq0, dpq1, dp, dq and d are derived as follows:

$$n1=(\text{subSampleC}==2)?1:3 \qquad (8\text{-}1138)$$

If variable isHorCTBBondary is true, then $p_{3,0}=p_{1,0}$, $p_{2,0}=p_{1,0}$ and $p_{3,n1}=p_{1,n1}, p_{2,n1}=p_{1,n1}$ $$dp0=\text{Abs}(p_{2,0}-2*p_{1,0}+p_{0,0}) \qquad (8\text{-}1139)$$

$$dp1=\text{Abs}(p_{2,n1}-2*p_{1,n1}+p_{0,n1}) \qquad (8\text{-}1140)$$

$$dq0=\text{Abs}(q_{2,0}-2*q_{0,0}+q_{0,0}) \qquad (8\text{-}1141)$$

$$dq1=\text{Abs}(q_{2,n1}-2*q_{1,n1}+q_{0,n1}) \qquad (8\text{-}1142)$$

$$dpq0=dp0+dq0 \qquad (8\text{-}1143)$$

$$dpq1=dp1+dq1 \qquad (8\text{-}1144)$$

$$dp=dp0+dp1 \qquad (8\text{-}1145)$$

$$dq=dq0+dq1 \qquad (8\text{-}1146)$$

$$d=dpq0+dpq1 \qquad (8\text{-}1147)$$

Thus, the present disclosure also can use an asymmetric filter also for the Chroma deblocking (similar to Luma deblocking), which modifies 1 sample from the top block, but can modify up to 3 samples from the bottom block as shown in FIG. 18. Since more samples are modified, the filter reportedly can remove the blocking artifacts more efficiently when compared to using normal Chroma filter which only modifies 1 sample on either side of the edge. The present disclosure moreover also allows to improve the subjective quality for larger blocks at the horizontal Chroma CTU boundaries.

FIG. 6 is a block diagram illustrating an exemplary deblocking filter apparatus 600 according to the techniques described in this disclosure (further details will be described below, e.g., based on FIGS. 7, 8 or FIG. 10 to 12). The deblocking filter apparatus 600 may be configured to perform deblocking techniques in accordance with various examples described in the present application. In general, either or both of loop filter 120 from FIG. 1 and loop filter 220 from FIG. 2 may include components substantially similar to those of deblocking filter 600. Other video coding devices, such as video encoders, video decoders, video encoder/decoders (CODECs), and the like may also include components substantially similar to deblocking filter 600. Deblocking filter 600 may be implemented in hardware, software, or firmware, or any combination thereof. When implemented in software or firmware, corresponding hardware (such as one or more processors or processing units and memory for storing instructions for the software or firmware) may also be provided.

In the example of FIG. 6, deblocking filter apparatus 600 includes deblocking determination unit 604, support definitions 602 stored in memory, deblocking filtering unit 606, deblocking filter parameters 608 stored in memory, edge locating unit 603, and edge locations data structure 605. Any or all of the components of deblocking filter 600 may be functionally integrated. The components of deblocking filter 600 are illustrated separately only for purposes of illustration. In general, deblocking filter 600 receives data for decoded blocks, e.g., from a summation component 114, 214 that combines prediction data with residual data for the blocks. The data may further include an indication of how the blocks were predicted. In the example described below, deblocking filter apparatus 600 is configured to receive data including a decoded video block associated with a CTB (or an LCU) and a CU quadtree for the CTB, where the CU quadtree describes how the CTB is partitioned into CUs and prediction modes for PUs and TUs of leaf-node CUs.

Deblocking filter apparatus 600 may maintain edge locations data structure 605 in a memory of deblocking filter apparatus 600, or in an external memory provided by a corresponding video coding device. In some examples, edge locating unit 603 may receive a quadtree corresponding to a CTB that indicates how the CTB is partitioned into CUs. Edge locating unit 603 may then analyze the CU quadtree to determine edges between decoded video blocks associated with TUs and PUs of CUs in the CTB that are candidates for deblocking.

Edge locations data structure 605 may comprise an array having a horizontal dimension, a vertical dimension, and a dimension representative of horizontal edges and vertical edges. In general, edges between video blocks may occur between two video blocks associated with smallest-sized CUs of the CTB, or TUs and PUs of the CUs. Assuming that the CTB has a size of N×N, and assuming that the smallest-sized CU of the CTB is of size M×M, the array may comprise a size of [N/M]×[N/M]×2, where "2" represents the two possible directions of edges between CUs (horizontal and vertical). For example, assuming that an CTB has 64×64 pixels and a 8×8 smallest-sized CU, the array may comprise [8]×[8]×[2] entries.

Each entry may generally correspond to a possible edge between two video blocks. Edges might not in fact exist at each of the positions within the LCU corresponding to each of the entries of edge locations data structure 605. Accordingly, values of the data structure may be initialized to false. In general, edge locating unit 603 may analyze the CU quadtree to determine locations of edges between two video blocks associated with TUs and PUs of CUs of the CTB and set corresponding values in edge locations data structure 605 to true.

In general, the entries of the array may describe whether a corresponding edge exists in the CTB as a candidate for deblocking. That is, when edge locating unit 603 determines that an edge between two neighboring video blocks associated with TUs and PUs of CUs of the CTB exists, edge locating unit 603 may set a value of the corresponding entry in edge locations data structure 605 to indicate that the edge exists (e.g., to a value of "true").

Deblocking determination unit 604 generally determines whether, for two neighboring blocks, an edge between the two blocks should be deblocked. Deblocking determination unit 604 may determine locations of edges using edge locations data structure 605. When a value of edge locations data structure 605 has a Boolean value, deblocking determination unit 604 may determine that a "true" value indicates the presence of an edge, and a "false" value indicates that no edge is present, in some examples.

In general, deblocking determination unit 604 is configured with one or more deblocking determination functions. The functions may include a plurality of coefficients applied to lines of pixels that cross the edge between the blocks. For example, for luma blocks, the functions may be applied to a line of pixels that is perpendicular to the edge, where MA (such as 3, 4 or 5) pixels are in one of the two blocks and MB (such as 7) pixels are in the other of the two blocks. For example, for chroma blocks, the functions may be applied to a line of pixels that is perpendicular to the edge, where MA (such as 1) pixels are in one of the two blocks and MB (such as 3) pixels are in the other of the two blocks. Support definitions 602 define support for the functions. In general, the "support" corresponds to the pixels to which the functions are applied.

Deblocking determination unit 604 may be configured to apply one or more deblocking determination functions to one or more sets of support, as defined by support definitions 602, to determine whether a particular edge between two blocks of video data should be deblocked. The dashed line originating from deblocking determination unit 604 represents data for blocks being output without being filtered. In cases where deblocking determination unit 604 determines that an edge between two blocks should not be filtered, deblocking filter 600 may output the data for the blocks without altering the data. That is, the data may bypass deblocking filtering unit 606. On the other hand, when deblocking determination unit 604 determines that an edge should be deblocked, deblocking determination unit 604 may cause deblocking filtering unit 606 to filter values for pixels near the edge in order to deblock the edge.

Deblocking filtering unit 606 retrieves definitions of deblocking filters from deblocking filter parameters 608 for edges to be deblocked, as indicated by deblocking determination unit 604. In general, filtering of an edge uses values of pixels from the neighborhood of a current edge to be deblocked. Therefore, both deblocking decision functions and deblocking filters may have a certain support region on both sides of an edge. By applying a deblocking filter to pixels in the neighborhood of an edge, deblocking filtering unit 606 may smooth the values of the pixels such that high frequency transitions near the edge are dampened. In this manner, application of deblocking filters to pixels near an edge may reduce blockiness artifacts near the edge.

The present disclosure is applicable to the deblocking determination unit 604 and the deblocking filtering unit 606 in FIG. 6.

It is noted that the technology presented herein is not limited to a specific deblocking filter implementation and that the deblocking filter described in the present disclosure are some examples of the deblocking filter implementations.

Figure 10:
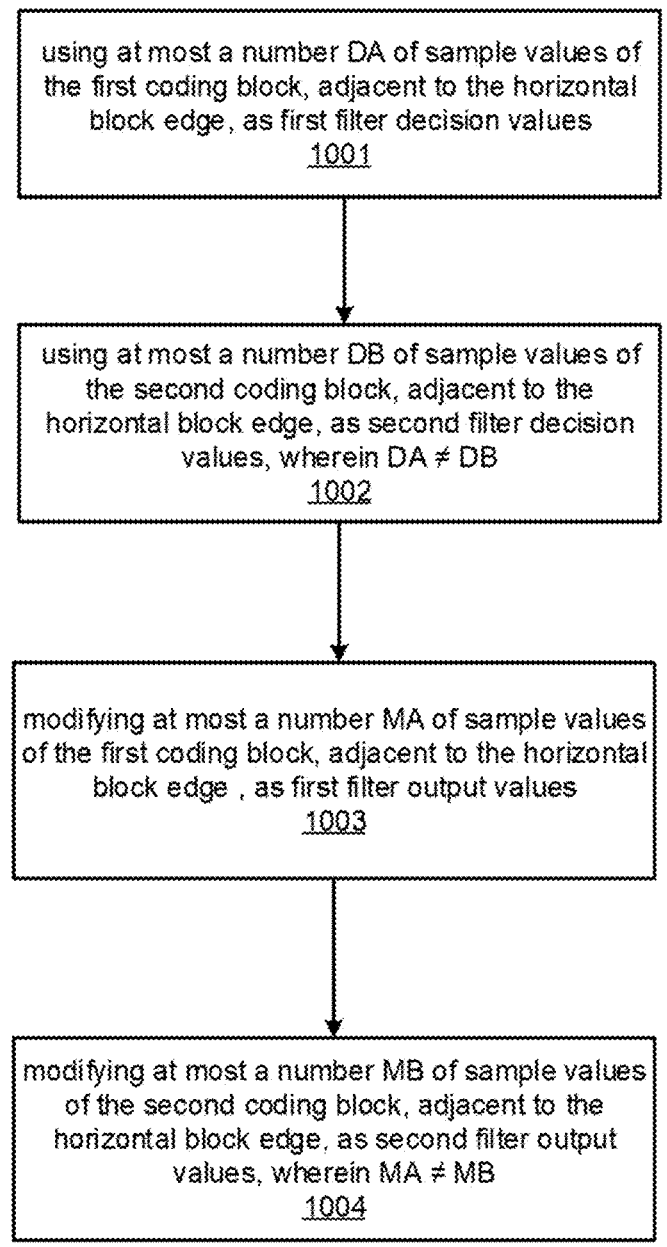
FIG. 10 shows a flow diagram depicting an exemplary process for deblocking filtering.

FIG. 10 is a block diagram illustrating an exemplary deblocking method according to the techniques described in this disclosure (further details will be described below, e.g., based on FIGS. 7, 8 and FIGS. 16 (=16A and 16B), 17 and 18). wherein the block edges comprises a horizontal block edge (e.g. CU edge or CU boundary) between a first coding block and a second coding block, wherein the horizontal block edge overlaps with a coding tree block (CTB) boundary, wherein the first coding block P is the block above the CTB boundary and the second coding block Q is the block below the CTB boundary; wherein the first coding block has a block size SA along a vertical direction being perpendicular to the horizontal block edge, wherein the second coding block has a block size SB along a vertical direction being perpendicular to the horizontal block edge, In FIG. 10, an embodiment of the deblocking method is shown.

In a step 1001, using at most a number DA of sample values of the first coding block, adjacent to the horizontal block edge, as first filter decision values, In a step 1002, using at most a number DB of sample values of the second coding block, adjacent to the horizontal block edge, as second filter decision values, In a step 1003, modifying at most a number MA of sample values of the first coding block, adjacent to the horizontal block edge, as first filter output values, In a step 1004, modifying at most a number MB of sample values of the second coding block, adjacent to the horizontal block edge, as second filter output values, wherein DA≠DB and MA≠MB, SA>DA>MA and SB>DB>MB.

If a size of a line buffer (e.g. line buffer size) is X, then for the first coding block P, DA=X and MA=X−1; and the sample $p_i$ of the first coding block P is used as a padded value which replaces the other samples which belongs to the first coding block P and which are outside the line buffer. If the line buffer size is X, then i=X−1.

In a further possible implementation form of the embodiment, wherein SA≠SB, or SA=SB.

In a further possible implementation form of the embodiment, wherein DA<DB and MA<MB.

In a further possible implementation form of the embodiment, DB=8 and DA=6, MB=7 and MA=5.

In a further possible implementation form of the embodiment, DB=8 and DA=7, MB=7 and MA=6.

In a further possible implementation form of the embodiment, DB=8 and DA=5, MB=7 and MA=4.

In a further possible implementation form of the embodiment, DB=8 and DA=4, MB=7 and MA=3.

In a further possible implementation form of the embodiment, when a 6-line buffer (e.g. a line buffer with the line buffer size being 6) is applied, an extended filter condition equation $sp_3'=(sp_3+Abs(p_5-p_3)+1)>>1$ is checked. When one or more filter condition equations comprising the extended filter condition equation are satisfied, the first filter is applied for sample values of the first coding block P, adjacent to the horizontal block edge overlapping with the CTB boundary. Here, $sp_3=Abs(p_3-p_0)$, and $p_i$ represents the sample value of the first coding block P used in filter decision, i=0, 1, 2, 3, 4 or 5.

In a further possible implementation form of the embodiment, when a 6-line buffer is applied and the second coding block Q with the block size SB>=a predefined size (such as 32), an extended filter condition equation $sq_3'=(sq_3+Abs(q_7-q_3)+1)>>1$ is checked. When one or more filter condition equations comprising the extended filter condition equation are satisfied, the first filter is applied for sample values of the second coding block Q, adjacent to the horizontal block edge overlapping with the CTB boundary. Here, $sq_3=Abs(q_0-q_3)$, and $q_i$ represent the sample value of the second coding block Q used in filter decision, i=0, 1, 2, 3, 4 . . . or 7.

In a further possible implementation form of the embodiment, when a 4-line buffer is applied, an extended filter condition equation $sp_3'=(sp_3+Abs(p_3-p_0)+1)>>1$ is checked. When one or more filter condition equations comprising the extended filter condition equation are satisfied, the first filter is applied for sample values of the first coding block P, adjacent to the horizontal block edge overlapping with the CTB boundary. Here, $sp_3=Abs(p_3-p_0)$, and $p_i$ represent the sample value of the first coding block P used in filter decision, i=0, 1, 2 or 3.

In a further possible implementation form of the embodiment, the first filter output values $p_i'$ and the second filter output values $q_i'$ for i=0 to S−1 is formulated as follows:

$p_i'=(f_i*Middle_{s,t}+(64-f_i)*P_s+32)>>6)$, clipped to $p_i±tcPD_i$ $q_i'=(g_i*Middle_{s,t}+(64-g_i)*Q_s+32)>>6)$, clipped to $q_i±tcPD_i$ wherein $tcPD_i$ is a position dependent clipping parameter, $g_i$, $f_i$, $Middle_{s,t}$, $P_s$ and $Q_s$ depend on S;

$p_i$ represents the sample value of the first coding block P; and $q_i$ represents the sample value of the second coding block Q.

wherein S=MA for the first coding block P, i.e. at most a number of the samples which can be modified in each column of the first image block that is perpendicular to and adjacent to the horizontal block edge, or S=MB for the second coding block Q, i.e. the at most a number of the samples which can be modified in each column of the second image block Q that is perpendicular to and adjacent to the horizontal block edge.

In a further possible implementation form of the embodiment, the line buffer size X=6, $g_i$, $f_i$, $Middle_{s,t}$, $P_s$ and $Q_s$ depends on S as follows:

| | |
|---|---|
| 5,7 (S(=MA)=5 for the first coding block P, S(=MB)=7 for the second coding block Q) | $f_i = 59 - i * 9$, can also be described as $f = \{59,50,41,32,23,14,5\}$ $g_i = 59 - i * 9$, can also be described as $g = \{59,50,41,32,23,14,5\}$ $Middle_{7,7} = (2 * (p_o + q_o) + p_1 + q_1 + p_2 + q_2 + p_3 + q_3 + p_4 + q_4 + p_5 + q_5 + p_5 + q_6 + 8) >> 4$ $P_7 = (p_5 + p_5 + 1) >> 1, Q_7 = (q_6 + q_7 + 1) >> 1$ |
| 5,3 (S(=MA)=5 for the first coding block P, S(=MB)=3 for the second coding block Q) | $f_i = 59 - i * 9$, can also be described as $f = \{59,50,41,32,23,14,5\}$ $g_i = 53 - i * 21$, can also be described as $g = \{53,32,11\}$ $Middle_{7,3} = (2 * (p_o + q_o) + q_0 + 2 * (q_1 + q_2) + p_1 + q_1 + p_2 + p_3 + p_4 + p_5 + p_5 + 8) >> 4$ $P_7 = (p_5 + p_5 + 1) >> 1, Q_3 = (q_2 + q_3 + 1) >> 1$ |
| 3,7 (S(=MA)=3 for the first coding block P, S(=MB)=7 for the second coding block Q) | $g_i = 59 - i * 9$, can also be described as $g = \{59,50,41,32,23,14,5\}$ $f_i = 53 - i * 21$, can also be described as $f = \{53,32,11\}$ $Middle_{3,7} = (2 * (q_o + p_o) + p_0 + 2 * (p_1 + p_2) + q_1 + p_1 + q_2 + q_3 + q_4 + q_5 + q_6 + 8) >> 4$ $Q_7 = (q_6 + q_7 + 1) >> 1, P_3 = (p_2 + p_3 + 1) >> 1$ |

In a further possible implementation form of the embodiment, the line buffer size X=4, $g_i$, $f_i$, $Middle_{s,t}$, $P_s$ and $Q_s$ depends on S as follows:

| | |
|---|---|
| 3,7 (S(=MA)=3 for the first coding block P; S(=MB)=7 for the second coding block Q) | $g_i = 59 - i * 9$, can also be described as $g = \{59,50,41,32,23,14,5\}$ $f_i = 53 - i * 21$, can also be described as $f = \{53,32,11\}$ $Middle_{3,7} = (2 * (q_o + p_o) + p_0 + 2 * (p_1 + p_2) + q_1 + p_1 + q_2 + q_3 + q_4 + q_5 + q_6 + 8) >> 4$ $Q_7 = (q_6 + q_7 + 1) >> 1, P_3 = (p_2 + p_3 + 1) >> 1$ |

In a further possible implementation form of the embodiment, a filter coefficient of a sample $p_i$ of the first coding block P is determined in such a way that the sample $p_i$, which belongs to the first coding block P and which is the outermost sample allowed to be stored in the line buffer, is used as a padded value which replaces the other samples which belongs to the first coding block P and which are outside the line buffer.

In a further possible implementation form of the embodiment, a line buffer has the line buffer size of 6 lines, and the samples $p_0$ to $p_4$ are modified from the first coding block P to be the samples $p_0'$ to $p_4'$.

In a further possible implementation form of the embodiment, the first filter is a long tap filter or an asymmetric filter or an asymmetric tap filter.

In a further possible implementation form of the embodiment, the samples $p_i$ of the first coding block P are Luma and/or Chroma samples.

It should be noted that the filter input values are consecutive values which are perpendicular to and adjacent to the block edge beginning at the block edge. Also, the filter output values are consecutive values which are perpendicular to and adjacent to the block edge, beginning at the block edge.

Figure 11:
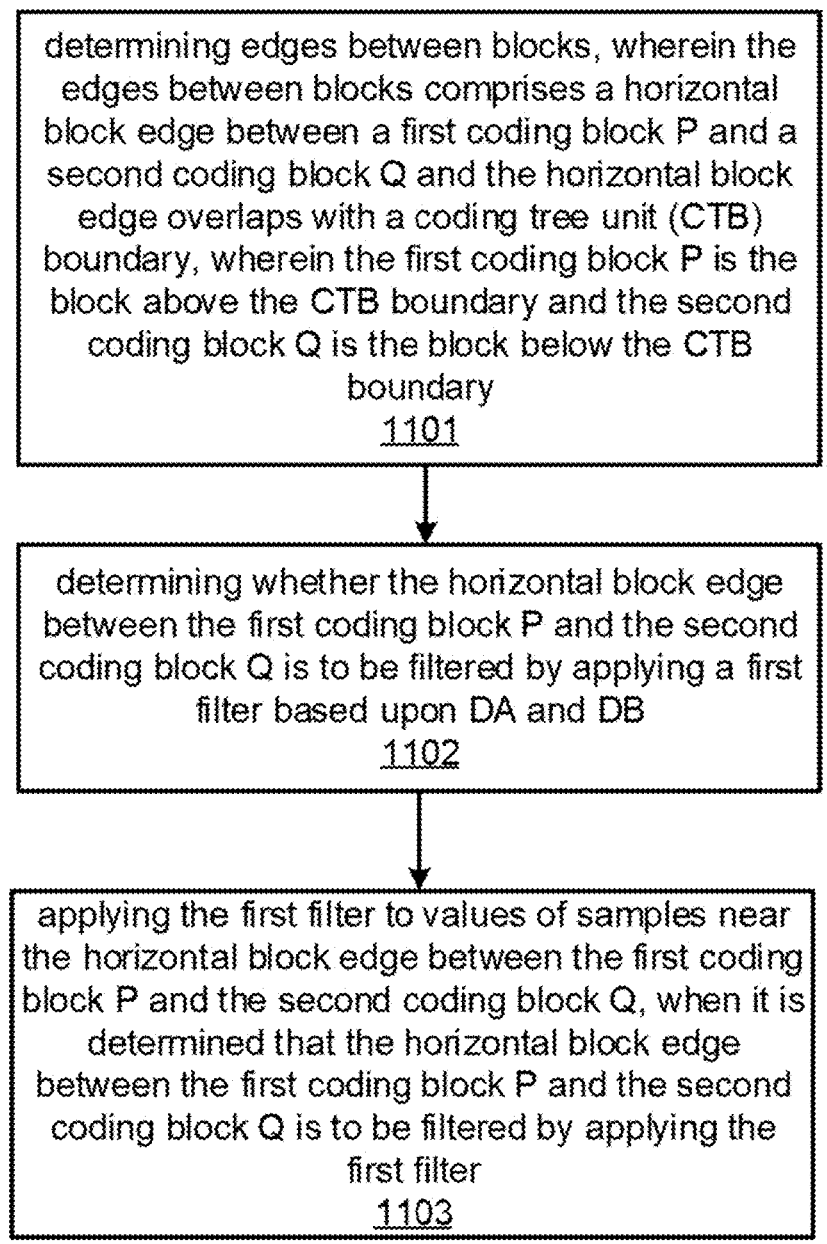
FIG. 11 shows a flow diagram depicting another exemplary process for deblocking filtering.

FIG. 11 is a block diagram illustrating another exemplary deblocking method according to the techniques described in this disclosure (further details will be described below, e.g., based on FIGS. 7, 8 and FIGS. 16 (=16A and 16B), 17 and 18).

In a step 1101, determining edges between blocks, wherein the edges between blocks comprises a horizontal block edge (e.g. CU edge or CU boundary) between a first coding block P and a second coding block Q and the horizontal block edge overlaps with a coding tree block (CTB) boundary, wherein the first coding block P is the block above the CTB boundary and the second coding block Q is the block below the CTB boundary.

In a step 1102, determining whether the horizontal block edge between the first coding block P and the second coding block Q is to be filtered by applying a first filter (i.e. a long tap filter or an asymmetric filter or an asymmetric tap filter or a HEVC deblocking filter) based upon:
- at most a number DA of sample values of the first coding block, adjacent to the horizontal block edge, as first filter decision values and
- at most a number DB of sample values of the second coding block, adjacent to the horizontal block edge, as second filter decision values; wherein DA≠DB or DA<DB, DA is equal to a line buffer size;

In a step 1103, applying the first filter (i.e. a long tap filter or an asymmetric filter or an asymmetric tap filter) to values of samples near the horizontal block edge between the first coding block P and the second coding block Q, when it is determined that the horizontal block edge between the first coding block P and the second coding block Q is to be filtered by applying the first filter.

In a further possible implementation form of the embodiment, if a size of a line buffer (e.g. line buffer size) is X, then for the first coding block P, DA=X; and the sample $p_i$ of the first coding block P is used as a padded value which replaces the other samples which belongs to the first coding block P and which are outside the line buffer, wherein if the line buffer size is X, then i=X−1.

In a further possible implementation form of the embodiment, at most a number MA of sample values of the first coding block adjacent to the horizontal block edge are modified and at most a number MB of sample values of the second coding block adjacent to the horizontal block edge are modified; wherein MA≠MB or MA<MB.

In a further possible implementation form of the embodiment, if a size of a line buffer (e.g. line buffer size) is X, then for the first coding block P, MA=X−1; and the sample $p_i$ of the first coding block P is used as a padded value which replaces the other samples which belongs to the first coding block P and which are outside the line buffer, wherein if the line buffer size is X, then i=X−1.

In a further possible implementation form of the embodiment, DB=8 and DA=6; MB=7 and MA=5.

In a further possible implementation form of the embodiment, when a size of a line buffer (e.g. line buffer size) is 6, at most a number L of lines from the first coding block P is allowed to be used for filtering decision, L=6.

In a further possible implementation form of the embodiment, when a 6-line buffer (e.g. a line buffer with the line buffer size being 6) is applied, the deblocking determination unit is configured to determine whether an extended filter condition equation $sp_3'=(sp_3+Abs(p_5-p_3)+1)>>1$ is satisfied. When one or more filter condition equations comprising the extended filter condition equation are satisfied, the first filter is applied for sample values of the first coding block P, adjacent to the horizontal block edge overlapping with the CTB boundary. Here, $sp_3=Abs(p_3-p_0)$, and $p_i$ represent the sample value of the first coding block P used in filter decision, i=0, 1, 2, 3, 4 or 5.

Sp3 basically is a metric which is calculated in HEVC as follows: $Abs(p_3-p_0)$. Now for larger blocks i.e. blocks where SA>=32, then spa is extended by the equation $sp_3'=(sp_3+Abs(p_7-p_3)+1)>>1$, where $p_7$ is padded by $p_5$.

Basically the filter condition mainly changes for coding block P. For coding block Q, the filter condition remains the same for both edges at CTB boundary and edges not at CTB boundary.

In a further possible implementation form of the embodiment, when a 6-line buffer is applied and the second coding block Q has the block size SB greater than or equal to a predefined size (such as 32), the deblocking determination unit is configured to determine whether an extended filter condition equation $sq_3'=(sq_3+Abs(q_7-q_3)+1)>>1$ is satisfied.

When one or more filter condition equations comprising the extended filter condition equation are satisfied, the first filter is applied for sample values of the second coding block Q, adjacent to the horizontal block edge overlapping with the CTB boundary.

Here, $sq_3=Abs(q_0-q_3)$, and $q_i$ represent the sample value of the second coding block Q used in filter decision, i=0, 1, 2, 3, 4 . . . or 7.

In a further possible implementation form of the embodiment, when a 4-line buffer is applied, the deblocking determination unit is configured to determine whether an extended filter condition equation $sp_3'=(sp_3+Abs(p_3-p_0)+1)>>1$ is satisfied.

When one or more filter condition equations comprising the extended filter condition equation are satisfied, the first filter is applied for sample values of the first coding block P, adjacent to the horizontal block edge overlapping with the CTB boundary. Here, $sp_3=Abs(p_3-p_0)$, and $p_i$ represent the sample value of the first coding block P used in filter decision, i=0, 1, 2 or 3.

In a further possible implementation form of the embodiment, the deblocking filtering unit is configured to determine the first filter output values $p_i'$ and the second filter output values $q_i'$ for i=0 to S−1 on the basis of the following equation:

$$p_i'=(f_i*\text{Middle}_{s,t}+(64-f_i)*P_s+32)>>6), \text{ clipped to } p_i \pm tcPD_i$$

$$q_i'=(g_i*\text{Middle}_{s,t}+(64-g_i)*Q_s+32)>>6), \text{ clipped to } q_i \pm tcPD_i$$

wherein $tcPD_i$ is a position dependent clipping parameter, $g_i$, $\text{Middle}_{s,t}$, $P_s$ and $Q_s$ depend on S;

$\text{Middle}_{s,t}$ is $\text{Middle}_{7,7}$ or $\text{Middle}_{7,3}$ or $\text{Middle}_{3,7}$ based on S for block P and Q $p_i$ represents the sample value of the first coding block P; and $q_i$ represents the sample value of the second coding block Q.

wherein S=MA for the first coding block P, i.e. at most a number of the samples which can be modified in each column of the first image block that is perpendicular to and adjacent to the horizontal block edge, or S=MB for the second coding block Q, i.e. the at most a number of the samples which can be modified in each column of the second image block Q that is perpendicular to and adjacent to the horizontal block edge.

In a further possible implementation form of the embodiment, the line buffer size X=6, $g_i$, $f_i$, $Middle_{s,t}$, $P_s$ and $Q_s$ depends on S as follows:

| | |
|---|---|
| 5,7<br>(S(=MA)=5<br>for the first<br>coding<br>block P,<br>S(=MB)=7<br>for the<br>second<br>coding<br>block Q) | $f_i = 59 - i * 9$, can also be described as<br>$f = \{59,50,41,32,23,14,5\}$<br>$g_i = 59 - i * 9$, can also be described as<br>$g = \{59,50,41,32,23,14,5\}$<br>$Middle_{7,7} = (2 * (p_o + q_o) + p_1 + q_1 + p_2 + q_2 + p_3 + q_3 + p_4 + q_4 + p_5 + q_5 + p_5 + q_6 + 8) >> 4$<br>$P_7 = (p_5 + p_5 + 1) >> 1$, $Q_7 = (q_6 + q_7 + 1) >> 1$ |
| 5,3<br>(S(=MA)=5<br>for the first<br>coding<br>block P,<br>S(=MB)=3<br>for the<br>second<br>coding<br>block Q) | $f_i = 59 - i * 9$, can also be described as<br>$f = \{59,50,41,32,23,14,5\}$<br>$g_i = 53 - i * 21$, can also be described as<br>$g = \{53,32,11\}$<br>$Middle_{7,3} = (2 * (p_o + q_o) + q_0 + 2 * (q_1 + q_2) + p_1 + q_1 + p_2 + p_3 + p_4 + p_5 + p_5 + 8) >> 4$<br>$P_7 = (p_5 + p_5 + 1) >> 1$, $Q_3 = (q_2 + q_3 + 1) >> 1$ |
| 3,7<br>(S(=MA)=3<br>for the first<br>coding<br>block P,<br>S(=MB)=7<br>for the<br>second<br>coding<br>block Q) | $g_i = 59 - i * 9$, can also be described as<br>$g = \{59,50,41,32,23,14,5\}$<br>$f_i = 53 - i * 21$, can also be described as<br>$f = \{53,32,11\}$<br>$Middle_{3,7} = (2 * (q_o + p_o) + p_0 + 2 * (p_1 + p_2) + q_1 + p_1 + q_2 + q_3 + q_4 + q_5 + q_6 + 8) >> 4$<br>$Q_7 = (q_6 + q_7 + 1) >> 1$, $P_3 = (p_2 + p_3 + 1) >> 1$ |

It is noted $P_7$ or $P_3$ is basically $P_s$ in the equation. Similarly, $Q_7$ or $Q_3$ is basically $Q_s$ in the equation.

In a further possible implementation form of the embodiment, the line buffer size X=4, $g_i$, $f_i$, $Middle_{s,t}$, $P_s$ and $Q_s$ depends on S as follows:

| | |
|---|---|
| 3,7<br>(S(=MA)=3<br>for the first<br>coding<br>block P;<br>S(=MB)=7<br>for the<br>second<br>coding<br>block Q) | $g_i = 59 - i * 9$, can also be described as<br>$g = \{59,50,41,32,23,14,5\}$<br>$f_i = 53 - i * 21$, can also be described as<br>$f = \{53,32,11\}$<br>$Middle_{3,7} = (2 * (q_o + p_o) + p_0 + 2 * (p_1 + p_2) + q_1 + p_1 + q_2 + q_3 + q_4 + q_5 + q_6 + 8) >> 4$<br>$Q_7 = (q_6 + q_7 + 1) >> 1$, $P_3 = (p_2 + p_3 + 1) >> 1$ |

In a further possible implementation form of the embodiment, a filter coefficient of a sample $p_i$ of the first coding block P is determined in such a way that the sample $p_i$, which belongs to the first coding block P and which is the outermost sample allowed to be stored in the line buffer, is used as a padded value which replaces the other samples which belongs to the first coding block P and which are outside the line buffer.

In a further possible implementation form of the embodiment, DB=8 and DA=6, MB=7 and MA=5.

In a further possible implementation form of the embodiment, DB=8 and DA=7, MB=7 and MA=6.

In a further possible implementation form of the embodiment, DB=8 and DA=5, MB=7 and MA=4.

In a further possible implementation form of the embodiment, DB=8 and DA=4, MB=7 and MA=3.

In a further possible implementation form of the embodiment, a line buffer has the line buffer size of 6 lines, and the samples $p_0$ to $p_4$ are modified from the first coding block P to be the samples $p_0'$ to $p_4'$.

In a further possible implementation form of the embodiment, the samples $p_i$ of the first coding block P are luma and/or chroma samples. Basically the same idea of line buffer restriction can also be applied to chroma long tap filter. Based on the line buffer size of chroma, the corresponding outermost sample is used to pad the other samples.

As shown in FIG. 16A or 16B, from the top block (P) a maximum of 6 samples can be used in filter decision, and a maximum of 5 samples can be modified, whereas for the bottom block (q), a maximum of 7 samples can be modified and a maximum of 8 samples can be used in filter decision.

It should be noted that the filter input values are consecutive values which are perpendicular to and adjacent to the block edge, beginning at the block edge. Also, the filter output values are consecutive values which are perpendicular to and adjacent to the block edge, beginning at the block edge.

Figure 12:
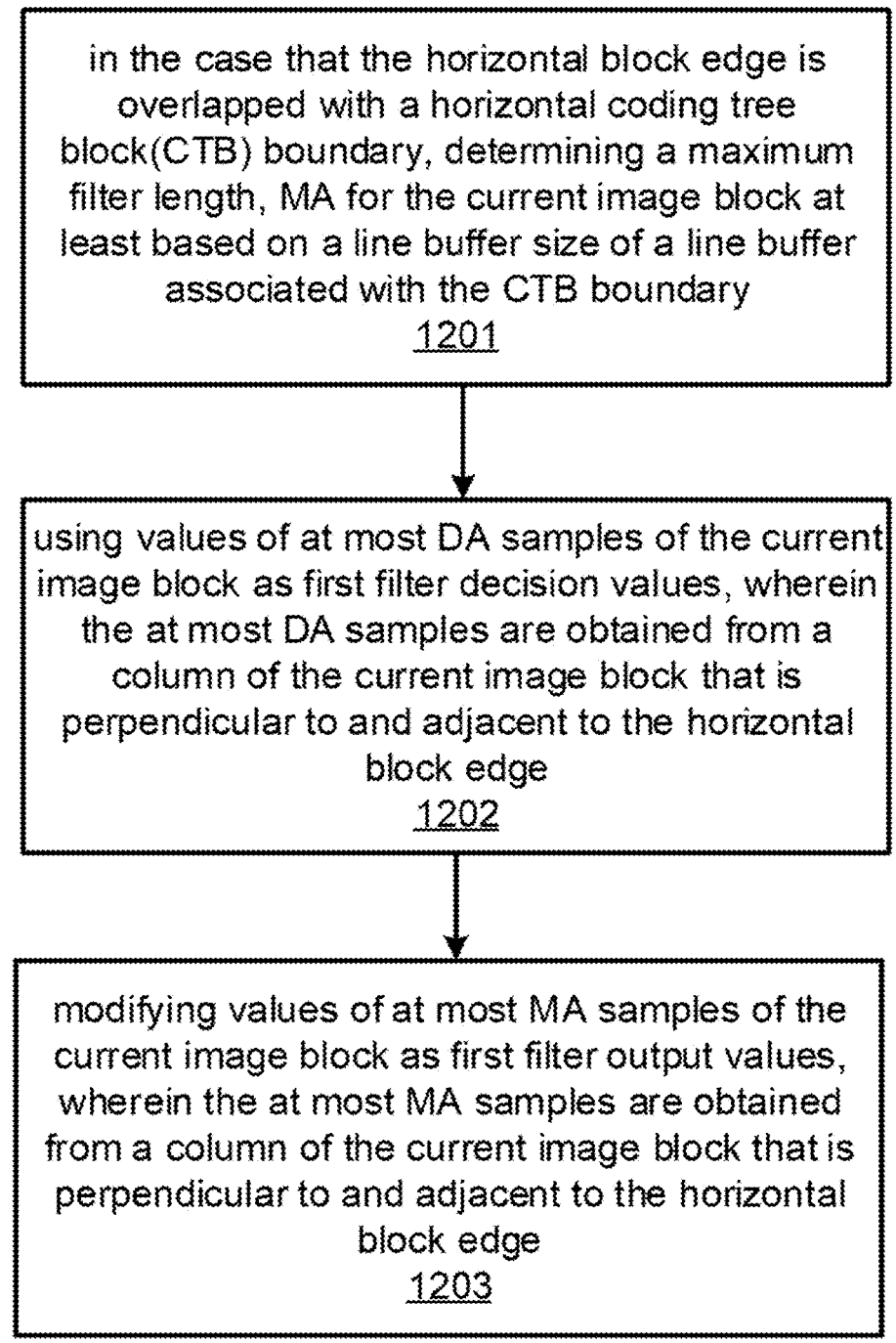
FIG. 12 shows a flow diagram depicting another exemplary process for deblocking filtering.

FIG. 12 is a block diagram illustrating an exemplary deblocking method according to the techniques described in this disclosure (further details will be described below, e.g., based on FIGS. 7, 8 and FIGS. 16 (=16A and 16B), 17 and 18). wherein the block edges comprises a horizontal block edge (e.g. CU edge or CU boundary) between a current image block and a neighboring image block of the current image block, wherein the current image block is above the horizontal block edge; wherein the current image block has a block size SA along a vertical direction, the vertical direction being perpendicular to the horizontal block edge, In FIG. 12, an embodiment of the deblocking method is shown.

In a step 1201, in the case that the horizontal block edge is overlapped with a horizontal coding tree block (CTB) boundary, determining a maximum filter length, MA for the current image block at least based on a line buffer size of a line buffer associated with the CTB boundary; and In a step 1203, modifying values of at most MA samples of the current image block as first filter output values, wherein the at most MA samples are obtained from a column of the current image block that is perpendicular to and adjacent to the horizontal block edge.

It is allowed that the filtering decision and filtering are tuned according to the available line buffer and therefore this will result in optimal subjective quality.

wherein if the line buffer associated with the CTB boundary has the line buffer size of X lines, MA=X-1, wherein X is a positive integer.

wherein the method further comprises:

In a step 1202, in the case that the horizontal block edge is overlapped with the horizontal coding tree block (CTB) boundary, using values of at most DA samples of the current image block as first filter decision values, wherein the at most DA samples are obtained from a column of the current image block that is perpendicular to and adjacent to the horizontal block edge.

In some possible implementation forms of the embodiment, if the line buffer associated with the CTB boundary has the line buffer size of X lines, DA=X and MA=X-1, wherein X is a positive integer.

In some possible implementation forms of the embodiment, when the current image block is a chroma block, the line buffer associated with the CTB boundary has the line buffer size of 2 lines, or when the current image block is a luma block, the line buffer associated with the CTB boundary has the line buffer size of 4 lines.

In some possible implementation forms of the embodiment, if the line buffer associated with the CTB boundary has the line buffer size of X lines, a sample $p_i$ of the current image block is used as a padded value which replaces the other samples which belongs to the current image block and which are outside the line buffer, wherein i=X−1.

It can be noted that the sample $p_i$ of the current image block is the chroma sample $p_i$ of the current chroma block.

It can be noted that the sample $p_i$ of the current image block is the X-th sample in a column perpendicular to and adjacent to the horizontal block edge, and is also the outermost sample allowed to be stored in the line buffer associated with the CTB boundary.

In a further possible implementation form of the embodiment, a filter coefficient of a sample $p_i$ of the current image block is determined in such a way that the sample $p_i$, which belongs to the current image block and which is the outermost sample allowed to be stored in the line buffer, is used as a padded value which replaces the other samples which belongs to the current image block and which are outside the line buffer. In other words, a filter coefficient associated with a sample $p_i$ of the current image block is determined based on the number of times the sample $p_i$ is used as a padded value, wherein the sample $p_i$ belongs to the current image block and is the outermost sample allowed to be stored in the line buffer associated with the CTB boundary. For example, the number of times the sample $p_i$ is used as a padded value is 2, then the filter coefficient associated with the sample $p_i$ of the current image block is 3, because the sample $p_i$ itself is also counted.

According to such implementation form of the embodiment, the original filter decision and filtering process need not be changed as the padded samples can just be treated as available samples and this results is minimal computational complexity increase, especially in hardware.

In an example, when the line buffer has the line buffer size of 2 lines, the sample $p_i$ is the sample $p_i$, and the filter coefficient associated with the sample $p_i$ is 3.

In different implementation form of the embodiment, when the current image block is a luma block and SA is equal to or greater than 32, MA=3, wherein SA is the height of the current image block; or when the current image block is a luma block and SA is equal to or greater than 16, MA=3, wherein SA is the height of the current image block.

In different implementation form of the embodiment, when the current image block is a luma block and SA is equal to or greater than 32, DA=4, wherein SA is the height of the current image block; or when the current image block is a luma block and SA is equal to or greater than 16, DA=4, wherein SA is the height of the current image block.

In a further possible implementation form of the embodiment, when the current image block is a chroma block and SA is equal to or greater than 8, MA=1, wherein SA is the height of the current image block.

In a further possible implementation form of the embodiment, when the current image block is a chroma block and SA is equal to or greater than 8, DA=2, wherein SA is the height of the current image block.

wherein the method further comprises:

In a step 1001, when the current image block is a chroma block, determining whether the horizontal block edge is overlapped with a horizontal chroma CTB boundary; or when the current image block is a luma block, determining whether the horizontal block edge is overlapped with a horizontal luma CTB boundary.

It is noted that samples $p_i$ of the current image block are luma samples, or the samples $p_i$ of the current image block are chroma samples, wherein i belongs to $\{0, 1, 2, \ldots, SA-1\}$.

It can be understood that the current image block is a transform block; or the current image block is a coding block.

Figure 13:
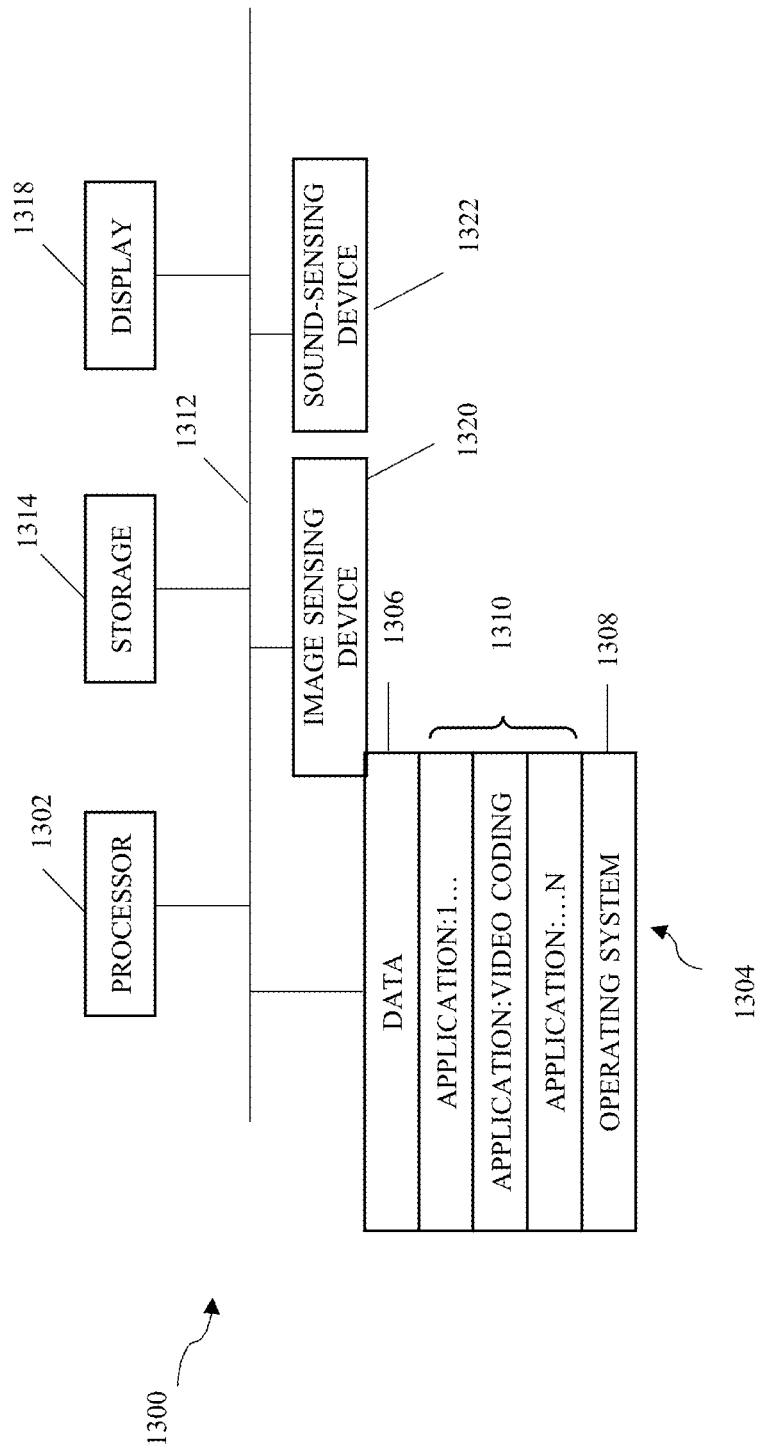
FIG. 13 shows a simplified block diagram of an apparatus 1300 that may be used as either the source device 310 or the destination device 320 from FIG. 3 or both according to an exemplary embodiment.

FIG. 13 is a simplified block diagram of an apparatus 1300 that may be used as either or both of the source device 310 and the destination device 320 from FIG. 3 according to an exemplary embodiment. Apparatus 1300 can implement techniques of this present disclosure. Apparatus 1300 can be in the form of a computing system including multiple computing devices, or in the form of a single computing device, for example, a mobile phone, a tablet computer, a laptop computer, a notebook computer, a desktop computer, and the like.

Processor 1302 of apparatus 1300 can be a central processing unit. Alternatively, processor 1302 can be any other type of device, or multiple devices, capable of manipulating or processing information now-existing or hereafter developed. Although the disclosed implementations can be practiced with a single processor as shown, e.g., processor 1302, advantages in speed and efficiency can be achieved using more than one processor.

Memory 1304 in the apparatus 1300 can be a read only memory (ROM) device or a random access memory (RAM) device in an implementation. Any other suitable type of storage device can be used as memory 1304. Memory 1304 may be used to store code and/or data 1306 that is accessed by processor 1302 using bus 1312. Memory 1304 can further be used to store operating system 1308 and application programs 1310. Application programs 1310 may include at least one program that permits processor 1302 to perform the methods described here. For example, application programs 1310 can include applications 1 through N, and further include a video coding application that performs the methods described here. Apparatus 1300 can also include additional memory in the form of secondary storage 1314, which can, for example, be a memory card used with a mobile computing device. Because the video communication sessions may contain a significant amount of information, they can be stored in whole or in part in storage 1314 and loaded into memory 1304 as needed for processing.

Apparatus 1300 can also include one or more output devices, such as display 1318. Display 1318 may be, in one example, a touch sensitive display that combines a display with a touch sensitive element operable to sense touch inputs. Display 1318 can be coupled to processor 1302 via bus 1312. Other output devices that permit a user to program or otherwise use apparatus 1300 can be provided in addition to or as an alternative to display 1318. When the output device is or includes a display, the display can be implemented in various ways, including by a liquid crystal display (LCD), a cathode-ray tube (CRT) display, a plasma display or light emitting diode (LED) display, such as an organic LED (OLED) display.

Apparatus 1300 can also include or be in communication with image-sensing device 1320, for example a camera, or any other image-sensing device 1320 now existing or hereafter developed that can sense an image such as the image of a user operating apparatus 1300. Image-sensing device 1320 can be positioned such that it is directed toward the user operating apparatus 1300. In an example, the position and optical axis of image-sensing device 1320 can be configured such that the field of vision includes an area that is directly adjacent to display 1318 and from which display 1318 is visible.

Apparatus 1300 can also include or be in communication with sound-sensing device 1322, for example a microphone, or any other sound-sensing device now existing or hereafter developed that can sense sounds near apparatus 1300. Sound-sensing device 1322 can be positioned such that it is directed toward the user operating apparatus 1300 and can be configured to receive sounds, for example, speech or other utterances, made by the user while the user operates apparatus 1300.

Although FIG. 13 depicts processor 1302 and memory 1304 of apparatus 1300 as being integrated into a single device, other configurations can be utilized. The operations of processor 1302 can be distributed across multiple machines (each machine having one or more of processors) that can be coupled directly or across a local area or other network. Memory 1304 can be distributed across multiple machines such as a network-based memory or memory in multiple machines performing the operations of apparatus 1300. Although depicted here as a single bus, bus 1312 of apparatus 1300 may comprise multiple buses. Further, secondary storage 1314 can be directly coupled to the other components of apparatus 1300 or can be accessed via a network and can comprise a single integrated unit such as a memory card or multiple units such as multiple memory cards. Apparatus 1300 can thus be implemented in a wide variety of configurations.

Figure 14:
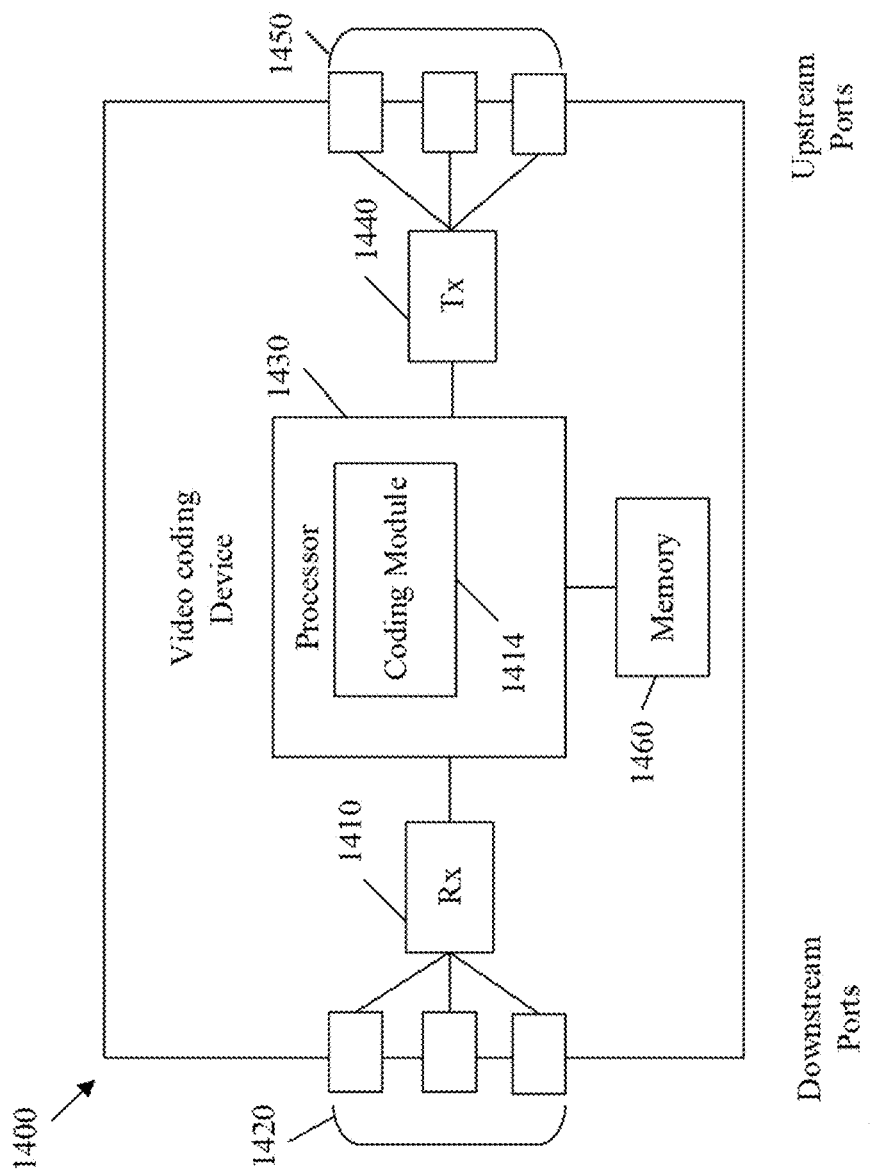
FIG. 14 shows a schematic diagram of a device for video coding.

FIG. 14 is a schematic diagram of an example device 1400 for video coding according to an embodiment of the disclosure. The computing device 1400 is suitable for implementing the disclosed embodiments as described herein. In an embodiment, the computing device 1400 may be a decoder such as video decoder 200 of FIG. 2 or an encoder such as video encoder 100 of FIG. 1. In an embodiment, the computing device 1400 may be one or more components of the video decoder 200 of FIG. 2 or the video encoder 100 of FIG. 1 as described above.

The computing device 1400 comprises ingress ports 1420 and receiver units (Rx) 1410 for receiving data; a processor, logic unit, or central processing unit (CPU) 1430 to process the data; transmitter units (Tx) 1440 and egress ports 1450 for transmitting the data; a memory 1460 for storing the data. The computing device 1400 may also comprise optical-to-electrical (OE) components and electrical-to-optical (EO) components coupled to the ingress ports 1420, the receiver units 1410, the transmitter units 1440, and the egress ports 1450 for egress or ingress of optical or electrical signals. The computing device 1400 may also include wireless transmitters and/or receivers in some examples.

The processor 1430 is implemented by hardware and software. The processor 1430 may be implemented as one or more CPU chips, cores (e.g., as a multi-core processor), field-programmable gate arrays (FPGAs), application specific integrated circuits (ASICs), and digital signal processors (DSPs). The processor 1430 is in communication with the ingress ports 1420, receiver units 1410, transmitter units 1440, egress ports 1450, and memory 1460. The processor 1430 comprises a coding module 1414. The coding module 1414 implements the disclosed embodiments described above. For instance, the coding module 1414 implements, processes, prepares, or provides the various coding operations. The inclusion of the coding module 1414 therefore provides a substantial improvement to the functionality of the computing device 1400 and effects a transformation of the computing device 1400 to a different state. Alternatively, the coding module 1414 is implemented as instructions stored in the memory 1460 and executed by the processor 1430 (e.g., as a computer program product stored on a non-transitory medium).

The memory 1460 comprises one or more disks, tape drives, and solid-state drives and may be used as an overflow data storage device, to store programs when such programs are selected for execution, and to store instructions and data that are read during program execution. The memory 1460 may be volatile and/or non-volatile and may be read-only memory (ROM), random access memory (RAM), ternary content-addressable memory (TCAM), and/or static random-access memory (SRAM). The computing device 1400 may also include input/output (I/O) device for interacting with an end user. For example, the computing device 1400 may include a display, such as a monitor, for visual output, speakers for audio output, and a keyboard/mouse/trackball, etc. for user input.

Figure 19:
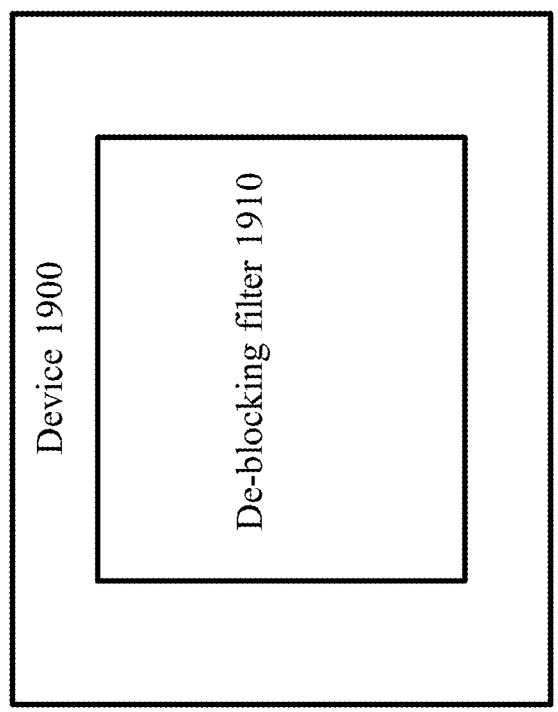
FIG. 19 shows a schematic diagram of a device for de-blocking block edges.

FIG. 19 is a block diagram illustrating an exemplary device 1900 according to the techniques described in this disclosure (further details will be described below, e.g., based on FIGS. 7, 8 and FIGS. 16 (=16A and 16B), 17 and 18). The device for use in an image encoder and/or an image decoder, for deblocking block edges between blocks, wherein the block edges comprises a horizontal block edge (e.g. CU edge or CU boundary) between a first coding block P and a second coding block Q, wherein the horizontal block edge overlaps with a coding tree unit (CTU) boundary, wherein the first coding block P is the block above the CTU boundary and the second coding block Q is the block below the CTU boundary;

wherein the first coding block has a block size SA perpendicular to the horizontal block edge, wherein the second coding block has a block size SB perpendicular to the horizontal block edge, wherein the device 1900 comprises a de-blocking filter 1910 configured to:
  modify at most a number MA of sample values of the first coding block, adjacent to the horizontal block edge, as first filter output values,
  modify at most a number MB of sample values of the second coding block, adjacent to the horizontal block edge, as second filter output values,
  use at most a number DA of sample values of the first coding block, adjacent to the horizontal block edge, as first filter decision values,
  use at most a number DB of sample values of the second coding block, adjacent to the horizontal block edge, as second filter decision values,
  wherein DA≠DB and MA≠MB, SA>DA>MA and SB>DB>MB.

In some implementation form of the embodiment, wherein if a size of a line buffer (e.g. line buffer size) is X, then for the first coding block P, DA=X and MA=X−1; and the sample $p_i$ of the first coding block P is used as a padded value which replaces the other samples which belongs to the first coding block P and which are outside the line buffer, wherein if the line buffer size is X, then i=X−1.

In some implementation form of the embodiment, wherein DA<DB and MA<MB.

In some implementation form of the embodiment, wherein DB=8 and DA=6, wherein MB=7 and MA=5.

In some implementation form of the embodiment, wherein DB=8 and DA=7, wherein MB=7 and MA=6.

In some implementation form of the embodiment, wherein DB=8 and DA=5, wherein MB=7 and MA=4.

In some implementation form of the embodiment, wherein DB=8 and DA=4, wherein MB=7 and MA=3.

In a further possible implementation form of the embodiment, wherein when a 6-line buffer (e.g. a line buffer with the line buffer size being 6) is applied, an extended filter condition equation $sp_3'=(sp_3+Abs(p_5-p_3)+1)>>1$ is checked;

when one or more filter condition equations comprising the extended filter condition equation are satisfied, the first filter is applied for sample values of the first coding block P, adjacent to the horizontal block edge overlapping with the CTU boundary;

wherein $sp_3=Abs(p_3-p_0)$, and $p_i$ represent the sample value of the first coding block P used in filter decision, i=0, 1, 2, 3, 4 or 5.

In a further possible implementation form of the embodiment, wherein when a 6-line buffer is applied and the second coding block Q with the block size SB>=a predefined size (such as 32), an extended filter condition equation $sq_3'=(sq_3+Abs(q_7-q_3)+1)>>1$ is checked;

when one or more filter condition equations comprising the extended filter condition equation are satisfied, the first filter is applied for sample values of the second coding block Q, adjacent to the horizontal block edge overlapping with the CTU boundary;

wherein $sq_3=Abs(q_0-q_3)$, and $q_i$ represent the sample value of the second coding block Q used in filter decision, i=0, 1, 2, 3, 4 . . . or 7.

In a further possible implementation form of the embodiment, wherein when a 4-line buffer is applied, an extended filter condition equation $sp_3'=(sp_3+Abs(p_3-p_0)+1)>>1$ is checked;

when one or more filter condition equations comprising the extended filter condition equation are satisfied, the first filter is applied for sample values of the first coding block P, adjacent to the horizontal block edge overlapping with the CTU boundary;

wherein $sp_3=Abs(p_3-p_0)$, and $p_i$ represent the sample value of the first coding block P used in filter decision, i=0, 1, 2 or 3.

In a further possible implementation form of the embodiment, wherein the first filter output values $p_i'$ and the second filter output values $q_i'$ for i=0 to S−1 is formulated as follows:

$$p_i'=(f_i*Middle_{s,t}+(64-f_i)*P_s+32)>>6), \text{clipped to } p_i \pm tcPD_i$$

$$q_i'=(g_i*Middle_{s,t}+(64-g_i)*Q_s+32)>>6), \text{clipped to } q_i \pm tcPD_i$$

wherein $tcPD_i$ is a position dependent clipping parameter, $g_i$, $Middle_{s,t}$, $P_s$ and $Q_s$ depend on S;

$p_i$ represents the sample value of the first coding block P; and $q_i$ represents the sample value of the second coding block Q.

wherein S=MA for the first coding block P, i.e. at most a number of the samples which can be modified in each column of the first image block that is perpendicular to and adjacent to the horizontal block edge, or S=MB for the second coding block Q, i.e. the at most a number of the samples which can be modified in each column of the second image block Q that is perpendicular to and adjacent to the horizontal block edge.

In some implementation form of the embodiment, the line buffer size X=6, $g_i$, $f_i$, $Middle_{s,t}$, $P_s$ and $Q_s$ depends on S as follows:

| | |
|---|---|
| 5,7 (S(=MA)=5 for the first coding block P, S(=MB)=7 for the second coding block Q) | $f_i = 59 - i * 9$, can also be described as $f = \{59,50,41,32,23,14,5\}$ $g_i = 59 - i * 9$, can also be described as $g = \{59,50,41,32,23,14,5\}$ $Middle_{7,7} = (2 * (p_o + q_o) + p_1 + q_1 + p_2 + q_2 + p_3 + q_3 + p_4 + q_4 + p_5 + q_5 + p_5 + q_6 + 8) >> 4$ $P_7 = (p_5 + p_5 + 1) >> 1, Q_7 = (q_6 + q_7 + 1) >> 1$ |
| 5,3 (S(=MA)=5 for the first coding block P, S(=MB)=3 for the second coding block Q) | $f_i = 59 - i * 9$, can also be described as $f = \{59,50,41,32,23,14,5\}$ $g_i = 53 - i * 21$, can also be described as $g = \{53,32,11\}$ $Middle_{7,3} = (2 * (p_o + q_o) + q_0 + 2 * (q_1 + q_2) + p_1 + q_1 + p_2 + p_3 + p_4 + p_5 + p_5 + 8) >> 4$ $P_7 = (p_5 + p_5 + 1) >> 1, Q_3 = (q_2 + q_3 + 1) >> 1$ |
| 3,7 (S(=MA)=3 for the first coding block P, S(=MB)=7 for the second coding block Q) | $g_i = 59 - i * 9$, can also be described as $g = \{59,50,41,32,23,14,5\}$ $f_i = 53 - i * 21$, can also be described as $f = \{53,32,11\}$ $Middle_{3,7} = (2 * (q_o + p_o) + p_0 + 2 * (p_1 + p_2) + q_1 + p_1 + q_2 + q_3 + q_4 + q_5 + q_6 + 8) >> 4$ $Q_7 = (q_6 + q_7 + 1) >> 1, P_3 = (p_2 + p_3 + 1) >> 1$ |

In some implementation form of the embodiment, wherein the line buffer size X=4, $g_i$, fi $Middle_{s,t}$, $P_s$ and $Q_s$ depends on S as follows:

| | |
|---|---|
| 3,7 (S(=MA)=3 for the first coding block P; S(=MB)=7 for the second coding block Q) | $g_i = 59 - i * 9$, can also be described as $g = \{59,50,41,32,23,14,5\}$ $f_i = 53 - i * 21$, can also be described as $f = \{53,32,11\}$ $Middle_{3,7} = (2 * (q_o + p_o) + p_0 + 2 * (p_1 + p_2) + q_1 + p_1 + q_2 + q_3 + q_4 + q_5 + q_6 + 8) >> 4$ $Q_7 = (q_6 + q_7 + 1) >> 1, P_3 = (p_2 + p_3 + 1) >> 1$ |

In some implementation form of the embodiment, wherein the filter coefficients are determined in such a way that sample $p_i$, which belongs to the first coding block P and which is the outermost sample allowed to be stored in the line buffer, is used as a padded value which replaces the other samples which belongs to the first coding block P and which are outside the line buffer.

In an example, wherein a line buffer has the line buffer size of 6 lines, and the samples $p_0$ to $p_4$ are modified from the first coding block P to be the samples $p_0'$ to $p_4'$.

In a further possible implementation form of the embodiment, wherein the de-blocking filter is a longer tap filter or an asymmetric filter or an asymmetric tap filter.

In some implementation forms of the embodiment, wherein the samples $p_i$ are Luma and/or Chroma samples.

Following is an explanation of the applications of the encoding method as well as the decoding method as shown in the above-mentioned embodiments, and a system using them.

Figure 20:
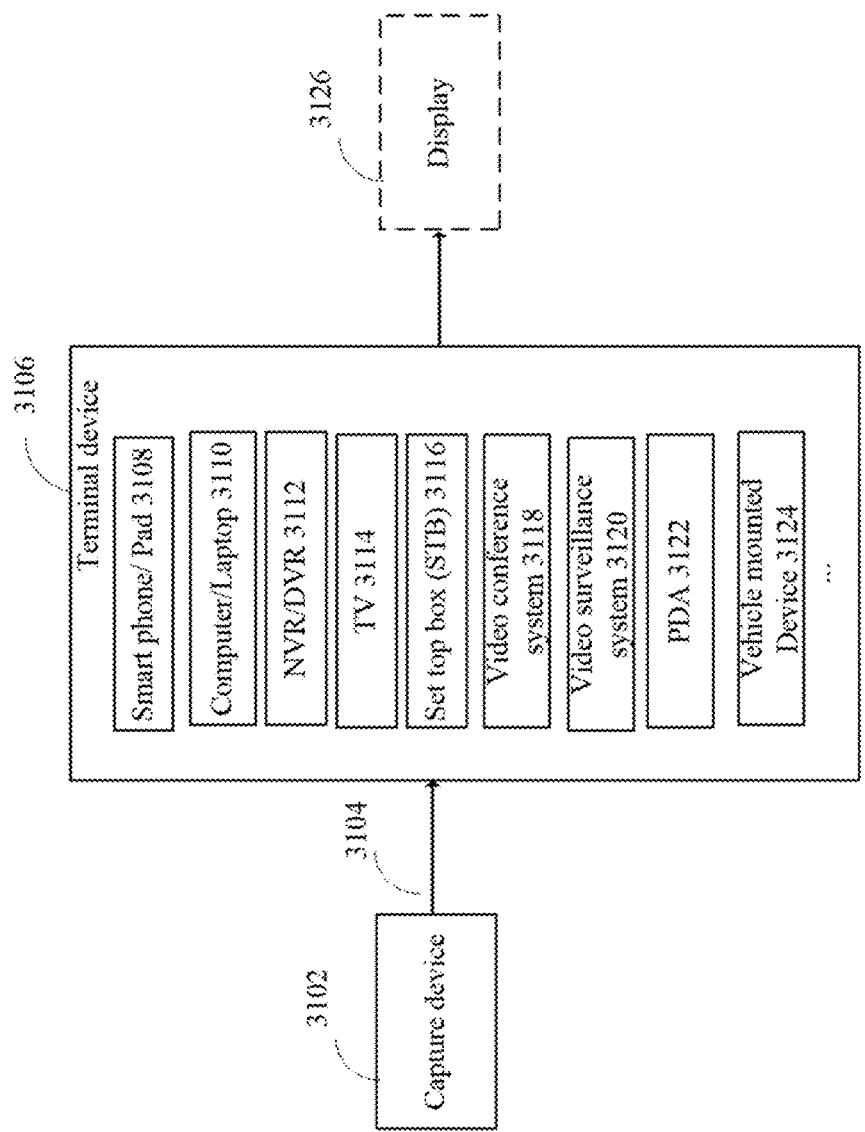
FIG. 20 is a block diagram showing an example structure of a content supply system 3100 which realizes a content delivery service.

FIG. 20 is a block diagram showing a content supply system 3100 for realizing content distribution service. This content supply system 3100 includes capture device 3102, terminal device 3106, and optionally includes display 3126. The capture device 3102 communicates with the terminal device 3106 over communication link 3104. The communication link may include the communication channel 13 described above. The communication link 3104 includes but not limited to WIFI, Ethernet, Cable, wireless (3G/4G/5G), USB, or any kind of combination thereof, or the like.

The capture device 3102 generates data, and may encode the data by the encoding method as shown in the above embodiments. Alternatively, the capture device 3102 may distribute the data to a streaming server (not shown in the Figures), and the server encodes the data and transmits the encoded data to the terminal device 3106. The capture device 3102 includes but not limited to camera, smart phone or Pad, computer or laptop, video conference system, PDA, vehicle mounted device, or a combination of any of them, or the like. For example, the capture device 3102 may include the source device 12 as described above. When the data includes video, the video encoder 20 included in the capture device 3102 may actually perform video encoding processing. When the data includes audio (i.e., voice), an audio encoder included in the capture device 3102 may actually perform audio encoding processing. For some practical scenarios, the capture device 3102 distributes the encoded video and audio data by multiplexing them together. For other practical scenarios, for example in the video conference system, the encoded audio data and the encoded video data are not multiplexed. Capture device 3102 distributes the encoded audio data and the encoded video data to the terminal device 3106 separately.

In the content supply system 3100, the terminal device 310 receives and reproduces the encoded data. The terminal device 3106 could be a device with data receiving and recovering capability, such as smart phone or Pad 3108, computer or laptop 3110, network video recorder (NVR)/digital video recorder (DVR) 3112, TV 3114, set top box (STB) 3116, video conference system 3118, video surveillance system 3120, personal digital assistant (PDA) 3122, vehicle mounted device 3124, or a combination of any of them, or the like capable of decoding the above-mentioned encoded data. For example, the terminal device 3106 may include the destination device 14 as described above. When the encoded data includes video, the video decoder 30 included in the terminal device is prioritized to perform video decoding. When the encoded data includes audio, an audio decoder included in the terminal device is prioritized to perform audio decoding processing.

For a terminal device with its display, for example, smart phone or Pad 3108, computer or laptop 3110, network video recorder (NVR)/digital video recorder (DVR) 3112, TV 3114, personal digital assistant (PDA) 3122, or vehicle mounted device 3124, the terminal device can feed the decoded data to its display. For a terminal device equipped with no display, for example, STB 3116, video conference system 3118, or video surveillance system 3120, an external display 3126 is contacted therein to receive and show the decoded data.

When each device in this system performs encoding or decoding, the picture encoding device or the picture decoding device, as shown in the above-mentioned embodiments, can be used.

Figure 21:
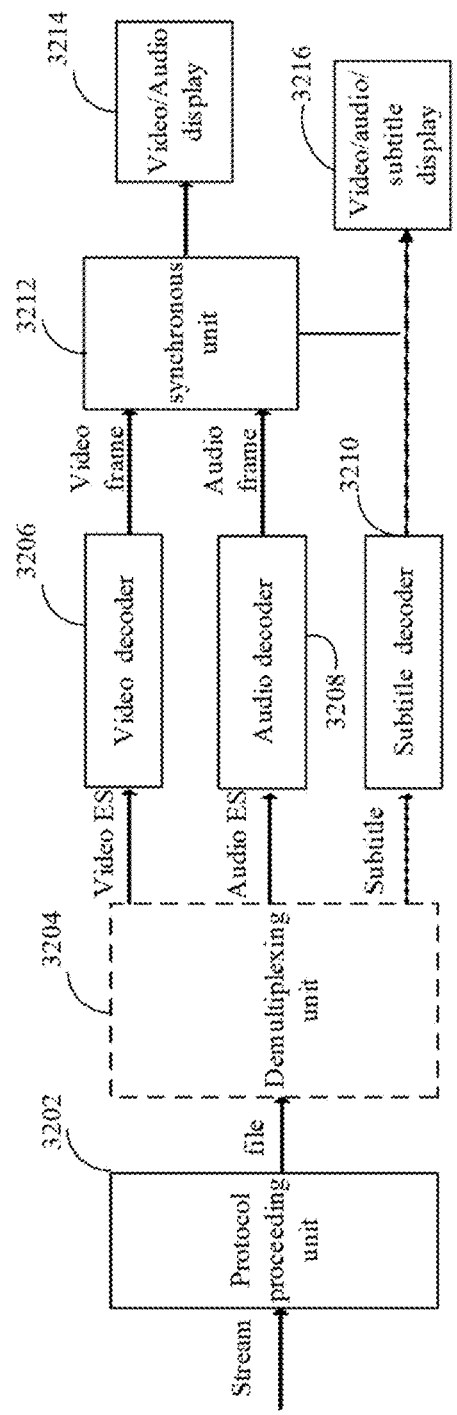
FIG. 21 is a block diagram showing a structure of an example of a terminal device.

FIG. 21 is a diagram showing a structure of an example of the terminal device 3106. After the terminal device 3106 receives stream from the capture device 3102, the protocol proceeding unit 3202 analyzes the transmission protocol of the stream. The protocol includes but not limited to Real Time Streaming Protocol (RTSP), Hyper Text Transfer Protocol (HTTP), HTTP Live streaming protocol (HLS), MPEG-DASH, Real-time Transport protocol (RTP), Real Time Messaging Protocol (RTMP), or any kind of combination thereof, or the like.

After the protocol proceeding unit 3202 processes the stream, stream file is generated. The file is outputted to a demultiplexing unit 3204. The demultiplexing unit 3204 can separate the multiplexed data into the encoded audio data and the encoded video data. As described above, for some practical scenarios, for example in the video conference system, the encoded audio data and the encoded video data are not multiplexed. In this situation, the encoded data is transmitted to video decoder 3206 and audio decoder 3208 without through the demultiplexing unit 3204.

Via the demultiplexing processing, video elementary stream (ES), audio ES, and optionally subtitle are generated. The video decoder 3206, which includes the video decoder 30 as explained in the above mentioned embodiments, decodes the video ES by the decoding method as shown in the above-mentioned embodiments to generate video frame, and feeds this data to the synchronous unit 3212. The audio decoder 3208, decodes the audio ES to generate audio frame, and feeds this data to the synchronous unit 3212. Alternatively, the video frame may store in a buffer (not shown in FIG. 20) before feeding it to the synchronous unit 3212. Similarly, the audio frame may store in a buffer (not shown in FIG. 20) before feeding it to the synchronous unit 3212.

The synchronous unit 3212 synchronizes the video frame and the audio frame, and supplies the video/audio to a video/audio display 3214. For example, the synchronous unit 3212 synchronizes the presentation of the video and audio information. Information may code in the syntax using time stamps concerning the presentation of coded audio and visual data and time stamps concerning the delivery of the data stream itself.

If subtitle is included in the stream, the subtitle decoder 3210 decodes the subtitle, and synchronizes it with the video frame and the audio frame, and supplies the video/audio/subtitle to a video/audio/subtitle display 3216.

The present invention is not limited to the above-mentioned system, and either the picture encoding device or the picture decoding device in the above-mentioned embodiments can be incorporated into other system, for example, a car system.

The invention has been described in conjunction with various embodiments herein. However, other variations to the disclosed embodiments can be understood and effected by those skilled in the art in practicing the claimed invention, from a study of the drawings, the disclosure and the appended claims. In the claims, the word "comprising" does not exclude other elements or steps and the indefinite article "a" or "an" does not exclude a plurality. A single processor or other unit may fulfill the functions of several items recited in the claims. The mere fact that certain measures are recited in usually different dependent claims does not indicate that a combination of these measures cannot be used to advantage. A computer program may be stored/distributed on a suitable medium, such as an optical storage medium or a solid-state medium supplied together with or as part of other hardware, but may also be distributed in other forms, such as via the internet or other wired or wireless communication systems.

Wherever embodiments and the description refer to the term "memory", the term "memory" shall be understood and/or shall comprise a magnetic disk, an optical disc, a read-only memory (Read-Only Memory, ROM), or a random access memory (Random Access Memory, RAM), . . . , unless explicitly stated otherwise.

Wherever embodiments and the description refer to the term "network", the term "network" shall be understood and/or shall comprise [listing of all possible memories] . . . , unless explicitly stated otherwise.

The person skilled in the art will understand that the "blocks" ("units") of the various figures (method and apparatus) represent or describe functionalities of embodiments of the invention (rather than necessarily individual "units" in hardware or software) and thus describe equally functions or features of apparatus embodiments as well as method embodiments (unit=step).

The terminology of "units" is merely used for illustrative purposes of the functionality of embodiments of the encoder/decoder and are not intended to limit the disclosure.

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit.

Embodiments of the invention may further comprise an apparatus, e.g. encoder and/or decoder, which comprises a processing circuitry configured to perform any of the methods and/or processes described herein.

Embodiments may be implemented as hardware, firmware, software or any combination thereof. For example, the functionality of the encoder/encoding or decoder/decoding may be performed by a processing circuitry with or without firmware or software, e.g. a processor, a microcontroller, a digital signal processor (DSP), a field programmable gate array (FPGA), an application-specific integrated circuit (ASIC), or the like.

The functionality of the encoder 100 (and corresponding encoding method 100) and/or decoder 200 (and corresponding decoding method 200) may be implemented by program instructions stored on a computer readable medium. The program instructions, when executed, cause a processing circuitry, computer, processor or the like, to perform the steps of the encoding and/or decoding methods. The computer readable medium can be any medium, including non-transitory storage media, on which the program is stored such as a BLU-RAY disc, DVD, CD, USB (flash) drive, hard disc, server storage available via a network, etc.

An embodiment of the invention comprises or is a computer program comprising program code for performing any of the methods described herein, when executed on a computer.

An embodiment of the invention comprises or is a computer readable medium comprising a program code that, when executed by a processor, causes a computer system to perform any of the methods described herein.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

The invention claimed is:

1. A device for deblocking block edges between chroma blocks, the block edges comprise a chroma horizontal block edge between a first chroma block and a second chroma block, the first chroma block having a block size SA along a vertical direction and the second chroma block having a block size SB along the vertical direction, the vertical direction being perpendicular to the chroma horizontal block edge, the device comprising a de-blocking filter configured to:
  determine whether the chroma horizontal block edge is overlapped with a horizontal chroma coding tree block (CTB) boundary;
  in response to determining that the chroma horizontal block edge is overlapped with the horizontal chroma CTB boundary;
    use values of at most DA samples of the first chroma block as first filter decision values, the at most DA samples being obtained from a column of the first chroma block that is perpendicular to the chroma horizontal block edge and the at most DA samples being adjacent to the chroma horizontal block edge;
    use values of at most DB samples of the second chroma block as second filter decision values, the at most DB samples being obtained from a column of the second chroma block that is perpendicular to the chroma horizontal block edge and the at most DB samples are adjacent to the chroma horizontal block edge;
    modify values of at most MA samples of the first chroma block as first filter output values, the at most MA samples being obtained from the column of the first chroma block that is perpendicular to the chroma horizontal block edge and the at most MA samples being adjacent to the chroma horizontal block edge; and
    modify values of at most MB samples of the second chroma block as second filter output values, the at most MB samples being obtained from the column of the second chroma block that is perpendicular to the chroma horizontal block edge and the at most MB samples being adjacent to the chroma horizontal block edge;
  wherein the first chroma block is a block above the horizontal chroma CTB boundary and the second chroma block is a block below the horizontal chroma CTB boundary;
  wherein SA=SB, MA<MB, DA<DB, SA>DA>MA, and SB>DB>MB;
  wherein the de-blocking filter is an asymmetric filter; and
  wherein SA and SB are equal to or greater than 8, MB=3 and MA=1, and DB=4 and DA=2.

2. The device of claim 1, wherein the samples $p_i$ of the first chroma block are chroma samples, wherein i belongs to $\{0, 1, 2, \ldots, SA-1\}$.

3. A deblocking method for deblocking block edges between chroma blocks, the block edges comprise a chroma horizontal block edge between a first chroma block and a second chroma block, the first chroma block having a block size SA along a vertical direction and the second chroma block having a block size SB along the vertical direction, the vertical direction being perpendicular to the chroma horizontal block edge, the method comprising:
  determining whether the chroma horizontal block edge is overlapped with a horizontal chroma coding tree block (CTB) boundary;
  in response to determining that the chroma horizontal block edge is overlapped with the horizontal chroma CTB boundary;
    using values of at most DA samples of the first chroma block as first filter decision values, the at most DA samples being obtained from a column of the first chroma block that is perpendicular to the chroma horizontal block edge and the at most DA samples being adjacent to the chroma horizontal block edge;
    using values of at most DB samples of the second chroma block as second filter decision values, the at most DB samples being obtained from a column of the second chroma block that is perpendicular to the chroma horizontal block edge and the at most DB samples being adjacent to the chroma horizontal block edge;
    modifying values of at most MA samples of the first chroma block as first filter output values, the at most MA samples being obtained from the column of the first chroma block that is perpendicular to the chroma horizontal block edge and the at most MA samples being adjacent to the chroma horizontal block edge; and
    modifying values of at most MB samples of the second chroma block as second filter output values, the at most MB samples being obtained from the column of the second chroma block that is perpendicular to the chroma horizontal block edge and the at most MB samples being adjacent to the chroma horizontal block edge;

wherein the first chroma block is a block above the horizontal chroma CTB boundary and the second chroma block is a block below the horizontal chroma CTB boundary;

wherein SA=SB, MA<MB, DA<DB, SA>DA>MA, and SB>DB>MB;

wherein the de-blocking filter is an asymmetric filter; and wherein SA and SB are equal to or greater than 8, MB=3 and MA=1, and DB=4 and DA=2.

4. The method of claim 3, wherein the samples $p_i$ of the first chroma block are chroma samples, wherein i belongs to $\{0, 1, 2, \ldots, SA-1\}$.

5. A non-transitory computer-readable media storing computer instructions for deblocking block edges between chroma blocks, the block edges comprise a chroma horizontal block edge between a first chroma block and a second chroma block, the first chroma block having a block size SA along a vertical direction and the second chroma block having a block size SB along the vertical direction, the vertical direction being perpendicular to the chroma horizontal block edge, the computer instructions, when executed by one or more processors, cause the one or more processors to perform the steps:

determining whether the chroma horizontal block edge is overlapped with a horizontal chroma coding tree block (CTB) boundary;

in response to determining that the chroma horizontal block edge is overlapped with the horizontal chroma CTB boundary;

using values of at most DA samples of the first chroma block as first filter decision values, the at most DA samples being obtained from a column of the first chroma block that is perpendicular to the chroma horizontal block edge and the at most DA samples being adjacent to the chroma horizontal block edge;

using values of at most DB samples of the second chroma block as second filter decision values, the at most DB samples being obtained from a column of the second chroma block that is perpendicular to the chroma horizontal block edge and the at most DB samples being adjacent to the chroma horizontal block edge;

modifying values of at most MA samples of the first chroma block as first filter output values, the at most MA samples being obtained from the column of the first chroma block that is perpendicular to the chroma horizontal block edge and the at most MA samples being adjacent to the chroma horizontal block edge; and modifying values of at most MB samples of the second chroma block as second filter output values, the at most MB samples being obtained from the column of the second chroma block that is perpendicular to the chroma horizontal block edge and the at most MB samples being adjacent to the chroma horizontal block edge;

wherein the first chroma block is a block above the horizontal chroma CTB boundary and the second chroma block is a block below the horizontal chroma CTB boundary;

wherein SA=SB, MA<MB, DA<DB, SA>DA>MA, and SB>DB>MB;

wherein the de-blocking filter is an asymmetric filter; and wherein SA and SB are equal to or greater than 8, MB=3 and MA=1, and DB=4 and DA=2.

* * * * *